US011224076B2

(12) United States Patent
Islam et al.

(10) Patent No.: US 11,224,076 B2
(45) Date of Patent: Jan. 11, 2022

(54) RANDOM ACCESS CHANNEL PROCEDURE SELECTION SCHEME

(71) Applicant: QUALCOMM Incorporated, San Diego, CA (US)

(72) Inventors: Muhammad Nazmul Islam, Littleton, MA (US); Xiaoxia Zhang, San Diego, CA (US); Jing Sun, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 16/789,418

(22) Filed: Feb. 12, 2020

(65) Prior Publication Data

US 2020/0267773 A1   Aug. 20, 2020

Related U.S. Application Data

(60) Provisional application No. 62/805,730, filed on Feb. 14, 2019.

(51) Int. Cl.
*H04W 74/08* (2009.01)
*H04W 80/02* (2009.01)
(Continued)

(52) U.S. Cl.
CPC ..... *H04W 74/0833* (2013.01); *H04W 56/001* (2013.01); *H04W 72/042* (2013.01);
(Continued)

(58) Field of Classification Search
CPC ..... H04W 56/00; H04W 72/04; H04W 76/27; H04W 80/02; H04W 56/001; H04W 74/0833; H04W 72/042; H04W 74/0808
See application file for complete search history.

(56) References Cited

U.S. PATENT DOCUMENTS

2018/0279375 A1   9/2018 Jeon et al.
2020/0107235 A1*  4/2020 Peisa ................. H04W 36/0061
(Continued)

OTHER PUBLICATIONS

Ericsson: "On Two-step Random Access and Random Access Latency", 3GPP Draft; R2-1700413—On Two-Step Random Access and Random Access Latency, 3rd Generation Partnership Project (3GPP), Mobile Competence Centre ; 650, Route Des Lucioles ; F-06921 Sophia-Antipolis C, vol. RAN WG2, No. Spokane, Wa; Jan. 17, 2017-Jan. 19, 2017, Jan. 17, 2017 (Jan. 17, 2017), XP051210992, 6 Pages, Retrieved from the Internet: URL:http://www.3gpp.org/ftp/Meetings_3GPP_SYNC/RAN2/Docs/ [retrieved on Jan. 17, 2017], section 2.2.
(Continued)

*Primary Examiner* — Kyaw Z Soe
(74) *Attorney, Agent, or Firm* — Holland & Hart LLP

(57) ABSTRACT

Methods, systems, and devices for wireless communications are described. The method includes receiving, via a control channel, an order message instructing the UE to perform a random access channel (RACH) procedure, and selecting to perform a first RACH procedure or a second RACH procedure based on a preamble preparation time gap between the order message and a first occasion for transmitting a RACH preamble, or a payload preparation time gap between the order message and an occasion for transmitting a RACH payload, or both.

30 Claims, 23 Drawing Sheets

(51) Int. Cl.
  *H04W 76/27* (2018.01)
  *H04W 56/00* (2009.01)
  *H04W 72/04* (2009.01)

(52) U.S. Cl.
  CPC ....... *H04W 74/0808* (2013.01); *H04W 76/27* (2018.02); *H04W 80/02* (2013.01)

(56) References Cited

U.S. PATENT DOCUMENTS

2021/0051707 A1* 2/2021 Rastegardoost ...... H04W 72/14
2021/0168683 A1* 6/2021 Peisa .................... H04B 7/0626

OTHER PUBLICATIONS

Ericsson: "Random Access Enhancements", 3GPP Draft; R2-166826—Random Access Enhancements, 3rd Generation Partnership Project (3GPP), Mobile Competence Centre ; 650, Route Des Lucioles ; F-06921 Sophia-Antipolis Cedex ; France, vol. RAN WG2, No. Kaohsiung, Taiwan; Oct. 10, 2016-Oct. 14, 2016, Oct. 9, 2016 (Oct. 9, 2016), XP051151278, 5 Pages, Retrieved from the Internet: URL:http://www.3gpp.org/ftp/Meetings_3GPP_SYNC/RAN2/Docs/ [retrieved on Oct. 9, 2016], sections 2.2.2 and 2.2.3.

International Search Report and Written Opinion—PCT/US2020/018088—ISA/EPO—dated May 14, 2020.

Qualcomm Incorporated: "Report of Email Discussion [103#55] [NR-U] 2-step RACH Model and Initial Information Contents (Qualcomm)", 3GPP Draft, 3GPP TSG-RAN WG2 Meeting #103bis, R2-1815564_Report_Email_Discussion_NRU_2Step, 3rd Generation Partnership Project (3GPP), Mobile Competence Centre, 650, Route Des Lucioles, F-06921, Sophia-Antipolis Cedex, France, vol. RAN WG2, No. Chengdu, China, Oct. 8, 2018-Oct. 12, 2018, Oct. 12, 2018 (Oct. 12, 2018), XP051524883, 17 pages, Retrieved from the Internet: URL:http://www.3gpp.org/ftp/tsg%5Fran/WG2%5FRL2/TSGR2%5F103bis/Docs/R2%2D1815564%2Ezip [retrieved on Oct. 12, 2018],section 1 "Introduction", section 2 "Discussion", Question 2, section 2 "Discussion", Question 9, Question 7 and subsequent answers;p. 12-p. 13.

* cited by examiner

RANDOM ACCESS CHANNEL PROCEDURE SELECTION SCHEME

CROSS REFERENCE

The present application for patent claims the benefit of U.S. Provisional Patent Application No. 62/805,730 by ISLAM et al., entitled "RANDOM ACCESS CHANNEL PROCEDURE SELECTION SCHEME" filed Feb. 14, 2019, assigned to the assignee hereof, and expressly incorporated herein.

BACKGROUND

The following relates generally to wireless communications, and more specifically to a random access channel procedure selection scheme.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless systems may support random access procedures for establishing communications between a UE and a base station. The random access procedure may involve a series of handshake messages between the UE and the base station. In some cases, it may be desirable to reduce the latency associated with the random access procedure.

SUMMARY

The described techniques relate to improved methods, systems, devices, and apparatuses that support a random access channel procedure selection scheme. Generally, the described techniques provide for a wireless device in a mobile wireless network performing a contention-based random access procedure. The described techniques relate to wireless devices (e.g., user equipment (UE)) in a wireless cellular network receiving an order message instructing the wireless device to perform a random accession channel (RACH) procedure and selecting which RACH procedure of multiple RACH procedures to perform. In some cases, the wireless device may dynamically select between a two-step random access procedure and a four-step random access procedure based on a determination of whether a preamble preparation time gap between the order message and an occasion for transmitting a RACH preamble satisfies a preamble preparation threshold, or a payload preparation time gap between the order message and an occasion for transmitting a RACH payload satisfies a payload preparation threshold, or both.

A method of wireless communication by a UE is described. The method may include receiving, via a control channel, an order message instructing the UE to perform a RACH procedure and selecting to perform a first RACH procedure or a second RACH procedure based on a preamble preparation time gap between the order message and a first occasion for transmitting a RACH preamble, or a payload preparation time gap between the order message and an occasion for transmitting a RACH payload, or both.

An apparatus for wireless communication by a UE is described. The apparatus may include a processor, memory in electronic communication with the processor, and instructions stored in the memory. The instructions may be executable by the processor to cause the apparatus to receive, via a control channel, an order message instructing the UE to perform a RACH procedure and select to perform a first RACH procedure or a second RACH procedure based on a preamble preparation time gap between the order message and a first occasion for transmitting a RACH preamble, or a payload preparation time gap between the order message and an occasion for transmitting a RACH payload, or both.

Another apparatus for wireless communication by a UE is described. The apparatus may include means for receiving, via a control channel, an order message instructing the UE to perform a RACH procedure and selecting to perform a first RACH procedure or a second RACH procedure based on a preamble preparation time gap between the order message and a first occasion for transmitting a RACH preamble, or a payload preparation time gap between the order message and an occasion for transmitting a RACH payload, or both.

A non-transitory computer-readable medium storing code for wireless communication by a UE is described. The code may include instructions executable by a processor to receive, via a control channel, an order message instructing the UE to perform a RACH procedure and select to perform a first RACH procedure or a second RACH procedure based on a preamble preparation time gap between the order message and a first occasion for transmitting a RACH preamble, or a payload preparation time gap between the order message and an occasion for transmitting a RACH payload, or both.

Some examples of the method, apparatuses, and non-transitory computer-readable medium described herein may further include operations, features, means, or instructions for transmitting the RACH preamble during the first occasion for transmitting the RACH preamble or a second occasion for transmitting the RACH preamble based on whether the first RACH procedure or the second RACH procedure was selected.

Some examples of the method, apparatuses, and non-transitory computer-readable medium described herein may further include operations, features, means, or instructions for transmitting the RACH preamble during the first occasion for transmitting the RACH preamble or the second occasion for transmitting the RACH preamble may be further based on the preamble preparation time gap, the payload preparation time gap, or both. Some examples of the method, apparatuses, and non-transitory computer-readable medium described herein may further include operations, features, means, or instructions for determining the preamble preparation time gap, the payload preparation time gap, or both.

In some examples of the method, apparatuses, and non-transitory computer-readable medium described herein, selecting to perform the first RACH procedure or the second RACH procedure further may include operations, features, means, or instructions for selecting to perform the first RACH procedure based on the preamble preparation time gap satisfying a preamble preparation threshold and the payload preparation time gap satisfying a payload preparation threshold.

In some examples of the method, apparatuses, and non-transitory computer-readable medium described herein, selecting to perform the first RACH procedure or the second RACH procedure further may include operations, features, means, or instructions for selecting to perform the second RACH procedure based on the preamble preparation time gap not satisfying a preamble preparation threshold. Some examples of the method, apparatuses, and non-transitory computer-readable medium described herein may further include operations, features, means, or instructions for retrieving, from a memory of the UE, the preamble preparation threshold, the payload preparation threshold, or both.

Some examples of the method, apparatuses, and non-transitory computer-readable medium described herein may further include operations, features, means, or instructions for receiving a threshold indicator that indicates the preamble preparation threshold, the payload preparation threshold, or both. Some examples of the method, apparatuses, and non-transitory computer-readable medium described herein may further include operations, features, means, or instructions for transmitting a capability indicator, where the threshold indicator may be based on the capability indicator.

In some examples of the method, apparatuses, and non-transitory computer-readable medium described herein, receiving the threshold indicator further may include operations, features, means, or instructions for receiving the threshold indicator in a medium access control (MAC) control element (CE), in DCI, or RRC signaling, remaining minimum system information, other system information, handover report or any combination thereof.

In some examples of the method, apparatuses, and non-transitory computer-readable medium described herein, selecting to perform the first RACH procedure or the second RACH procedure further may include operations, features, means, or instructions for selecting to perform the second RACH procedure based on the preamble preparation time gap not satisfying a preamble preparation threshold. In some examples of the method, apparatuses, and non-transitory computer-readable medium described herein, first respective time gaps between the control channel conveying the order message and each of the first occasion for transmitting the RACH preamble and the occasion for transmitting the RACH payload differ from second respective time gaps between the control channel conveying the order message and each of the second occasion for transmitting the RACH preamble and a second occasion for transmitting the RACH payload.

Some examples of the method, apparatuses, and non-transitory computer-readable medium described herein may further include operations, features, means, or instructions for selecting a RACH resource or a synchronization signal block (SSB) that satisfies a received power threshold and corresponds to the first respective time gaps, and transmitting the RACH preamble in the first occasion for transmitting the RACH preamble based on the preamble preparation time gap satisfying a preamble preparation threshold and the payload preparation time gap satisfying a payload preparation threshold, where the selected RACH resource or SSB corresponds to the first occasion for transmitting the RACH preamble but not the second occasion for transmitting the RACH preamble.

In some examples of the method, apparatuses, and non-transitory computer-readable medium described herein, an association period may include operations, features, means, or instructions for selecting a RACH resource or a SSB that satisfies a received power threshold and corresponds to the second respective time gaps, and selecting to transmit the RACH preamble within the second occasion for transmitting the RACH preamble that occurs within the association period, where the selected RACH resource or SSB corresponds to the second occasion for transmitting the RACH preamble but not the first occasion for transmitting the RACH preamble.

In some examples of the method, apparatuses, and non-transitory computer-readable medium described herein, the association period occurs after a first association period that includes the first occasion for transmitting the RACH preamble. Some examples of the method, apparatuses, and non-transitory computer-readable medium described herein may further include operations, features, means, or instructions for determining that a RACH response was not received within a response window in accordance with the first RACH procedure, determining a second preamble preparation time gap between an end of the response window and another occasion for transmitting the RACH preamble, and determining a second payload preparation time gap between an end of the response window and another occasion for transmitting the RACH payload.

Some examples of the method, apparatuses, and non-transitory computer-readable medium described herein may further include operations, features, means, or instructions for transmitting, in accordance with the first RACH procedure, a retransmission of the RACH preamble in the other occasion for transmitting the RACH preamble and the RACH payload in the other occasion for transmitting the RACH payload based on the second preamble preparation time gap satisfying a preamble preparation threshold and the second payload preparation time gap satisfying a payload preparation threshold.

Some examples of the method, apparatuses, and non-transitory computer-readable medium described herein may further include operations, features, means, or instructions for transmitting, in accordance with the second RACH procedure, a retransmission of the RACH preamble in the other occasion for transmitting the RACH preamble and the RACH payload in a second occasion for transmitting the RACH payload that occurs after the other occasion for transmitting the RACH payload based on the preamble preparation time gap satisfying a preamble preparation threshold and the second payload preparation time gap not satisfying a payload preparation threshold.

Some examples of the method, apparatuses, and non-transitory computer-readable medium described herein may further include operations, features, means, or instructions for determining that a RACH response was not received within the response window in accordance with the first RACH procedure, determining a second preamble preparation time gap between an end of the response window and the other occasion for transmitting the RACH preamble, where the other occasion for transmitting the RACH preamble and the other occasion for transmitting the RACH payload occur consecutively in time, and transmitting, in accordance with the first RACH procedure, a preamble in the other occasion for transmitting the RACH preamble and the RACH payload in the other occasion for transmitting the RACH payload based on the preamble preparation time gap satisfying a preamble preparation threshold. In some examples of the method, apparatuses, and non-transitory computer-readable medium described herein, a first time gap between the second occasion for transmitting the RACH preamble and the second occasion for transmitting the RACH payload differs from a second time gap between the other occasion for transmitting the RACH preamble and the other occasion for transmitting the RACH payload.

Some examples of the method, apparatuses, and non-transitory computer-readable medium described herein may further include operations, features, means, or instructions for selecting a RACH resource or a synchronization signal block that satisfies a received power threshold, where the other occasion for transmitting the RACH preamble corresponds to the synchronization signal block or the RACH resource, and transmitting, in accordance with the first RACH procedure, a retransmission of the RACH preamble in the other occasion for transmitting the RACH preamble based on the second preamble preparation time gap satisfying a preamble preparation threshold and the second payload preparation time gap satisfying a payload preparation threshold.

In some examples of the method, apparatuses, and non-transitory computer-readable medium described herein, an association period may include operations, features, means, or instructions for selecting a RACH resource or a synchronization signal block that satisfies a received power threshold, where the other occasion for transmitting the RACH preamble corresponds to the selected RACH resource or synchronization signal block, and transmitting, in accordance with the first RACH procedure, a retransmission of the RACH preamble in the other occasion for transmitting the RACH preamble based on the second preamble preparation time gap satisfying a preamble preparation threshold and the second payload preparation time gap satisfying a payload preparation threshold.

In some examples of the method, apparatuses, and non-transitory computer-readable medium described herein, transmitting the RACH preamble during the first occasion for transmitting the RACH preamble or the second occasion for transmitting the RACH preamble further may include operations, features, means, or instructions for transmitting a frequency division multiplexed transmission of the RACH preamble and the RACH payload during the first occasion for transmitting the RACH preamble, and monitoring a response window for a RACH response in accordance with the selected RACH procedure.

In some examples of the method, apparatuses, and non-transitory computer-readable medium described herein, the first occasion for transmitting the RACH preamble and the occasion for transmitting the RACH payload occur consecutively in time, and where selecting to perform the first RACH procedure or the second RACH procedure further may include operations, features, means, or instructions for selecting to perform the first RACH procedure based on the preamble preparation time gap satisfying a preamble preparation threshold.

In some examples of the method, apparatuses, and non-transitory computer-readable medium described herein, the first RACH procedure may be a two-step RACH procedure, and the second RACH procedure may be a four-step RACH procedure. Some examples of the method, apparatuses, and non-transitory computer-readable medium described herein may further include operations, features, means, or instructions for determining a second preamble preparation time gap between the first occasion for transmitting the RACH preamble and a response window, determining a second payload preparation time gap between the occasion for transmitting the RACH payload and the response window, and monitoring the response window for a RACH response in accordance with the selected RACH procedure.

Some examples of the method, apparatuses, and non-transitory computer-readable medium described herein may further include operations, features, means, or instructions for transmitting the RACH payload during the occasion for transmitting the RACH payload in accordance with the selected RACH procedure, determining a second preamble preparation time gap between an end of transmission of the RACH payload and a response window, and monitoring the response window for a RACH response based on the second preamble preparation time gap satisfying a preamble preparation threshold.

Some examples of the method, apparatuses, and non-transitory computer-readable medium described herein may further include operations, features, means, or instructions for transmitting, in accordance with the selected RACH procedure, the RACH payload during the occasion for transmitting the RACH payload within a transmission window, determining a second preamble preparation time gap between an end of the transmission window and a response window, the end of the transmission window corresponding to a last of a set of occasions for RACH payload transmission within the transmission window, and monitoring the response window for a RACH response based on the second preamble preparation time gap satisfying a preamble preparation threshold.

Some examples of the method, apparatuses, and non-transitory computer-readable medium described herein may further include operations, features, means, or instructions for determining a second preamble preparation time gap between a RACH response occasion and a contention resolution occasion within a response window, and monitoring the response window for a RACH response based on the second preamble preparation time gap satisfying a preamble preparation threshold.

A method of wireless communication by a UE is described. The method may include receiving, via a control channel, an order message instructing the UE to perform a RACH procedure, determining a preamble preparation time gap between the order message and an occasion for transmitting a RACH preamble, determining a payload preparation time gap between the order message and an occasion for transmitting a RACH payload, and selecting to perform a first RACH procedure instead of a second RACH procedure based on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload.

An apparatus for wireless communication by a UE is described. The apparatus may include a processor, memory in electronic communication with the processor, and instructions stored in the memory. The instructions may be executable by the processor to cause the apparatus to receive, via a control channel, an order message instructing the UE to perform a RACH procedure, determine a preamble preparation time gap between the order message and an occasion for transmitting a RACH preamble, determine a payload preparation time gap between the order message and an occasion for transmitting a RACH payload, and select to perform a first RACH procedure instead of a second RACH procedure based on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload.

Another apparatus for wireless communication by a UE is described. The apparatus may include means for receiving, via a control channel, an order message instructing the UE to perform a RACH procedure, determining a preamble preparation time gap between the order message and an occasion for transmitting a RACH preamble, determining a payload preparation time gap between the order message and an occasion for transmitting a RACH payload, and selecting to perform a first RACH procedure instead of a second RACH procedure based on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload.

A non-transitory computer-readable medium storing code for wireless communication by a UE is described. The code may include instructions executable by a processor to receive, via a control channel, an order message instructing the UE to perform a RACH procedure, determine a preamble preparation time gap between the order message and an occasion for transmitting a RACH preamble, determine a payload preparation time gap between the order message and an occasion for transmitting a RACH payload, and select to perform a first RACH procedure instead of a second RACH procedure based on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload.

In some examples of the method, apparatuses, and non-transitory computer-readable medium described herein, monitoring for the RACH preamble further may include operations, features, means, or instructions for selecting to perform the second RACH procedure instead of the first RACH procedure based on either the preamble preparation time gap not providing sufficient margin for the UE to transmit a RACH preamble in the occasion for transmitting the RACH preamble or the payload preparation time gap not providing sufficient margin for the UE to transmit the RACH payload in the occasion for transmitting the RACH payload.

A method of wireless communication by a base station is described. The method may include transmitting, via a control channel, an order message instructing a UE to perform a RACH procedure, selecting to perform a first RACH procedure or a second RACH procedure based on a preamble preparation time gap between the order message and a first occasion for receiving a RACH preamble, or a payload preparation time gap between the order message and an occasion for receiving a RACH payload, or both, and monitoring for the RACH preamble during the first occasion for receiving the RACH preamble or a second occasion for receiving the RACH preamble based on the selected RACH procedure.

An apparatus for wireless communication by a base station is described. The apparatus may include a processor, memory in electronic communication with the processor, and instructions stored in the memory. The instructions may be executable by the processor to cause the apparatus to transmit, via a control channel, an order message instructing a UE to perform a RACH procedure, select to perform a first RACH procedure or a second RACH procedure based on a preamble preparation time gap between the order message and a first occasion for receiving a RACH preamble, or a payload preparation time gap between the order message and an occasion for receiving a RACH payload, or both, and monitor for the RACH preamble during the first occasion for receiving the RACH preamble or a second occasion for receiving the RACH preamble based on the selected RACH procedure.

Another apparatus for wireless communication by a base station is described. The apparatus may include means for transmitting, via a control channel, an order message instructing a UE to perform a RACH procedure, selecting to perform a first RACH procedure or a second RACH procedure based on a preamble preparation time gap between the order message and a first occasion for receiving a RACH preamble, or a payload preparation time gap between the order message and an occasion for receiving a RACH payload, or both, and monitoring for the RACH preamble during the first occasion for receiving the RACH preamble or a second occasion for receiving the RACH preamble based on the selected RACH procedure.

A non-transitory computer-readable medium storing code for wireless communication by a base station is described. The code may include instructions executable by a processor to transmit, via a control channel, an order message instructing a UE to perform a RACH procedure, select to perform a first RACH procedure or a second RACH procedure based on a preamble preparation time gap between the order message and a first occasion for receiving a RACH preamble, or a payload preparation time gap between the order message and an occasion for receiving a RACH payload, or both, and monitor for the RACH preamble during the first occasion for receiving the RACH preamble or a second occasion for receiving the RACH preamble based on the selected RACH procedure.

In some examples of the method, apparatuses, and non-transitory computer-readable medium described herein, monitoring for the RACH preamble further may include operations, features, means, or instructions for receiving the RACH preamble during the first occasion for receiving the RACH preamble or during the second occasion for receiving the RACH preamble based on whether the first RACH procedure or the second RACH procedure was selected. Some examples of the method, apparatuses, and non-transitory computer-readable medium described herein may further include operations, features, means, or instructions for receiving the RACH preamble during the first occasion for receiving the RACH preamble or the second occasion for receiving the RACH preamble may be further based on the preamble preparation time gap, the payload preparation time gap, or both. Some examples of the method, apparatuses, and non-transitory computer-readable medium described herein may further include operations, features, means, or instructions for determining the preamble preparation time gap, the payload preparation time gap, or both.

In some examples of the method, apparatuses, and non-transitory computer-readable medium described herein, selecting to perform the first RACH procedure or the second RACH procedure further may include operations, features, means, or instructions for selecting to perform the first RACH procedure based on the preamble preparation time gap satisfying a preamble preparation threshold and the preamble preparation time gap satisfying a payload preparation threshold. Some examples of the method, apparatuses, and non-transitory computer-readable medium described herein may further include operations, features, means, or instructions for transmitting a threshold indicator that indicates the preamble preparation threshold, the payload preparation threshold, or both. Some examples of the method, apparatuses, and non-transitory computer-readable medium described herein may further include operations, features, means, or instructions for receiving a capability indicator, where the threshold indicator may be based on the capability indicator.

In some examples of the method, apparatuses, and non-transitory computer-readable medium described herein, transmitting the threshold indicator further may include operations, features, means, or instructions for transmitting the threshold indicator in a medium access control (MAC) control element (CE), in DCI, or RRC signaling, remaining minimum system information, other system information, handover report or any combination thereof. In some examples of the method, apparatuses, and non-transitory computer-readable medium described herein, selecting to perform the first RACH procedure or the second RACH procedure further may include operations, features, means, or instructions for selecting to perform the second RACH procedure based on the preamble preparation time gap not satisfying a preamble preparation threshold.

In some examples of the method, apparatuses, and non-transitory computer-readable medium described herein, first respective time gaps between the control channel conveying the order message and each of the first occasion for receiving the RACH preamble and the occasion for receiving the RACH payload differ from second respective time gaps between the control channel conveying the order message and each of the second occasion for receiving the RACH preamble and a second occasion for receiving the RACH payload.

In some examples of the method, apparatuses, and non-transitory computer-readable medium described herein, the first occasion for receiving the RACH preamble and the occasion for receiving the RACH payload occur consecutively in time, and where selecting to perform the first RACH procedure or the second RACH procedure further may include operations, features, means, or instructions for selecting to perform the first RACH procedure based on the preamble preparation time gap satisfying a preamble preparation threshold.

Some examples of the method, apparatuses, and non-transitory computer-readable medium described herein may further include operations, features, means, or instructions for identifying a synchronization signal block or a RACH resource that corresponds to in which of the first occasion or the second occasion for receiving the RACH preamble that the RACH preamble may be received, and transmitting a RACH response using a transmit beam corresponding to the synchronization signal block or the RACH resource.

In some examples of the method, apparatuses, and non-transitory computer-readable medium described herein, an association period may include operations, features, means, or instructions for identifying a synchronization signal block or a RACH resource that corresponds to an occasion of the set of occasions for receiving the RACH preamble in which the RACH preamble may be received, and transmitting a RACH response using a transmit beam corresponding to the synchronization signal block or the RACH resource.

In some examples of the method, apparatuses, and non-transitory computer-readable medium described herein, the association period occurs after a first association period that includes the first occasion for receiving the RACH preamble. In some examples of the method, apparatuses, and non-transitory computer-readable medium described herein, the first RACH procedure may be a two-step RACH procedure, and the second RACH procedure may be a four-step RACH procedure.

Some examples of the method, apparatuses, and non-transitory computer-readable medium described herein may further include operations, features, means, or instructions for determining a second preamble preparation time gap between an end of a response window for transmitting a RACH response and another occasion for receiving the RACH preamble, and determining a second payload preparation time gap between an end of the response window and another occasion for receiving the RACH payload.

Some examples of the method, apparatuses, and non-transitory computer-readable medium described herein may further include operations, features, means, or instructions for monitoring for, in accordance with the first RACH procedure, a retransmission of the RACH preamble in the other occasion for receiving the RACH preamble and the RACH payload in the other occasion for receiving the RACH payload based on the second preamble preparation time gap satisfying a preamble preparation threshold and the second payload preparation time gap satisfying a payload preparation threshold.

Some examples of the method, apparatuses, and non-transitory computer-readable medium described herein may further include operations, features, means, or instructions for monitoring for, in accordance with the second RACH procedure, a retransmission of the RACH preamble in the other occasion for receiving the RACH preamble and the RACH payload in the other occasion for receiving the RACH payload that occurs after the occasion for receiving the RACH payload based on the second preamble preparation time gap satisfying a preamble preparation threshold and the second payload preparation time gap not satisfying a payload preparation threshold.

Some examples of the method, apparatuses, and non-transitory computer-readable medium described herein may further include operations, features, means, or instructions for determining that a RACH response was not received within a response window in accordance with the first RACH procedure, determining a second preamble preparation time gap between an end of a response window for a RACH response and the other occasion for receiving the RACH preamble, where the other occasion for receiving the RACH preamble and the other occasion for receiving the RACH payload occur consecutively in time, and monitoring for, in accordance with the first RACH procedure, a retransmission of the RACH preamble in the other occasion for receiving the RACH preamble and in the RACH payload in the other occasion for receiving the RACH payload based on the second preamble preparation time gap satisfying a preamble preparation threshold.

In some examples of the method, apparatuses, and non-transitory computer-readable medium described herein, a first time gap between the first occasion for receiving the RACH preamble and the occasion for receiving the RACH payload differs from a second time gap between the other occasion for receiving the RACH preamble and the other occasion for receiving the RACH payload.

Some examples of the method, apparatuses, and non-transitory computer-readable medium described herein may further include operations, features, means, or instructions for identifying a receive beam corresponding to a synchronization signal block or a RACH resource of the other occasion for receiving the RACH preamble, and monitoring for, in accordance with the first RACH procedure, a retransmission of the RACH preamble in the other occasion for receiving the RACH preamble using the receive beam based on the second preamble preparation time gap satisfying a preamble preparation threshold and the second payload preparation time gap satisfying a payload preparation threshold.

In some examples of the method, apparatuses, and non-transitory computer-readable medium described herein, an association period may include operations, features, means, or instructions for selecting a RACH resource that satisfies a received power threshold for selecting a synchronization signal block, where the second or the other occasion for receiving the RACH preamble corresponds to the selected RACH resource.

Some examples of the method, apparatuses, and non-transitory computer-readable medium described herein may further include operations, features, means, or instructions for determining a second preamble preparation time gap between the first occasion for receiving the RACH preamble and a response window for transmitting a RACH response, determining a second payload preparation time gap between another occasion for receiving the RACH payload and the response window, and transmitting a RACH response within the response window in accordance with the selected RACH procedure based on the second preamble preparation time gap satisfying a preamble preparation threshold and the second payload preparation time gap not satisfying a payload preparation threshold.

In some examples of the method, apparatuses, and non-transitory computer-readable medium described herein, monitoring for the RACH preamble during the first occasion or the second occasion further may include operations, features, means, or instructions for monitoring for a frequency division multiplexed transmission of the RACH preamble and the RACH payload during the first occasion or the second occasion for receiving the RACH preamble, determining a second preamble preparation time gap between the first occasion or the second occasion for receiving the RACH preamble and a response window for transmitting a RACH response, and transmitting a RACH response within the response window in accordance with the selected RACH procedure based on the second preamble preparation time gap satisfying a preamble preparation threshold.

Some examples of the method, apparatuses, and non-transitory computer-readable medium described herein may further include operations, features, means, or instructions for receiving the RACH payload during the occasion for receiving the RACH payload in accordance with the selected RACH procedure, determining a second preamble preparation time gap between an end of receiving the RACH payload and a response window for transmitting a RACH response, and transmitting the RACH response in the response window based on the second preamble preparation time gap satisfying a preamble preparation threshold.

Some examples of the method, apparatuses, and non-transitory computer-readable medium described herein may further include operations, features, means, or instructions for receiving, in accordance with the selected RACH procedure, the RACH payload during the occasion for receiving the RACH payload within a transmission window, determining a second preamble preparation time gap between an end of the transmission window and a response window, the end of the transmission window corresponding to a last of a set of RACH payload occasions within the transmission window, and transmitting a RACH response in the response window based on the second preamble preparation time gap satisfying a preamble preparation threshold.

Some examples of the method, apparatuses, and non-transitory computer-readable medium described herein may further include operations, features, means, or instructions for determining a second preamble preparation time gap between a RACH response occasion and a contention resolution occasion within a response window, and transmitting a RACH response in the response window based on the second preamble preparation time gap satisfying a preamble preparation threshold.

DETAILED DESCRIPTION

Figure 1:
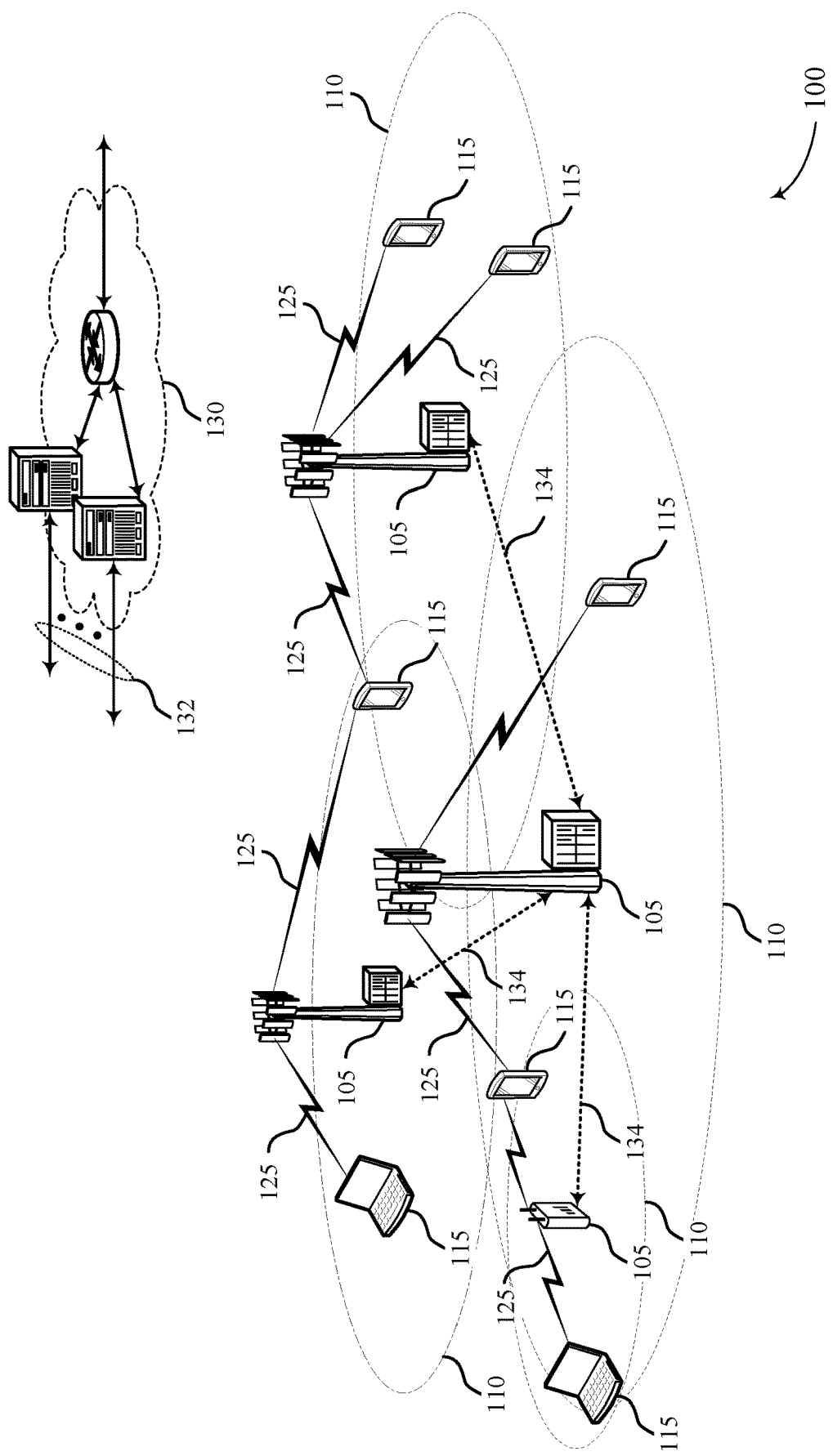
FIG. 1 illustrates an example of a system for wireless communications that supports a random access channel procedure selection scheme in accordance with aspects of the present disclosure.

Generally, the described techniques provide for a wireless device in a mobile wireless network performing a contention-based random access procedure. In some wireless communication systems, a user equipment (UE) and a base station may establish communication using a random access procedure. For instance, the random access procedure may include a series of handshake messages between the UE and the base station. In some examples, random access procedures may be used when a UE has data to transmit, but does not have uplink resources assigned. In other examples, random access procedures may be used when the UE is handed over from a source base station to a target base station. In any event, the random access procedures may enable the UE to synchronize with the network and communicate with the base station.

The described techniques relate to wireless devices (e.g., user equipment (UE), base station, etc.) in a wireless cellular network determining at least one time gap and determining whether the at least one time gap satisfies a set time gap constraint. In some cases, a wireless device may dynamically select between a two-step random access procedure and a four-step random access procedure based on the determination of whether the at least one time gap satisfies the set time gap constraint. In some cases, a wireless device may select the two-step random access procedure and then determine whether to send a message during a first occasion or a second occasion of the two-step random access procedure.

The present techniques relate to a wireless device dynamically selecting a random access procedure based on one or more determined time gaps. In some cases, a wireless device may have a limited amount of time within which the wireless device is to prepare a transmission and ensure the transmission is received by another wireless device. In one example, a UE or a base station may verify whether the UE has enough time to receive and decode a message (e.g., a downlink (DL) transmission, etc.) based on the one or more determined time gaps. In some cases, the UE or base station may verify whether the UE has enough time to transmit a message (e.g., an uplink (UL) transmission) based on the one or more determined time gaps. In some examples, the UE or base station may verify whether the UE has enough time to receive and decode a message and transmit an uplink transmission based on the one or more determined time gaps. In some cases, the UE or base station may compare a determined time gap to a minimum gap threshold. In some cases, the UE or base station may confirm that the UE has sufficient time to receive and decode one or more messages and/or transmit one or more messages based on an outcome of the comparison (e.g., the outcome indicates sufficient time to receive, as well as decode or transmit, or decode and transmit, one or more messages, etc.).

In some cases, the UE or base station may determine whether to use a two-step random access procedure or a four-step random access procedure based on an outcome of the comparison. For example, the UE or base station may select a two-step random access procedure when the comparison indicates a determined time gap satisfies a time gap constraint, but may select a four-step random access procedure when the comparison indicates the determined time gap fails to satisfy the time gap constraint. In some examples, the UE or base station may determine whether to transmit one or more messages in a first occasion of a two-step random access procedure or to transmit the one or more messages in a second occasion of the two-step random access procedure (e.g., a second occasion subsequent to the first occasion) based on an outcome of the comparison. For example, the UE or base station may transmit the one or more messages in the first occasion when the determined time gap satisfies a time gap constraint, but may transmit the one or more messages in the second occasion when the determined time gap fails to satisfy the time gap constraint.

Aspects of the disclosure are initially described in the context of a wireless communications system. Aspects of the disclosure are further illustrated by and described with reference to process flows of wireless communications systems and timeline graphs indicating various timelines of random access procedures. Aspects of the disclosure are further illustrated by and described with reference to apparatus diagrams, system diagrams, and flowcharts that relate to a random access channel procedure selection scheme.

FIG. 1 illustrates an example of a wireless communications system 100 that supports a random access channel procedure selection scheme in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 interface, N2 interface, N3 interface, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception, or transmission and reception, by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115, or both, that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, a physical uplink control channel (PUCCH) may be mapped to a control channel defined by a code and two consecutive resource blocks. Uplink control signaling may depend on the presence of timing synchronization for a cell. PUCCH resources for scheduling request (SR) and channel quality indicator (CQI) reporting may be assigned (and revoked) through RRC signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

In some examples, PDCCH carries downlink control information (DCI) in control channel elements (CCEs), which may include nine logically contiguous resource element groups (REGs), where each REG contains 4 resource elements (REs). DCI includes information regarding DL scheduling assignments, uplink resource grants, transmission scheme, uplink power control, hybrid automatic repeat request (HARQ) information, a modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI may include additional signaling information. DCI size and format depend on the amount of information as well as factors such as bandwidth, the number of antenna ports, and duplexing mode.

In some examples, a physical downlink control channel (PDCCH) may carry DCI messages associated with multiple users, and each UE 115 may decode the DCI messages that are intended for it. For example, each UE 115 may be assigned a cell radio network temporary identifier (C-RNTI) and cyclical redundancy check CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful. In some cases, HARQ feedback may be transmitted in response to a received PDCCH.

In some examples, a UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, or SSS, or broadcast information (e.g., a physical broadcast channel (PBCH)), or any combination thereof, may be transmitted within different synchronization signal (SS) blocks on respective directional beams, where one or more SS blocks may be included within an SS burst.

In some examples, after receiving the PSS and SSS, the UE 115 may receive a master information block (MIB), which may be transmitted in the PBCH. The MIB may contain system bandwidth information, a system frame number (SFN), and a physical channel HARQ indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

In some examples, after completing initial cell synchronization, a UE 115 may decode the MIB, SIB1 and SIB2 prior to accessing the network. The MIB may be transmitted on PBCH and may utilize the first 4 orthogonal frequency-division multiple access (OFDMA) symbols of the second slot of the first subframe of each radio frame. It may use the middle 6 resource blocks (RBs; e.g., 72 subcarriers) in the frequency domain. The MIB carries a few pieces of information for UE initial access, including: DL channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

In some examples, after reading a MIB (either a new version or a copy), the UE 115 may can try different phases of a scrambling code until it gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames.

In some examples, after the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary C-RNTI. The UE 115 may then transmit an RRC connection request along with a temporary mobile subscriber identity (TMSI) (e.g., when the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may participate in a two-step RACH procedure to reduce delay in establishing communication with a base station 105 (e.g., as compared to a four-step RACH procedure). In some cases, the two-step RACH procedure may operate regardless of whether a wireless device (e.g., a UE 115) has a valid timing advance (TA). For example, a UE 115 may use a valid TA to coordinate the timing of its transmissions to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure.

In one example, a first RACH message (e.g., message A), sent from a UE 115 to a base station 105, may combine the contents of a RACH message 1 and message 3 from four-step RACH. Additionally, message A may include a RACH preamble and a physical uplink shared channel (PUSCH) carrying a payload with the contents of the message (e.g., equivalent to message 3), where the preamble and the payload may be transmitted on separate waveforms. In some cases, the base station 105 may transmit a downlink control channel (e.g., PDCCH) and a corresponding second RACH message (e.g., message B) to the UE 115, where message B may combine the equivalent contents of a RACH message 2 and message 4 from four-step RACH. In some examples of two-step RACH, a base station 105 may transmit message B using either broadcast methods (e.g., targeting multiple UEs 115) or unicast methods (e.g., targeting a specific UE 115).

The present techniques may provide for wireless communication by a base station. In some examples, the base station may be configured to transmit, via a control channel, an order message instructing a user equipment (UE) to perform a random access channel (RACH) procedure. In some cases, the base station may determine a preamble preparation time gap between the order message and a first RACH preamble occasion, a payload preparation time gap between the order message and a RACH payload occasion, or both. In some cases, the base station may select to perform a first RACH procedure or a second RACH procedure based at least in part on the preamble preparation time gap (e.g., the preamble preparation time gap satisfying a first time gap constraint (such as a preamble preparation threshold, for example), etc.), the payload preparation time gap (e.g., the payload preparation time gap satisfying a second time gap constraint (such as a payload preparation threshold, for example), etc.), or both. In some cases, the base station may monitor for a RACH preamble during the first RACH preamble occasion or a second RACH preamble occasion based at least in part on the selected RACH procedure, the preamble preparation time gap (e.g., associated with the first RACH preamble occasion), and the payload preparation time gap.

The present techniques may provide for wireless communication by a UE. In some cases, the UE may be configured to receive, via a control channel (e.g., a control channel from a base station), an order message instructing the UE to perform a RACH procedure. In some cases, the UE may determine a preamble preparation time gap between the order message and a first RACH occasion, a payload preparation time gap between the order message and a RACH payload occasion, or both. In some examples, the UE may select to perform a first RACH procedure or a second RACH procedure based at least in part on the preamble preparation time gap (e.g., the preamble preparation time gap satisfying a first time gap constraint, etc.), the payload preparation time gap (e.g., the payload preparation time gap satisfying a second time gap constraint, etc.), or both. In some cases, the UE may transmit a RACH preamble during a first RACH preamble occasion or a second RACH preamble occasion based at least in part on the selected RACH procedure, the preamble preparation time gap, and the payload preparation time gap.

Figure 2:
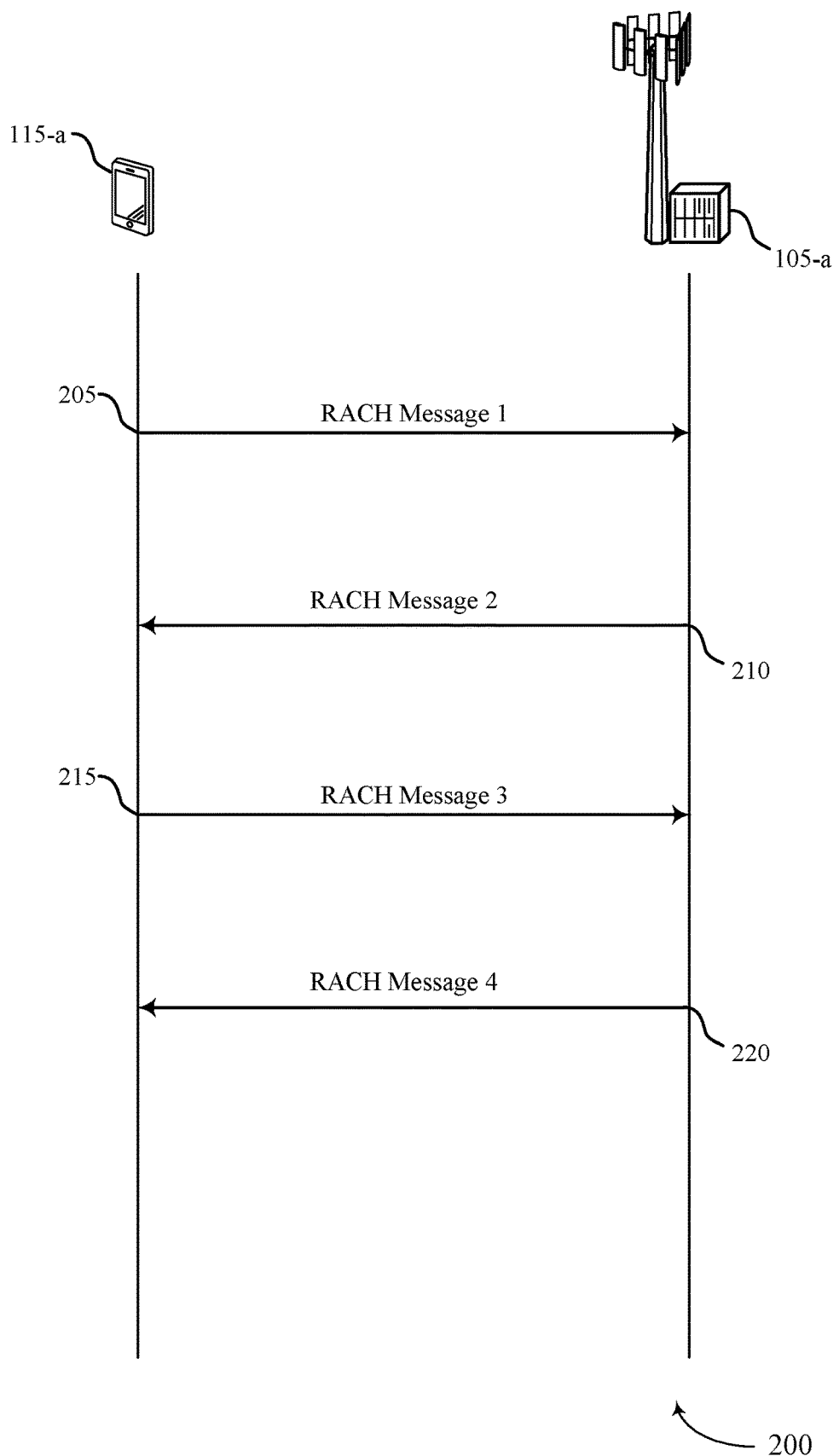
FIG. 2 illustrates an example of a wireless communications system that supports a random access channel procedure selection scheme in accordance with aspects of the present disclosure.

FIG. 2 illustrates an example of a wireless communications system 200 that supports a random access channel procedure selection scheme in accordance with aspects of the present disclosure. In some examples, wireless communications system 200 may implement aspects of wireless communication system 100.

As illustrated, wireless communications system 200 may include one or more UEs and one or more base stations, which may be examples of a UE 115 or a base station 105, respectively, as described herein with reference to FIG. 1. For example, wireless communications system 200 may include UE 115-*a* and base station 105-*a*. Wireless communications system 200 may also include RACH messages between UE 115-*a* and base station 105-*a*. In some cases, Wireless communications system 200 may establish a communication link between UE 115-*a* and base station 105-*a* using a four-step RACH procedure. In such cases, UE 115-*a* may transmit at least two RACH messages (e.g., RACH message 1 and RACH message 3) and base station 105-*a* may transmit at least two RACH messages (e.g., RACH message 2 and RACH message 4).

At 205, UE 115-*a* may initiate a RACH procedure by transmitting RACH message 1. In some cases, RACH message 1 may include a RACH preamble. In one example, the RACH preamble may carry a random access radio network temporary identifier (RA-RNTI). As shown, UE 115-*a* may transmit RACH message 1 to base station 105-*a*.

In some cases, base station 105-*a* may receive RACH message 1 at step 205. Base station 105-*a* may decode RACH message 1 (e.g., a RACH preamble) and may obtain the RA-RNTI after decoding RACH message 1. In some cases, the RA-RNTI may be calculated from a resource used to transmit the RACH preamble. For instance, base station 105-*a* may utilize the time and frequency allocation of the preamble resource to calculate the RA-RNTI.

At 210, Base station 105-*a* may also transmit RACH message 2. RACH message 2 may include a RACH preamble response. The RACH preamble response may include information for UE 115-*a*. For example, the RACH preamble response may include an uplink grant to UE 115-*a*, a temporary cell radio network temporary identifier (TC-RNTI), a resource block (RB) assignment, a modulation coding scheme (MCS) configuration, and the like. Additionally, base station 105-*a* may configure itself to receive RACH message 3 using the information included in RACH message 2.

At 215, UE 115-*a* may receive RACH message 2 and may transmit RACH message 3. UE 115-*a* may decode RACH message 2 (e.g., RACH preamble response) and obtain the information included in RACH message 2. The included information may enable UE 115-*a* to transmit RACH message 3. For instance, UE 115-*a* may utilize the received TC-RNTI and uplink grant to transmit a corresponding RACH message 3. RACH message 3 may include a radio resource configuration (RRC) connection request.

At 220, base station 105-*a* may receive RACH message 3. Base station 105-*a* may decode RACH message 3 and generate RACH message 4 using the received information (e.g., RRC connection request). RACH message 4 may include an RRC connection setup corresponding to UE 115-*a* (e.g., the RRC connection setup may be associated with a TC-RNTI of UE 115-*a*). RACH message 4 may also include a cell radio network temporary identifier (CRNTI) for future communication with UE 115-*a*. For instance, after RACH message 4, UE 115-a and base station 105-a may communicate using the CRNTI.

In some cases, devices in wireless communications system 200 (e.g., UE 115-a or base station 105-a, or both) may identify one or more time gaps between RACH messages. For example, UE 115-a may identify a time gap between RACH message 2 and RACH message 3. The time gap may be between the last symbol of a physical downlink shared channel (PDSCH) reception (e.g., a PDSCH from base station 105-a to UE 115-a conveying a re-authentication request (RAR) message with a RAR uplink grant) and the first symbol of a corresponding PUSCH transmission (e.g., scheduled by the RAR uplink grant). In some cases, the identified time gap may be represented by the following equation:

$$\text{time gap} = N_{T,1} + N_{T,2} + 0.5 \text{ ms}$$

In the above equation, $N_{T,1}$ may be a time duration of $N_1$ symbols corresponding to a PDSCH reception time for processing capability of UE 115-a (e.g., UE processing capability 1 or UE processing capability 2 as shown in tables 1 and 2). For instance, $N_{T,1}$ may be a value associated with UE processing capability 1 when an additional PDSCH demodulation reference signal (DMRS) is configured. Some examples of values for the $N_1$ symbols are shown herein in table 1 and table 2.

Additionally, $N_{T,2}$ may be a time duration of $N_2$ symbols corresponding to a PUSCH preparation time for a processing capability of UE 115-a (e.g., UE processing capability 1 and UE processing capability 2). Some examples of possible values of $N_2$ are shown in tables 3 and 4.

In some cases, UE 115-a may determine values for $N_{T,1}$ and $N_{T,2}$ to determine a threshold time gap. For instance, UE 115-a may determine values for $N_{T,1}$ and $N_{T,2}$ such that the values correspond to the smaller of the subcarrier spacing (SCS) configurations shown in tables 1-4. For example, UE 115-a may determine that no additional PDSCH DMRS is configured with UE processing capability 1 and may determine a threshold time gap when $N_{T,1}$ is 8 symbols and $N_{T,2}$ is 10 symbols (e.g., from μ=0 row of tables 1 and 3).

TABLE 1

PDSCH processing time for PDSCH processing capability 1

| | PDSCH decoding time N1 [symbols] | |
|---|---|---|
| μ | No Additional DMRS Configured | Additional DMRS Configured |
| 0 | 8 | 13 |
| 1 | 10 | 13 |
| 2 | 17 | 20 |
| 3 | 20 | 24 |

TABLE 2

PDSCH processing time for PDSCH processing capability 2

| | PDSCH decoding time N1 [symbols] | |
|---|---|---|
| μ | No Additional DMRS Configured | Additional DMRS Configured |
| 0 | 3 | 13 |
| 1 | 4.5 | 13 |
| 2 | 9 for frequency range 1 | 20 |

TABLE 3

PUSCH preparation time for PUSCH timing capability 1

| μ | N2 [symbols] |
|---|---|
| 0 | 10 |
| 1 | 12 |
| 2 | 23 |
| 3 | 36 |

TABLE 4

PUSCH preparation time for PUSCH timing capability 2

| μ | N2 [symbols] |
|---|---|
| 0 | 5 |
| 1 | 5.5 |
| 2 | 11 for frequency range 1 |

Devices in wireless communications system 200 (e.g., UE 115-a or base station 105-a, or both) may also determine a time gap between RACH message 4 and a feedback message for RACH message 4 (e.g., HARQ-ACK feedback).

In some cases, UE 115-a may not be provided with the C-RNTI before transmitting a PUSCH transmission (e.g., a PUSCH transmission scheduled by a RAR uplink grant). In such cases, UE 115-a may attempt to detect a downlink control information (DCI) format 1_0 with a cyclic redundancy check (CRC) scrambled by a corresponding TC-RNTI (e.g., DCI format scheduling a PDSCH that includes a UE contention resolution identity). The UE may transmit HARQ-ACK feedback in a PUCCH transmission (e.g., in response to the PDSCH transmission including the UE contention resolution identity). In some cases, the PUCCH transmission may be within the same active uplink bandwidth part (BWP) as the PUSCH transmission. The base station may transmit the PDSCH transmission and expect to receive the PUCCH transmission with the HARQ-ACK feedback after a time gap. In one example, the time gap may be represented by the following equation:

$$\text{time gap} = N_{T,1} + 0.5 \text{ ms}$$

Figure 3:
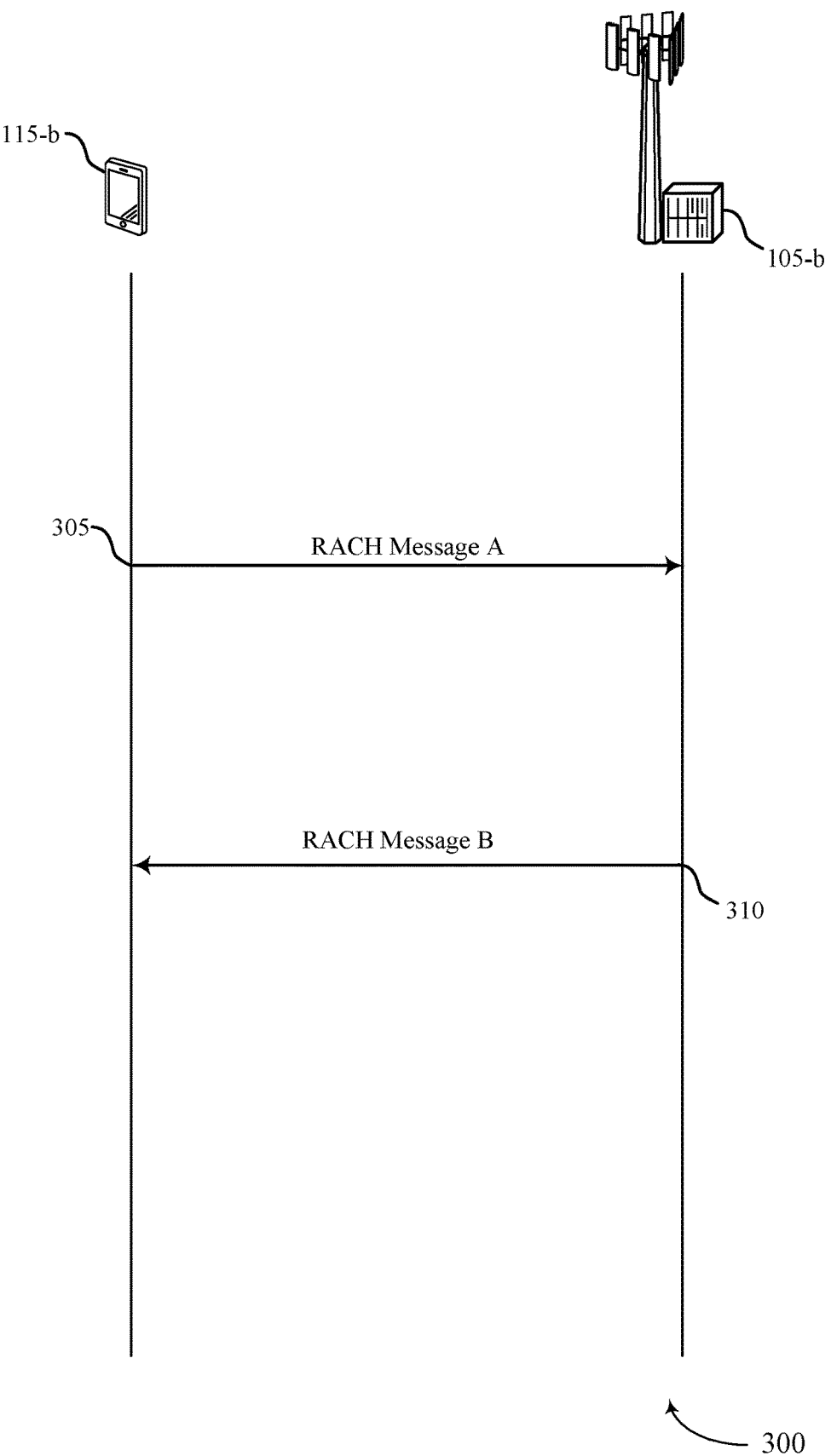
FIG. 3 illustrates an example of a wireless communications system that supports a random access channel procedure selection scheme in accordance with aspects of the present disclosure.

FIG. 3 illustrates an example of a wireless communications system 300 that supports a random access channel procedure selection scheme in accordance with aspects of the present disclosure. In some examples, wireless communications system 300 may implement aspects of wireless communication system 100.

As illustrated, wireless communications system 300 may include one or more UEs and one or more base stations, which may be examples of a UE 115 or a base station 105, respectively, as described herein with reference to FIG. 1. For example, wireless communications system 200 may include UE 115-b and base station 105-b. Wireless communications system 200 may also include RACH messages between UE 115-b and base station 105-b. In some cases, wireless communications system 200 may establish communications between UE 115-b and base station 105-b using a two-step RACH procedure. In such cases, UE 115-b may transmit a first RACH message (e.g., RACH message A) and base station 105-b may transmit a second RACH message (e.g., RACH message B).

In some cases, wireless devices (e.g., including UE 115-b and base station 105-b) operating in licensed or unlicensed spectrum within wireless communications system 300 may participate in a two-step RACH procedure to reduce delay (e.g., when performing listen before talk (LBT) procedures, etc.) compared to a four-step RACH procedure. In some cases, the two-step RACH procedure may operate regardless of whether or not a wireless device (e.g., UE 115-*b*) has a valid timing advance (TA). In one example, UE 115-*b* may have a valid TA to coordinate the timing of its transmissions to base station 105-*b* (e.g., to account for propagation delay) and may receive the valid TA as part of the indicated two-step RACH procedure. Additionally, the two-step RACH procedure may be applicable to any cell size, may work regardless of whether the RACH procedure is contention-based or contention-free, and may combine two or more RACH messages from a four-step RACH procedure into a single message.

In one example, a first RACH message (e.g., RACH message A), sent from UE 115-*b* to base station 105-*b*, may combine the contents of a RACH message 1 and message 3 from a four-step RACH procedure (e.g., the four-step RACH procedure of FIG. 2). In some cases, RACH message A may include a RACH preamble (e.g., RACH message 1 205 from FIG. 2) and a physical uplink shared channel (PUSCH) carrying a payload with the contents of the message (e.g., RACH message 3 215 from FIG. 2). In some cases, the preamble and the payload of RACH message A may be transmitted on separate waveforms.

In some cases, base station 105-*b* may transmit a downlink control channel (e.g., PDCCH) and a corresponding second RACH message (e.g., RACH message B) to UE 115-*b*, where RACH message B may combine the equivalent contents of a RACH message 2 and message 4 from four-step RACH (e.g., RACH message 2 210 and RACH message 4 220 of FIG. 2). In some examples of two-step RACH, base station 105-*b* may transmit message B using either broadcast methods (e.g., targeting multiple UEs including UE 115-*b*) or unicast methods (e.g., targeting one or more specific UEs such as at least UE 115-*b*).

At 305, UE 115-*b* may initiate a RACH procedure and transmit RACH message A to base station 105-*b*. As indicated, RACH message A may include a preamble portion (e.g., a RACH preamble as described in FIG. 2) and a payload portion (e.g., PUSCH payload).

In some cases, base station 105-*b* may receive RACH message A at 305 and subsequently transmit RACH message B at 310. RACH message B may include multiple portions or information, or both. For example, RACH message B may include a preamble response portion, a contention resolution portion, a radio resource control (RRC) connection setup message, or a combination thereof. The second message may also include other information provided by base station 105-*b* to UE 115-*b*, such as timing advance information.

In some cases, UE 115-*b* or base station 105-*b*, or both, may be configured to determine time gaps associated with RACH message A or RACH message B, or both. In such cases, the time gaps may be used to determine whether to proceed with a two-step RACH procedure or a four-step RACH procedure.

Figure 4:
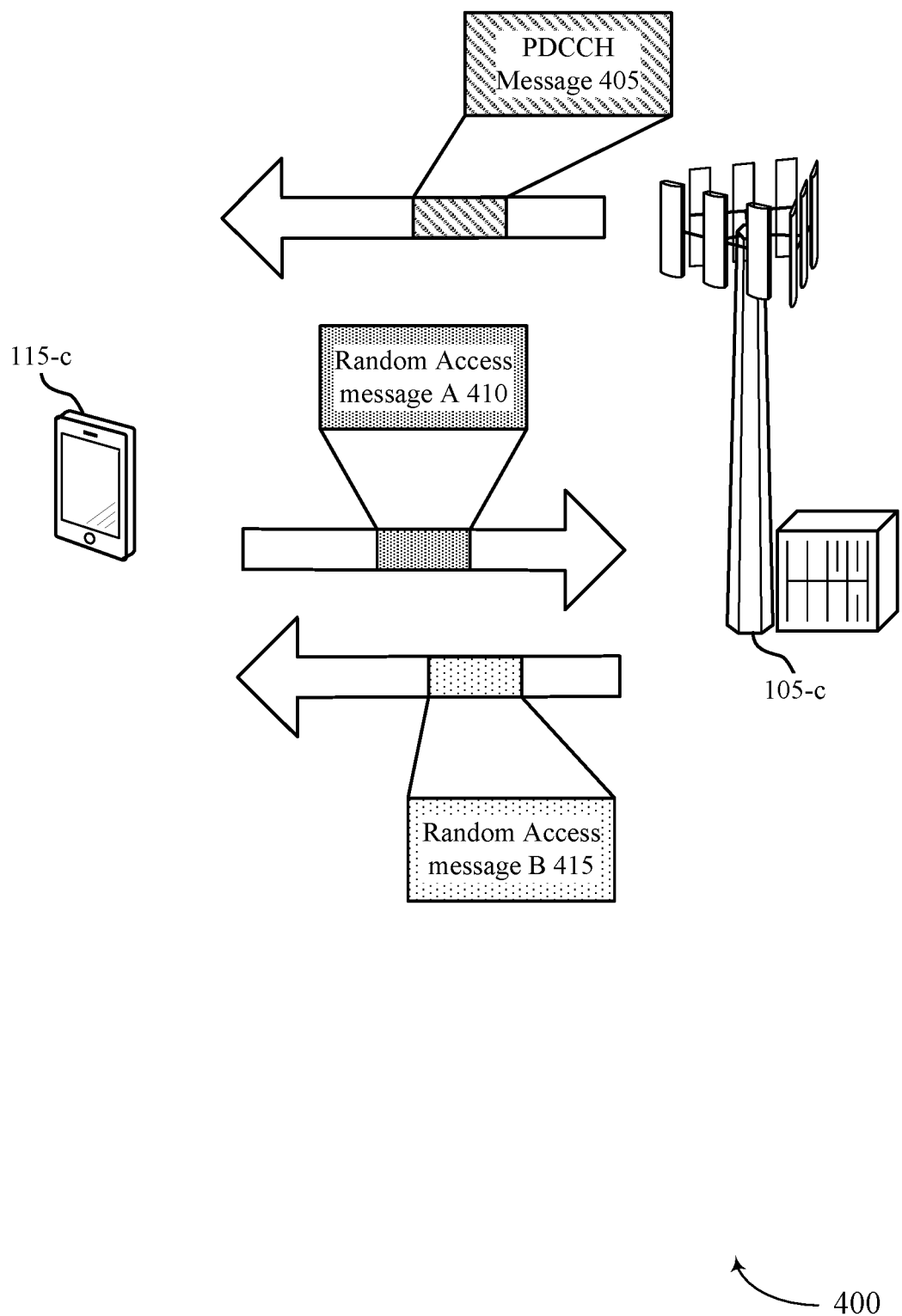
FIG. 4 illustrates an example of a wireless communications system that supports a random access channel procedure selection scheme in accordance with aspects of the present disclosure.

FIG. 4 illustrates an example of a wireless communications system 400 that supports a random access channel procedure selection scheme in accordance with aspects of the present disclosure. In some examples, wireless communications system 400 may implement aspects of wireless communication system 100.

As illustrated, wireless communications system 400 may include one or more UEs 115 and base station 105, which may be examples of a UE 115 and a base station 105, respectively, as described herein with reference to FIG. 1.

For example, wireless communications system 400 may include UE 115-*c* and base station 105-*c*.

In some examples, wireless communications system 400 may include PDCCH message 405. As shown, base station 105-*c* may send PDCCH message 405. In some cases, PDCCH message 405 may indicate DCI. In some cases, DCI may include at least one of information regarding downlink scheduling assignments, uplink resource grants, a transmission scheme, uplink power control, HARQ information, a modulation and coding scheme (MCS), other types of information from base station 105-*c*, or any combination thereof.

In some examples, wireless communications system 400 may include one or more random access messages (e.g., random access message A 410) from at least UE 115-*c*. In some cases, wireless communications system 400 may include one or more random access response messages from base station 105-*c* (e.g., random access message B 415). In some cases, random access message A 410 and random access message B 415 may be part of a two-step RACH procedure. For instance, UE 115-*c* may transmit random access message A 410 to convey control information or data information, or control information and data information, to base station 105-*c*. Further, base station 105-*c* may transmit random access message B 415 to convey control information or data information, or both, to one or more UEs 115 (e.g., UE 115-*c*).

In some cases, each transmission in a two-step RACH procedure may include multiple waveforms that convey information between devices. For example, an uplink transmission from UE 115-*c* (e.g., Random Access message A 410) may include a preamble (e.g., a RACH preamble). In some cases, Random Access message A 410 may also include a payload (e.g., a PUSCH payload).

In some examples, a downlink transmission from base station 105-*c* may include various information conveyed to one or more UEs 115. For example, base station 105-*c* may transmit Random Access message B 415 to UE 115-*c*. Random Access message B 415 may include at least one of a preamble response portion, a contention resolution portion, an RRC connection setup message, or a combination thereof. The second message may also include other information provided by base station 105-*a* to the UEs 115, such as timing advance (TA) information.

In some examples, UE 115-*c* may receive from base station 105-*c*, via a control channel (e.g., PDCCH), an order message (e.g., a RACH order in PDCCH message 405) instructing UE 115-*c* to perform a RACH procedure. In some cases, UE 115-*c* may determine one or more preparation time gaps. In one example, UE 115-*c* may determine a preamble preparation time gap between the order message and a first occasion for transmitting a RACH preamble. In some cases, UE 115-*c* may select to perform a first random access channel procedure (e.g., two-step RACH) or a second random access channel procedure (e.g., four-step RACH) based at least in part on the one or more determined preparation time gaps. In some cases, the UE may transmit a RACH preamble during the first RACH preamble occasion or a second RACH preamble occasion based at least in part on the selected random access channel procedure and the preamble preparation time gap.

In some cases, UE 115-*c* or base station 105-*c*, or both, may determine whether UE 115-*c* has sufficient time to receive and decode a DL transmission or transmit a UL transmission, or enough time to receive and decode a DL transmission and transmit a UL transmission. In some cases, UE 115-*c* or base station 105-*c*, or both, may compare a determined preparation time gap to a minimum preparation threshold (e.g., compare a preamble preparation time gap to a preamble preparation threshold, compare a payload preparation time gap to a payload preparation threshold, etc.), to confirm that UE 115-c has sufficient time to perform a random access procedure (e.g., a two-step RACH procedure, etc.) by the time one or more occasions arrive (e.g., confirming that the UE has sufficient time to perform a two-step RACH procedure by the time of a nearest (e.g., first) RACH preamble occasion or a nearest RACH payload occasion, or by the time of a nearest (e.g., first) RACH preamble occasion and a nearest RACH payload occasion).

In some examples, UE 115-c may perform a two-step RACH procedure when the comparison indicates UE 115-c has sufficient time. Conversely, when the comparison indicates UE 115-c does not have sufficient time to perform a two-step RACH procedure, UE 115-c may either fall back to a four-step RACH procedure instead of the two-step RACH procedure, or UE 115-c may wait until a next association period to perform a two-step RACH procedure. Although the term "preparation" is used herein, it is understood that the preamble or payload preparation time gaps, or both, are used descriptively (e.g., only descriptively) and do not require that UE 115 actually perform processing or other preparation for transmitting either of the RACH preamble or the RACH payload. In fact, as explained further elsewhere herein, if the preamble or payload preparation time gap, or both, is not sufficient to enable a UE to transmit a RACH preamble or RACH payload, or both, during a given occasion or set of occasions, then the UE may determine to use a subsequent occasion or set of occasions (e.g., contiguous set of occasions, non-contiguous set of occasions, etc.) to transmit RACH preamble or RACH payload, or both, other than the given occasion.

In some examples, UE 115-c may further select to perform the second random access channel procedure (e.g., four-step RACH) based at least in part on the preamble preparation time gap satisfying a preamble preparation threshold and the payload preparation time gap not satisfying a payload preparation threshold. In some examples, UE 115-c may further receive a threshold indicator that indicates the preamble preparation threshold, the payload preparation threshold, or both.

In some examples, UE 115-c may further transmit a capability indicator (e.g., UE processing capability 1 or UE processing capability 2). In some cases, the threshold indicator may be based at least in part on the capability indicator.

In some examples, UE 115-c may further receive the threshold indicator in at least one of a medium access control (MAC) control element (CE), in downlink control information (DCI), radio resource control (RRC) signaling, remaining minimum system information (RMSI), other system information, handover report, or any combination thereof.

In some examples, base station 105-c may transmit, via a control channel (e.g., PDCCH message 405), an order message instructing UE 115-c to perform a RACH procedure. Base station 105-c may determine a preamble preparation time gap between the order message and a first RACH preamble occasion and may select to perform a first random access channel procedure or a second random access channel procedure based at least in part on the preamble preparation time gap. Base station 105-c may monitor for a RACH preamble (e.g., in Random Access message A 410) during one or more occasions (e.g., a first RACH preamble occasion or a second RACH preamble occasion, etc.) based at least in part on the selected random access channel procedure and the determined preamble preparation time gap. In some examples, base station 105-c may further receive the preamble (e.g., from random access message A 410) during the first RACH preamble occasion or the second RACH preamble occasion.

In some examples, base station 105-c may further determine a payload preparation time gap between the control channel message and an occasion for transmitting a RACH payload. In some cases, selecting to perform the first RACH procedure or the second RACH procedure may be based at least in part on the payload preparation time gap.

In some examples, base station 105-c may further transmit a threshold indicator that indicates a preamble preparation threshold, a payload preparation threshold, or both. In some examples, base station 105-c may further receive a capability indicator (e.g., UE processing capability 1 or UE processing capability 2, or both), where the threshold indicator is based at least in part on the capability indicator. In some examples, base station 105-c may further transmit the threshold indicator in at least one of a medium access control (MAC) control element (CE), in downlink control information (DCI), radio resource control (RRC) signaling, remaining minimum system information, other system information, handover report, or any combination thereof.

In some cases, devices in wireless communications system 400 (e.g., UE 115-c or base station 105-c, or both) may determine one or more preparation thresholds for each of one or more time gaps for sending various RACH messages in the two-step or four-step RACH procedure, or both. For example, UE 115-c may determine one or more preparation thresholds for each of one or more time gaps from preconfigured data. (i.e., each UE attempting communication in wireless communications system 100 may already have access to one or more threshold time gap values prior to establishing connection with a base station). In other cases, UE 115-c may receive information related to the one or more preparation thresholds (e.g., latency information, UE processing capabilities, non-standalone operation, etc.). The received information may be sent via a network. For example, the received information may be conveyed to UE 115 through at least one of system information (e.g., a SIB), MAC-CE, DCI, RRC signaling, RMSI, other system information, a handover report, or any combination thereof. Additionally or alternatively, the received information may be selected based on a specific capability of UE 115-c (e.g., UE processing capability 1 or UE processing capability 2).

In some cases, a RACH procedure may be initiated by a RACH order (e.g., received in PDCCH message 405). In such cases, UE 115-c may be requested (e.g., by higher layers) to transmit a RACH message in a selected occasion. In some examples, a sufficient time gap between the last symbol of a PDCCH order reception and the first symbol of the RACH occasion may be represented by the following equation:

$$\text{time gap} \geq N_{T,2} + \Delta_{BWPSwitching} + \Delta_{Delay}$$

In the above equation, $N_{T,2}$ may be a time duration of $N_2$ symbols corresponding to a PUSCH preparation time for a UE processing capability 1 (e.g., possible values of $N_2$ are shown in table 1). A $\Delta_{BWPSwitching}$ may be a delay value associated with switching a bandwidth part (BPS). For example, A $\Delta_{BWPSwitching}$ may be a value of zero if the active uplink bandwidth part does not change. In other examples, the uplink bandwidth part may change and $\Delta_{BWPSwitching}$ may be a specified value to accommodate the switching time. $\Delta_{Delay}$ may be an extra time delay term associated with a frequency range (e.g., FR1 and FR2). For example, $\Delta_{Delay}$ may be a value of 0.5 milliseconds if UE 115-c is operating in sub 6 GHz range (e.g., FR1) and a value of 0.25 milliseconds if UE 115-c is operating in the millimeter wave range (e.g., FR2). In some cases, the RACH transmission may use 1.25 KHz or 5 KHz SCS. In such cases, UE 115-c may determine a value of $N_2$ corresponding to a configuration μ=0 in table 1.

In some cases, UE 115-c may not receive or detect a RACH message from a base station as expected in a RACH procedure. For example, UE 115-c may not detect a DCI format 1_0 with CRC scrambled by the corresponding RA-RNTI within a response expected window (e.g., a window of time UE 115-c expects to receive a RACH message from base station 105-c). Additionally or alternatively, UE 115-c may not correctly receive a transport block (TB) in a corresponding PDSCH within a response expected window. Additionally or alternatively, the higher layers may not identify a random access preamble index (RAPID) associated with a RACH message within a response expected window (e.g., a physical random access channel (PRACH) transmission sent by UE 115-c). In any case, the higher layers may indicate to the physical layer to transmit or retransmit a RACH message (e.g., a PRACH transmission). UE 115-c may be expected to transmit or retransmit a RACH message within a timeframe. For instance, UE 115-c may be expected to transmit or retransmit the RACH transmission within a determined margin after the last symbol of the response expected window. For example, UE 115-c may receive a PDSCH message, determine a margin, and be expected to transmit or retransmit a RACH message before the determined margin elapses after the last symbol of the received PDSCH message. In some examples, UE 115-c may calculate the margin using the following equation:

$$\text{margin} = N_{T,1} + 0.75 \text{ ms}$$

In the above equation, $N_{T,1}$ may be a time duration of $N_1$ symbols corresponding to a PDSCH reception time for UE processing capability 1 (e.g., when additional PDSCH DMRS is configured). Some examples of values for the $N_1$ symbols are shown herein in table 1.

Figure 5:
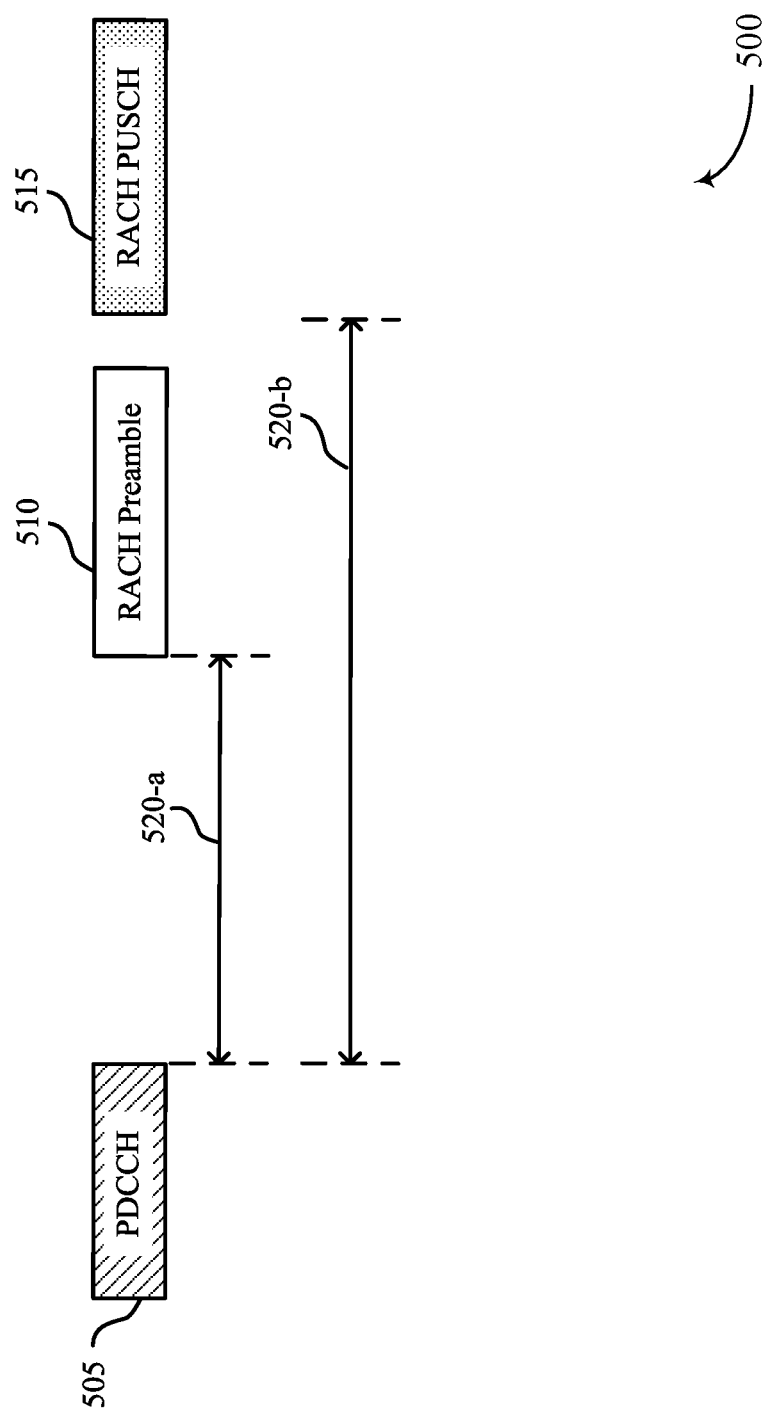
FIG. 5 illustrates an example of a timeline that supports a random access channel procedure selection scheme in accordance with aspects of the present disclosure.

FIG. 5 illustrates an example of a timeline 500 that supports a random access channel procedure selection scheme in accordance with aspects of the present disclosure. In some examples, timeline 500 may implement aspects of wireless communication system 100. Wireless communications timeline 500 may enable a wireless device to determine one or more time gaps (e.g., relative to when a RACH order is received in PDCCH) and select to perform a two-step RACH procedure or a 4 step RACH procedure based on whether one or more of the time gaps satisfy at least one preparation threshold.

As illustrated, timeline 500 may depict a timeline of communications between at least one UE and a base station, which may be examples of a UE 115 and a base station 105, respectively, as described herein with reference to FIG. 1.

In the illustrated example, wireless communications timeline 500 may include PDCCH message 505. PDCCH message 505 may be an example of PDCCH message 405 and may indicate DCI. As shown, timeline 500 may include RACH preamble. RACH preamble may be sent during an occasion 510 which is, in one implementation, configured for transmitting a RACH preamble (labeled in FIG. 5 as "RACH preamble" to indicate that RACH preamble may be sent during the occasion 510, where RACH preamble is the RACH preamble portion of a RACH message A).

In some cases, timeline 500 may include a RACH payload (e.g., RACH PUSCH payload). RACH payload may be sent during an occasion 515 which is, in one implementation, configured for transmitting a RACH payload (labeled in FIG. 5 as "RACH PUSCH" to indicate that, e.g., RACH PUSCH payload may be sent during the occasion 515, where RACH payload is the RACH PUSCH portion of a RACH message A).

In some examples, RACH preamble and RACH payload may be transmitted on the same occasion or on separate occasions. In some examples, RACH preamble and RACH payload may be transmitted back to back in the same occasion (i.e., the last symbol of RACH preamble may be adjacent to the first symbol of RACH payload).

Timeline 500 may include time gap 520-a and time gap 520-b. As described herein, devices in timeline 500 (e.g., UE 115 and base station 105) may determine one or more time gaps between messages in association with a RACH procedure. In one example, a UE 115 may determine one or more time gaps 520 between a received control channel order message (e.g., PDCCH message 505) and corresponding RACH message occasions for transmitting, e.g., message A or a portion of message A such as RACH preamble or RACH payload). Hence time gap 520-a may correspond to a preamble preparation time gap, while time gap 520-b may correspond to a payload preparation time gap.

In some examples, UE 115 may also determine a preparation threshold. For example, UE 115 may determine a preparation threshold associated with time gap 520-a based on UE 115's processing capabilities or processing/transmission latency, or both. For example, N2 may denote a defined amount of time (e.g., minimum) needed by UE 115 to prepare a PUSCH preamble transmission (e.g., RACH preamble transmission) after receiving PDCCH message 505. L2 may denote a processing latency in MAC layer (e.g., for transmitting RACH preamble), and may denote a defined amount of time (e.g., minimum) needed by UE 115 to prepare a PUSCH payload transmission (e.g., a RACH payload transmission) after receiving PDCCH message 505. A preamble preparation time gap may be considered sufficient if the preamble preparation time gap (X) meets the following condition, X≥N2+L2. In some cases, UE 115 may determine whether one or more time gaps (e.g., time gap 520-a) satisfy (i.e., is greater than, or greater or equal to) threshold value N2+L2.

In some cases, UE 115 may determine other preparation thresholds. For example, UE 115 may determine a threshold corresponding to time gap 520-b based on UE 115's processing capabilities or processing latency, or both. For example, N2' may denote UE 115's processing time to prepare a PUSCH transmission (e.g., RACH payload, RACH PUSCH payload) and L2' may denote a processing latency in MAC layer (e.g., for transmitting RACH payload). In some cases, N2' may denote UE 115's processing time to prepare RACH payload after receiving PDCCH message 505 and may be larger than N2 because a RACH payload, e.g., a RACH PUSCH payload, may be larger than a RACH preamble. A payload preparation time gap may be considered sufficient if the payload preparation time gap (Y) meets the following condition, Y≥N2'+L2'. In some cases, UE 115 may determine whether one or more time gaps (e.g., time gap 520-b) satisfy (e.g., greater than, or greater than or equal to) threshold value N2'+L2'.

In some cases, UE 115 may perform a RACH procedure based on one or more determined preparation time gaps. For instance, UE 115 may perform a two-step RACH procedure when a determined preparation time gap satisfies a preparation threshold in association with a particular occasion. Alternatively, UE 115 or base station 105 may select to perform a four-step RACH procedure or wait until a next association period to perform a two-step RACH procedure when a determined preparation time gap does not satisfy a preparation threshold. For instance, UE 115 may determine time gap 520-a between PDCCH message 505 and an occasion 510 for transmitting a portion of message A (e.g., RACH preamble). Additionally, UE 115 may determine time gap 520-b between PDCCH message 505 and an occasion 515 for transmitting another portion of message A (e.g., RACH payload). UE 115 may determine to transmit one or both portions of message A based on one or both of time gap 520-a and time gap 520-b. For example, if a designated RACH occasion satisfies preparation time conditions for both gap 520-a and 520-b, UE 115 may determine to perform a two-step RACH procedure and send both portions of message A in the designated occasion. Alternatively, if a designated RACH occasion fails to satisfy the preparation conditions for both gap 520-a and 520-b, UE 115 may determine to perform a four-step RACH procedure and send one portion (e.g., RACH preamble) in the next occasion possible.

In some cases, UE 115 may determine to perform a two-step RACH procedure. For example, UE 115 may determine that an occasion, for example, occasion 510, satisfies a sufficient preamble preparation time condition (e.g., duration X of time gap 520-a>=N2+L2). Further, UE 115 may determine that an occasion (e.g., the same occasion) also satisfies a payload preparation time condition (e.g., duration Y of time gap 520-b>=N2'+L2'). In such cases, UE 115 may determine to transmit message A of a two-step RACH procedure during the occasion. In some cases, message A may include both RACH preamble and RACH payload. Alternatively, UE 115 may select to perform the RACH procedure (e.g., the two-step RACH procedure) based at least in part on the time gap 520-a satisfying a payload preparation condition (e.g., duration X of time gap 520-a>=N2'+L2'), and may not consider the second time gap 520-b.

In some cases, RACH preamble and RACH PUSCH payload may be transmitted back to back (e.g., in contiguous time resources). In such cases, UE 115 may determine that a time gap 520-a for an occasion satisfies a sufficient preparation time condition (e.g., X≥N2'+L2'). UE 115 may then determine whether to transmit both RACH preamble and RACH payload in a two-step RACH procedure based on the determination.

In other cases, UE 115 may determine to perform a four-step RACH procedure. For example, UE 115 may determine that a time gap 520-a for an occasion (e.g., occasion 510) satisfies a sufficient preamble preparation time condition (e.g., preamble preparation time gap is greater than or equal to a preamble preparation threshold, i.e., X≥N2+L2). UE 115 may also determine that a time gap 520-b for another occasion (e.g., occasion 515) fails to satisfy a sufficient payload preparation time condition (e.g., payload preparation time gap is less than a payload, i.e., Y<N2'+L2'). UE 115 may then determine to perform a four-step RACH procedure instead of a two-step RACH procedure and may transmit RACH preamble at the occasion 510 in accordance with the four-step RACH procedure.

In some cases, UE 115 may determine that an occasion 510 does not satisfy the first time gap threshold and a PUSCH occasion 515 does not satisfy the second time gap threshold. For example, UE 115 may determine that a time gap 520-a for an occasion 510 fails to satisfy a sufficient preamble preparation time condition (e.g., X<N2+L2). UE 115 may also determine that a time gap 520-b for a PUSCH occasion 515 fails to satisfy a sufficient payload preparation time condition (e.g., Y<N2'+L2'). UE 115 may determine to skip the current occasion 510 and initiate a RACH procedure (e.g., two-step RACH) at a later or subsequent occasion. That is, UE 115 may determine to select an occasion that satisfies both preparation time conditions (e.g., an occasion later than occasion 510 and PUSCH occasion 515) for transmission of message A of a two-step RACH procedure.

In some examples, base station 105 may select to perform the first RACH procedure (e.g., two-step RACH) or the second RACH procedure (e.g., four-step RACH). Base station 105 may select to perform the first RACH procedure based at least in part on the first time gap (e.g., time gap 520-a) satisfying a preamble preparation threshold and the second time gap (e.g., time gap 520-b) satisfying a payload preparation threshold, as discussed above. For example, the base station 105 may select to perform one of the RACH procedures based on the time gaps (e.g., time gap 520-a and time gap 520-b) satisfying the preparation time conditions as discussed above.

Figure 6:
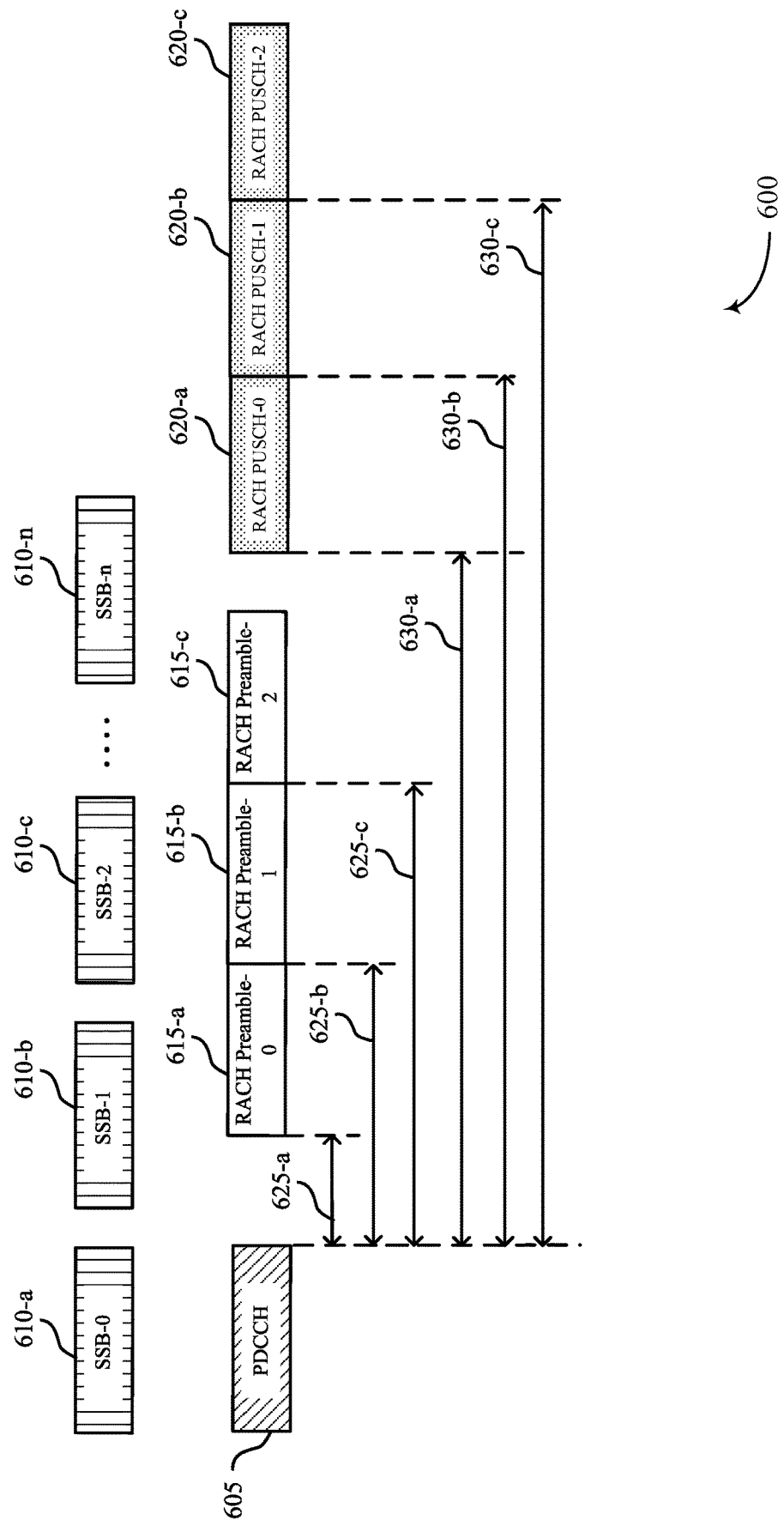
FIG. 6 illustrates an example of a timeline that supports a random access channel procedure selection scheme in accordance with aspects of the present disclosure.

FIG. 6 illustrates an example of a timeline 600 that supports a random access channel procedure selection scheme in accordance with aspects of the present disclosure. In some examples, timeline 600 may implement aspects of wireless communication system 100. Wireless communications timeline 600 may show a timeline where a wireless device may determine, based off of one or more time gaps, to select a RACH occasion, that corresponds to a synchronized signal block (SSB), for transmission of a RACH message.

As illustrated, timeline 600 may depict a timeline of communications between at least one UE and a base station, which may be examples of a UE 115 and a base station 105, respectively, as described herein with reference to FIG. 1. In some cases, wireless communications timeline 600 may include PDCCH message 605. PDCCH message 605 may be an example of PDCCH message 405 and may indicate DCI.

In some cases, timeline 600 may also include one or more synchronization signal blocks (SSBs) 610. SSBs 610 may correspond to downlink beams and may have an associated signal strength (e.g., reference signal received power (RSRP)). Each SSB may include a corresponding synchronization signal (SS). Base station 105 may transmit each synchronization signal associated with an SSB in a periodic manner. For example, base station 105 may cycle through transmitting each SS on a respective beam in an association period. After the association period ends, base station 105 may cycle through transmitting each SS on a respective beam on a new association period.

A UE 115 may receive at least one of SSBs 610-a, 610-b, 610-c, 610-n, etc., and may measure the signal strength for at least one of the received SSB. At least one of SSBs 610 may be associated with at least one RACH occasions for UE 115 to transmit a RACH message. For example, SSB-0 610-a may be associated with RACH preamble-0 615-a and RACH PUSCH-0 620-a, and SSB-1 610-b may be associated with RACH preamble-1 615-b and RACH PUSCH-1 620-b, and so on.

In some examples, timeline 600 may include RACH messages or portions of RACH messages. For example, timeline 600 may include one or more RACH preambles 615. RACH Preambles 615 may be RACH occasions (e.g., for a RACH preamble portion of a RACH message A). As an example, RACH preamble 615-a may be associated with an occasion for UE 115 to transmit a RACH preamble to a base station 105 at an earlier time relative to an occasion associated with RACH preamble 615-b or RACH preamble 615-c.

In some examples, timeline 600 may include one or more RACH PUSCH occasions 620 for transmitting or receiving a RACH payload. RACH PUSCH occasions 620 may be random access channel occasions (e.g., for a PUSCH portion of a RACH message A). For instance, RACH PUSCH occasion 620-*a* may be an occasion for UE 115 to transmit a RACH PUSCH payload to a base station 105 at an earlier time relative to RACH PUSCH occasion 620-*b* or RACH PUSCH occasion 620-*c*. RACH PUSCH occasion 620-*a* may be a PUSCH payload associated with RACH preamble 615-*a*. Although illustrated such that RACH PUSCH occasion 620-*a* is transmitted later than RACH preamble 615-*b* or RACH preamble 615-*c*, RACH PUSCH occasion 620-*a* may also be transmitted at the position occupied by RACH preamble 615-*b* (e.g., back to back with RACH preamble 615-*a*), or any other position shown in FIG. 6 (e.g., the position occupied by RACH preamble 615-*c*, RACH PUSCH 620-*b*, etc.).

In some examples, timeline 600 may also include time gaps 625. For example, time gap 625-*a* may be a number of symbols or time between PDCCH message 605 and RACH Preamble 615-*a*. Likewise, time gap 625-*b* may be a number of symbols or time between PDCCH message 605 and RACH preamble 615-*b*, and so forth.

In some examples, timeline 600 may also include time gaps 630. For example, time gap 630-*a* may be a number of symbols or time between PDCCH message 605 and RACH PUSCH 620-*a*. Likewise, time gap 630-*b* may be a number of symbols or time between PDCCH message 605 and RACH PUSCH 620-*b*, and so forth.

In some examples, UE 115 may also determine a threshold time gap. For example, UE 115 may determine a threshold time gap associated with time gaps 625 based on UE 115's processing capabilities or processing latency, or both. For example, N2 may denote UE 115's processing time to prepare a PUSCH transmission (e.g., a RACH preamble) and L2 may denote a processing latency in MAC layer (e.g., for transmitting the RACH preamble). A threshold time gap value may be represented as X≥N2+L2. In some cases, UE 115 may determine whether one or more time gaps (e.g., time gap 625-*a*, time gap 625-*b*, etc.) satisfy threshold time gap value X.

In some cases, UE 115 may determine other threshold time gaps. For example, UE 115 may determine a threshold time gap corresponding to time gaps 630 based on UE 115's processing capabilities or processing latency, or both. For example, N2 may denote UE 115's processing time to prepare a PUSCH transmission (e.g., a RACH preamble) and L2' may denote a processing latency in MAC layer (e.g., for transmitting the RACH PUSCH payload). In some cases, N2' may be larger than N2 due to the RACH PUSCH payload including a larger payload than the RACH preamble. A threshold time gap value may be represented as Y≥N2'+L2'. In some cases, UE 115 may determine whether one or more time gaps (e.g., time gap 630-*a*, time gap 630-*b*, etc.) satisfy threshold time gap value Y.

UE 115 may select an SSB and a resource for transmission of a RACH message (e.g., one or both portions of message A in a RACH procedure). In some cases, UE 115 may select an SSB and a resource based on measured synchronization signal (SS) transmitted within the SSB satisfying a threshold. For example, UE 115 may monitor SSBs 610 and determine a measurement of a synchronization signal associated with two or more of the SSBs (e.g., reference signal, received power, etc.). UE 115 may select an SSB that corresponds to a RACH occasion if the measured signal satisfies a signal strength threshold. For example, UE 115 may select SSB-0 610-*a* that corresponds to a RACH occasion for transmitting RACH preamble 615-*a* and RACH PUSCH 620-*a* if the received RSRP of SSB-0 610-*a* satisfies a signal strength threshold.

Additionally, the selection of an SSB and corresponding RACH occasion may depend on whether a duration of a time gap 625 between the PDCCH message 605 and the corresponding RACH occasion for transmitting the RACH preamble 615 satisfies a first threshold time gap and whether a duration of a time gap 630 between the PDCCH message 605 and the corresponding RACH PUSCH occasion for transmitting the RACH PUSCH 620 satisfies a second threshold time gap. As an example, UE 115 may select SSB-0 610-*a* that corresponds to a RACH preamble occasion (e.g., for transmitting RACH preamble 615-*a*) and a PUSCH payload occasion (e.g., for transmitting RACH PUSCH payload 620-*a*) based on whether the duration of a time gap 625 satisfies a first threshold time gap and the duration of a time gap 630 satisfies a second threshold time gap (e.g., time gap 625-*a* and time gap 630-*a* satisfy threshold time gap values X and Y, respectively).

Alternatively, UE 115 may wait for a RACH association period where the RACH resources for at least one of the RACH preambles 615 (e.g., 615-*a*, 615-*b*, 615-*c*, etc.) and at least one of the RACH PUSCHs 620 (e.g., 620-*a*, 620-*b*, 620-*c*, etc.) satisfy the threshold time gaps. An association period may be a period of time that includes a set of one or more RACH preamble occasions (e.g., 615-*a*, 615-*b*, and 615-*c*) and a set of one or more RACH PUSCH occasions (e.g., 620-*a*, 620-*b*, and 620-*c*). For example, the timeline shown in FIG. 6 depicts a current association period, and a subsequent association period may occur later in time that has the same or a similar format as the association period depicted in FIG. 6. That is, UE 115 may wait for a subsequent association period to ensure that determined time gaps satisfy threshold time gaps (e.g., time gap 625-*a* and time gap 630-*a* satisfy threshold time gap values X and Y, respectively). In such cases, UE 115 may select RACH resources based on other criteria. For example, UE 115 may determine that all RACH preamble occasions 615 and RACH PUSCH occasions 620 satisfy the time gap thresholds in a subsequent association period, and select an SSB 610 (e.g., SSB 610-*b*) and associated RACH message occasions (e.g., RACH preamble occasion 615-*b* and RACH PUSCH occasion 620-*b*) based on whether SSB 610 satisfies a signal strength threshold (e.g., RSRP threshold).

In some examples, UE 115 may receive from base station 105, via a control channel (e.g., PDCCH message 505), an order message instructing UE 115 to perform a random access channel procedure. In some cases, UE 115 may determine a first time gap (e.g., time gap 625-*a*) between the order message and a first random access channel occasion (e.g., RACH preamble 615-*a*) and select to perform a first random access channel procedure (e.g., two-step RACH) or a second random access channel procedure (e.g., four-step RACH) based at least in part on the first time gap. In some cases, the UE may transmit a RACH preamble during the first random access channel occasion or a second random access channel occasion (e.g., RACH preamble 615-*b*) based at least in part on the selected random access channel procedure and the first time gap.

As shown, a time gap (e.g., time gap 625-*a* or time gap 630-*a*, or both) between a physical downlink control channel (e.g., PDCCH message 605) conveying a RACH order, and a first random access channel occasion (e.g., RACH preamble 615-*a*) and a RACH shared data channel (e.g., RACH PUSCH 620-*a*) may differ from a time gap (e.g., time gap

625-*b* or time gap 630-*b*, or both) between the PDCCH conveying the RACH order, and the second random access channel occasion (e.g., RACH preamble 615-*b*) and a second RACH shared data channel (e.g., RACH PUSCH 620-*b*).

In some examples, UE 115 may measure a signal in each synchronization signal block (SSB) of a set of SSBs. UE 115 may determine if the measured signal of one or more SSBs satisfies a threshold and select an SSB. UE 115 may transmit in the RACH occasion corresponding to a selected SSB. For example, UE 115 may measure one or more of SSBs 610 and determine that SSB 610-*b* satisfies a RSRP threshold. UE 115 may select SSB 610-*b* and transmit in a corresponding RACH occasion. Base station 105 may receive the transmission and determine to utilize SSB 610-*b* for future transmissions.

In some examples, timeline 600 may include an association period. The association period may be a repeating time period in which UE 115 may perform a RACH procedure (e.g., first association period, second association period, etc.). In some cases, UE 115 may determine to refrain from transmitting in an earlier association period (e.g., when UE 115 determines time gaps 625 or time gaps 630, or both, fail to satisfy one or more threshold time gaps). UE 115 may wait for a next association period to perform the RACH procedure. The next association period may include RACH occasions that satisfy the threshold time gaps, and thus may enable UE 115 to transmit a RACH message in any RACH occasion. In such a case, UE 115 may transmit a RACH message in a RACH occasion that corresponds to a SSB in which the measured signal satisfies a threshold.

In some examples, the association period may occur after a first association period that includes the first and second random access channel occasions. In some examples, the first random access channel procedure is a two-step random access channel procedure, and the second random access channel procedure is a four-step random access channel procedure.

In some examples, base station 105 may transmit, via a control channel (e.g., PDCCH message 605), an order message instructing UE 115 to perform a random access channel procedure. Base station 105 may determine a first time gap (e.g., time gap 625-*a*) between the order message and a first random access channel occasion (e.g., RACH preamble 615-*a*), and may select to perform a first random access channel procedure or a second random access channel procedure based at least in part on the first time gap. Base station 105 may monitor for a first RACH preamble (e.g., RACH preamble-0 615-*a* in a random access message A 410) during the first random access channel occasion or a second RACH preamble during a second random access channel occasion (e.g., RACH preamble 615-*b*) based at least in part on the selected random access channel procedure and the determined first time gap.

In some examples, timeline 600 may include an association period including a plurality of random access channel occasions (e.g., RACH preamble occasions 615) that each satisfy a first time gap threshold (e.g., time gaps 625) and a plurality of shared channel occasions (e.g., RACH PUSCHs 620) that each satisfy a second time gap threshold (e.g., time gaps 630). Base station 105 may further identify a synchronization signal block (e.g., SSB-0 610-*a*) or a random access channel resource that corresponds to in which of the first random access channel occasion (e.g., RACH preamble 615-*a*) or the second random access channel occasion (e.g., RACH preamble 615-*b*) the preamble is received. Base station 105 may transmit a random access channel response (e.g., message B in a two-step RACH procedure) using a transmit beam corresponding to the synchronization signal block or the random access channel resource.

In some examples, the association period occurs after a first association period that includes the first and second random access channel occasions. In some examples, the first random access channel procedure is a two-step random access channel procedure, and the second random access channel procedure is a four-step random access channel procedure. In some aspects, a time gap between a RACH preamble 615 and an associated RACH PUSCH 620 may be different. For example, a time gap between RACH preamble 615-*a* and corresponding RACH PUSCH 620-*a* may be different than a time gap between RACH preamble 615-*b* and corresponding RACH PUSCH 620-*b*.

Figure 7:
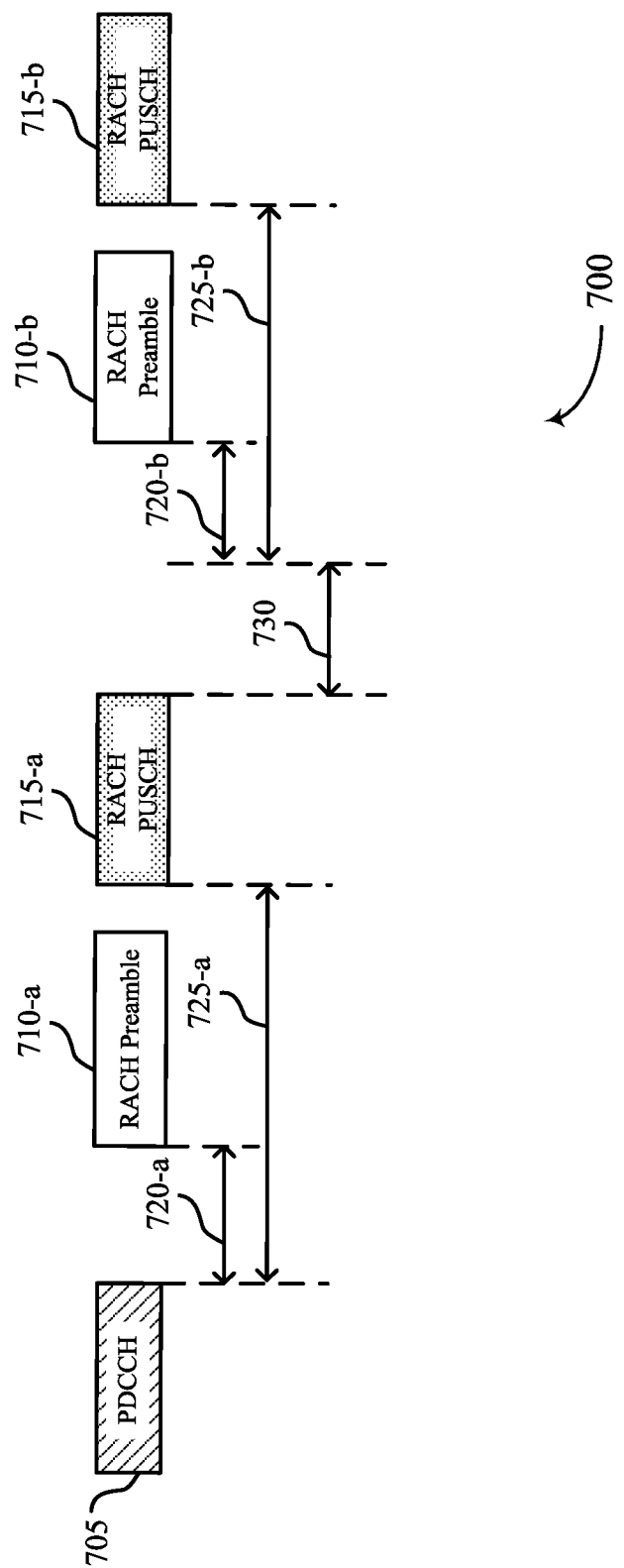
FIG. 7 illustrates an example of a timeline that supports a random access channel procedure selection scheme in accordance with aspects of the present disclosure.

FIG. 7 illustrates an example of a timeline 700 that supports a random access channel procedure selection scheme in accordance with aspects of the present disclosure. In some examples, timeline 700 may implement aspects of wireless communication system 100. Timeline 700 may enable a wireless device to determine one or more time gaps (e.g., between a message B reception window and a message A retransmission occasion) and select to perform a two-step RACH procedure or a 4 step RACH procedure based on whether one or more of the time gaps satisfy at least one threshold.

As illustrated, timeline 700 may depict a timeline of communications between at least one UE and a base station, which may be examples of a UE 115 and a base station 105, respectively, as described herein with reference to FIG. 1. Wireless communications timeline 700 may also include PDCCH message 705. PDCCH message 705 may be an example of PDCCH message 705 and may indicate DCI.

Additionally, timeline 700 may include RACH preambles 710 (e.g., 710-*a*, 710-*b*, etc.). RACH preambles 710 may be associated with random access channel occasions (e.g., for a RACH preamble portion of a RACH message A). Further, timeline 700 may include RACH PUSCHs 715 (e.g., 715-*a*, 715-*b*, etc.). RACH PUSCHs 715 may be associated with random access channel occasions (e.g., for a PUSCH portion of a RACH message A). In some examples, RACH preambles 710 and RACH PUSCHs 715 are transmitted on separate RACH occasions. In other examples, RACH preamble 710 and RACH PUSCH 715 are transmitted back to back (e.g., the last symbol of RACH preamble 710-*a* may be adjacent to the first symbol of RACH PUSCH 715-*a*).

Timeline 700 may include window 730. Window 730 may be a window of time where UE 115 expects to receive a RACH message from a base station 105. For example, UE 115 may transmit a message A (e.g., RACH message A at 305 of FIG. 3) and expect to receive a message B (e.g., RACH message B at 310 of FIG. 3) at some time within window 730. UE 115 may retransmit message A if UE 115 does not detect message B before the end of the window 730.

In some cases, timeline 700 may also include time gaps 720. For example, time gap 720-*a* may be between a received control channel (e.g., PDCCH message 705) and a corresponding RACH transmission (e.g., RACH preamble 710-*a*). Time gap 720-*a* may correspond to time gap 520-*a* of FIG. 5. Time gap 720-*b* may be between the end of window 730 and a RACH retransmission (e.g., RACH preamble 710-*b* is a retransmission of RACH preamble 710-*a*).

In some cases, wireless communications timeline 700 may also include time gaps 725. For example, time gap 725-*a* may be between a received control channel (e.g., PDCCH message 705) and a corresponding RACH transmission (e.g., RACH PUSCH 715-*a*). Time gap 725-*a* may correspond to time gap 520-*b* of FIG. 5. Time gap 725-*b* may be between the end of window 730 and a RACH retransmission (e.g., RACH PUSCH 715-*b*).

In some examples, UE 115 may also determine threshold time gaps. For example, UE 115 may determine a threshold time gaps associated with time gap 720-*b* based on UE 115's processing capabilities or processing latency, or both. For example, N2 may denote UE 115's processing time to prepare a PUSCH or PRACH transmission (e.g., a RACH preamble), N1 may denote UE 115's processing time to decode a PDSCH transmission (e.g., message B from base station 105), and L2 may denote a processing latency in MAC layer (e.g., for transmitting the RACH preamble). A threshold time gap value between window 730 and a RACH occasion for the RACH preamble may be represented as X N1+L2. In some cases, UE 115 may determine whether one or more time gaps (e.g., time gap 720-*b*) satisfy threshold time gap value X.

In some cases, UE 115 may determine other threshold time gaps. For example, UE 115 may determine a threshold time gap corresponding to time gap 725-*b* based on UE 115's processing capabilities or processing latency, or both. For example, N2' may denote UE 115's processing time to prepare a PUSCH transmission (e.g., a RACH preamble payload), N1 may denote UE 115's processing time to decode a PDSCH transmission (e.g., message B from base station 105), and L2' may denote a processing latency in MAC layer (e.g., for transmitting the RACH PUSCH payload). In some cases, N2' may be larger than N2 due to the RACH PUSCH payload including a larger payload than the RACH preamble. A threshold time gap value may be represented as Y N1+N2'+L2'. In some cases, UE 115 may determine whether one or more time gaps (e.g., time gap 725-*b*) satisfy threshold time gap value Y.

In some aspects, UE 115 may send a message A using the 2-step RACH procedure and monitor for a message B from base station 105. UE 115 may monitor for the length of window 730 to detect the message B. If UE 115 fails to detect message B within window 730, UE 115 may determine whether to retransmit message A in the 2-step RACH procedure or whether to fall back to the 4-step RACH procedure. To select which RACH procedure to use, UE 115 may determine threshold time gaps (e.g., X and Y) between the end of window 730 and RACH occasions for one or both portions of message A (e.g., RACH preamble 710-*b* and RACH PUSCH 715-*b*).

In some examples, UE 115 may determine whether the time gaps 720-*b* and 725-*b* for the RACH occasions for transmitting both portions of message A satisfy the respective time gaps threshold (e.g., X>=N1+L2 and Y>=N1+N2'+L2'), as discussed above with reference to time gaps 520-*a* and 520-*b* with reference to FIG. 5. Hence, in the timeline 700 shown in FIG. 7, the start of time window 730 can correspond to the end of RACH PUSCH occasion 515 with reference to FIG. 5. Accordingly, UE 115 may retransmit message A (e.g., RACH preamble 710-*b* is a retransmission of RACH preamble 710-*a*) using the two-step RACH procedure based on the determination (e.g., transmit RACH preamble 710-*b* at the RACH occasion the begins at the end of time gap 720-*b* and RACH PUSCH at the end of time gap 725-*b*).

In other examples, UE 115 may determine that the time gap 720-*b* for the RACH occasion for transmitting RACH preamble 710-*b* satisfies a first time gap threshold (e.g., X>=N1+L2), but does not the time gap 725-*b* does not satisfy a second time gap threshold (e.g., Y<N1+N2'+L2'). UE 115 may determine to not to perform the two-step RACH procedure and instead perform a four-step RACH procedure. As part of the four-step RACH procedure, the UE 115 may retransmit (e.g., retransmit only) RACH preamble 710-*b* (e.g., RACH preamble 710-*b* is a retransmission of RACH preamble 710-*a*) based on the determination and delay transmitting the RACH PUSCH 715-*b* until after receiving a RACH message response (e.g., RACH message 2) from base station 105.

In yet other examples, RACH preamble 710-*b* may be back to back with RACH PUSCH 715-*b*. That is, the last symbol of RACH preamble 710-*b* may be transmitted adjacent to the first symbol of RACH PUSCH 715-*b* (e.g., are contiguous in time). In such examples, UE 115 may only need to determine whether time gap 720-*b* satisfies the first time gap threshold (e.g., X>=N1+L2) and may transmit both RACH preamble 710-*b* and RACH PUSCH 715-*b* when the time gap 720-*b* satisfies the threshold time gap. For example, UE 115 may determine a threshold time gap Z, where Z may be equivalent to X, Y, or another value (e.g., Z=X or Z=Y, or a different number).

UE 115 may determine that the time gap 720-*b* satisfies the threshold time gap Z and determine to retransmit both RACH preamble 710-*b* and RACH PUSCH 715-*b* in accordance with a two-step RACH procedure. Alternatively, UE 115 may determine that the time gap 720-*b* fails to satisfy threshold time gap Z. UE 115 may then fall back to a four-step RACH procedure and transmit (e.g., transmit only) RACH preamble 710-*b* at the determined RACH occasion, and delay transmitting the RACH PUSCH 715-*b* until after receiving a RACH message response (e.g., RACH message 2) from base station 105. Additionally or alternatively, UE 115 may wait for a different RACH occasion in a subsequent association period (e.g., so that a time gap between the end of the window 730 and the different RACH occasion satisfies threshold time gap Z) and select to retransmit message A in accordance with a two-step RACH procedure (e.g., RACH preamble 710-*b* is a retransmission of RACH preamble 710-*a*).

In some examples, UE 115 may receive from base station 105, via a control channel (e.g., PDCCH message 705), an order message instructing UE 115 to perform a random access channel procedure. In some cases, UE 115 may determine a first time gap (e.g., time gap 720-*a*) between the control channel and a first random access channel occasion (e.g., occasion associated with RACH preamble 710-*a* and RACH PUSCH 715-*a*) and select to perform a first random access channel procedure (e.g., two-step RACH) or a second random access channel procedure (e.g., four-step RACH) based at least in part on the first time gap. In some cases, the UE may transmit a RACH preamble during the first random access channel occasion or a second random access channel occasion (e.g., occasion associated with RACH preamble 710-*b* and RACH PUSCH 715-*b*) based at least in part on the selected random access channel procedure and the first time gap.

In some examples, the selected random access channel procedure is the first random access channel procedure (e.g., two-step RACH). In such examples, UE 115 may determine that a random access channel response was not received within a response window (e.g., response window 730) in accordance with the first random access channel procedure. In some cases, response window 730 may be an example of a message B window, or a window in which a UE expects to receive a message B from a base station. In some cases, UE 115 may determine a second time gap (e.g., time gap 720-*b*) between an end of the response window and a third random access channel occasion 710-*b*. UE 115 may determine a third time gap (e.g., time gap 725-*b*) between an end of the response window and a RACH shared data channel (e.g., RACH PUSCH 715-*b*).

In some examples, UE 115 may further transmit, in accordance with the first random access channel procedure, a retransmission of the preamble in the third random access channel occasion 710-*b* and uplink data in the RACH shared data channel 715-*b* based at least in part on the second time gap 720-*b* satisfying a first threshold and the third time gap 725-*b* satisfying a second threshold.

In some examples, UE 115 may transmit, in accordance with the second random access channel procedure, a retransmission of the preamble in the third random access channel occasion 710-*b* and uplink data in the RACH shared data channel 715-*b* based at least in part on the second time gap 720-*b* satisfying a first threshold and the third time gap 725-*b* satisfying a second threshold.

In some examples, the selected random access channel procedure is the first random access channel procedure (e.g., two-step RACH). In such examples, UE 115 may determine that a random access channel response (e.g., RACH message B) was not received within the response window (e.g., window 730) in accordance with the first random access channel procedure. UE 115 may determine a second time gap (e.g., time gap 720-*b*) between an end of the response window and a third random access channel occasion (e.g., RACH preamble 710-*b*), where the third random access channel occasion and a RACH shared data channel (e.g., RACH PUSCH 715-*b*) occur consecutively in time. UE 115 may transmit, in accordance with the first random access channel procedure, a preamble in the third random access channel occasion and uplink data in the RACH shared data channel based at least in part on the second time gap satisfying a first threshold.

In some examples, base station 105 may transmit, via a control channel (e.g., PDCCH message 705), an order message instructing UE 115 to perform a random access channel procedure. Base station 105 may determine a first time gap (e.g., time gap 720-*a*) between the control channel and a first random access channel occasion (e.g., an occasion associated with RACH preamble 710-*a*), and may select to perform a first random access channel procedure or a second random access channel procedure based at least in part on the first time gap. Base station 105 may monitor for a RACH preamble (e.g., RACH preamble 710-*a* in a random access message A) during the first random access channel occasion or a second random access channel occasion based at least in part on the selected random access channel procedure and the first time gap.

In some examples, the selected random access channel procedure is the first random access channel procedure (e.g., two-step RACH). In such examples, base station 105 may determine a second time gap (e.g., time gap 720-*b*) between an end of a response window (e.g., window 730) for a random access channel response and a third random access channel occasion (e.g., RACH preamble 710-*b*). Base station 105 may determine a third time gap (e.g., time gap 725-*b*) between an end of the response window and a RACH shared data channel (e.g., RACH PUSCH 715-*b*).

In some examples, base station 105 may further monitor for, in accordance with the first random access channel procedure, a retransmission of the preamble in the third random access channel occasion and uplink data in the RACH shared data channel based at least in part on the second time gap satisfying a first threshold and the third time gap satisfying a second threshold.

In some examples, base station 105 may further monitor for, in accordance with the second random access channel procedure (e.g., a four-step RACH procedure), a retransmission of the preamble in the third random access channel occasion and uplink data in a second RACH shared data channel that occurs after the RACH shared data channel based at least in part on the second time gap satisfying a first threshold and the third time gap not satisfying a second threshold.

In some examples, the selected random access channel procedure is the first random access channel procedure (e.g., two-step RACH). In such examples, base station 105 may determine that a random access channel response (e.g., RACH message B) was not received within a response window (e.g., window 730) in accordance with the first random access channel procedure. Base station 105 may determine a second time gap (e.g., time gap 720-*b*) between an end of the response window and a third random access channel occasion (e.g., RACH preamble 710-*b*), where the third random access channel occasion and a RACH shared data channel (e.g., RACH PUSCH 715-*b*) occur consecutively in time (e.g., RACH preamble 710-*b* and RACH PUSCH 715-*b* are contiguous in time). Base station 105 may monitor for, in accordance with the first random access channel procedure, a preamble in the third random access channel occasion and uplink data in the RACH shared data channel based at least in part on the second time gap satisfying a first threshold.

Figure 8:
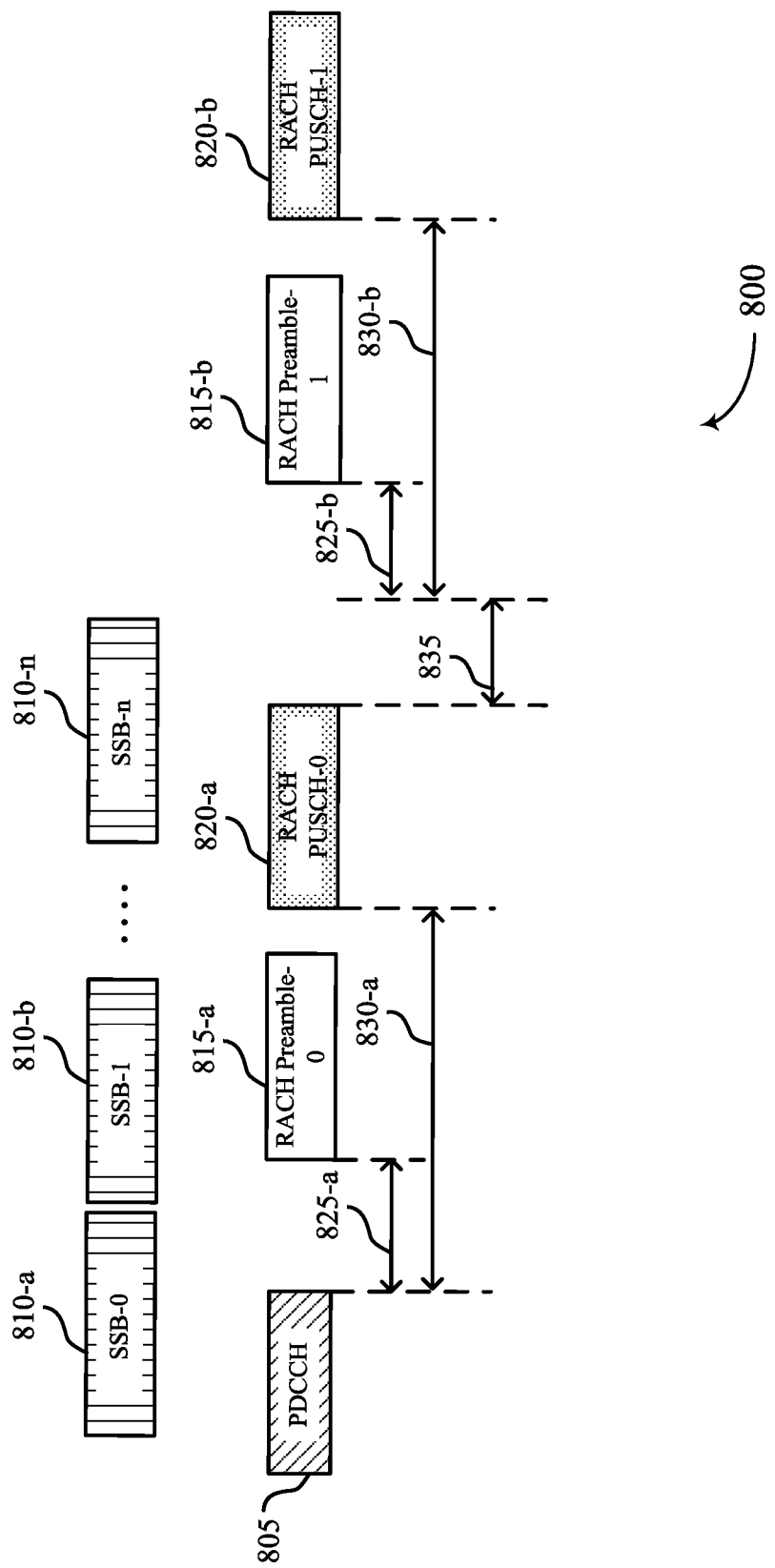
FIG. 8 illustrates an example of a timeline that supports a random access channel procedure selection scheme in accordance with aspects of the present disclosure.

FIG. 8 illustrates an example of a timeline 800 that supports a random access channel procedure selection scheme in accordance with aspects of the present disclosure. In some examples, timeline 800 may implement aspects of wireless communication system 100. Wireless communications timeline 800 may show a timeline where a wireless device may determine, based off of one or more time gaps between a window for a RACH message B and one or more RACH message occasions, to select a synchronized signal block (SSB) corresponding to a RACH message occasion (e.g., for retransmission of RACH message A).

As illustrated, timeline 800 may depict a timeline of communications between at least one UE and a base station, which may be examples of a UE 115 and a base station 105, respectively, as described herein with reference to FIG. 1. Wireless communications timeline 800 may also include PDCCH message 805. PDCCH message 805 may be an example of PDCCH message 705 and may indicate DCI.

In some cases, timeline 800 may include RACH messages or portions of RACH messages. For example, timeline 800 may include one or more RACH preambles 815 (e.g., 815-*a*, 815-*b*, etc.). RACH preambles 815 may be associated with random access channel occasions (e.g., for a RACH preamble portion of a RACH message A). For instance, RACH preamble 815-*a* may be associated with an occasion for UE 115 to transmit a RACH preamble to a base station 105. RACH preamble 815-*b* may be an occasion for UE 115 to retransmit a RACH preamble to a base station 105.

In some cases, timeline 800 may include one or more RACH PUSCHs 820 (e.g., 820-*a*, 820-*b*, etc.). RACH PUSCHs 820 may be random access channel occasions (e.g., for a PUSCH portion of a RACH message A). For instance, RACH PUSCH 820-*a* may be associated with an occasion for UE 115 to transmit a RACH PUSCH payload to a base station 105. RACH PUSCH 820-*a* may be a PUSCH payload associated with RACH preamble 815-*a*. RACH PUSCH 820-*b* may be associated with an occasion for UE 115 to retransmit a RACH PUSCH payload to a base station 105. RACH PUSCH 820-*b* may be a PUSCH payload associated with RACH preamble 815-*b*.

In some cases, timeline 800 may also include one or more synchronization signal blocks (SSBs) 810. SSBs 810 may correspond to downlink beams and may have an associated signal strength (e.g., reference signal received power (RSRP)). Each SSB may include a corresponding synchronization signal (SS). Base station 105 may transmit each synchronization signal associated with an SSB in a periodic manner. For example, base station 105 may cycle through transmitting each SS on a respective beam in an association period. After the association period ends, base station 105 may cycle through transmitting each SS on a respective beam on a new association period.

A UE 115 may receive at least one of SSBs 810-*a*, 810-*b*, 810-*n*, etc., and may measure the signal strength for at least one of the received SSB. At least one of SSBs 810 may be associated with at least one RACH occasions for UE 115 to transmit a RACH message. For example, SSB-1 810-*b* may be associated with RACH preamble-1 815-*b* and RACH PUSCH-1 820-*b*.

In some cases, timeline 800 may also include window 835. Window 835 may be a window of time where UE 115 expects to receive a RACH message response from base station 105. For example, UE 115 may transmit a message A (e.g., RACH message A 305) and expect to receive a message B (e.g., RACH message B 310) within a duration of time. In some cases, UE 115 may retransmit message A if UE 115 does not detect message B before the end of the window 835.

In some cases, timeline 800 may also include time gaps 825. For example, time gap 825-*a* may be a number of symbols or time between PDCCH message 805 and RACH Preamble 815-*a*. Likewise, time gap 825-*b* may be a number of symbols or time between PDCCH message 805 and window 835. In some examples, time gap 825-*a* may correspond to time gap 520-*a* of FIG. 5.

In some cases, timeline 800 may also include time gaps 830. For example, time gap 830-*a* may be a number of symbols or time between PDCCH message 805 and RACH PUSCH 820-*a*. Likewise, time gap 830-*b* may be a number of symbols or time between PDCCH message 805 and window 835. In some examples, time gap 830-*a* may correspond to time gap 520-*b* of FIG. 5.

In some examples, UE 115 may also determine threshold time gaps. For example, UE 115 may determine a threshold time gap associated with time gap 825-*b* based on UE 115's processing capabilities or processing latency, or both. For example, N2 may denote UE 115's processing time to prepare a PUSCH transmission (e.g., a RACH preamble), N1 may denote UE 115's processing time to decode a PDSCH transmission (e.g., message B from base station 105), and L2 may denote a processing latency in MAC layer (e.g., for transmitting the RACH preamble). A threshold time gap value between window 835 and a RACH occasion for the RACH preamble (e.g., RACH preamble 815-*b*) may be represented as X≥N1+L2. In some cases, UE 115 may determine whether one or more time gaps (e.g., time gap 720-*b*) satisfy threshold time gap value X, as discussed above with reference to time gaps 520-*a* and 520-*b* with reference to FIG. 5. Hence, in the timeline 800 shown in FIG. 8, the start of time window 835 may correspond to the end of RACH PUSCH occasion 515 with reference to FIG. 5.

In some cases, UE 115 may determine other threshold time gaps. For example, UE 115 may determine a threshold time gap corresponding to time gap 830-*b* based on UE 115's processing capabilities or processing latency, or both. For example, N2' may denote UE 115's processing time to prepare a PUSCH transmission (e.g., a RACH PUSCH payload), N1 may denote UE 115's processing time to decode a PDSCH transmission (e.g., message B from base station 105), and L2' may denote a processing latency in MAC layer (e.g., for transmitting the RACH PUSCH payload). In some cases, N2' may be larger than N2 due to the RACH PUSCH payload including a larger payload than the RACH preamble. A threshold time gap value may be represented as Y≥N1+N2'+L2'. In some cases, UE 115 may determine whether one or more time gaps (e.g., time gap 830-*b*) satisfy threshold time gap value Y.

UE 115 may select an SSB and a resource for transmission of a RACH message (e.g., one or both portions of message A in a RACH procedure). In some cases, UE 115 may select an SSB and a resource based on measured SS transmitted within the SSB satisfying a threshold (e.g., RSRP threshold). For example, UE 115 may monitor SSBs 810 and determine a measurement of a synchronization signal associated with two or more of the SSBs (e.g., reference signal, received power, etc.). UE 115 may select an SSB that corresponds to RACH message occasions if the measured signal satisfies a signal strength threshold. For example, UE 115 may select SSB-0 810-*b* and corresponding RACH preamble 815-*b* and RACH PUSCH 820-*b* if the RSRP of SSB-0 810-*a* satisfies a signal strength threshold.

Additionally, the selection of an SSB may depend on whether a duration of the time gap 825 between the end of the window 835 and the corresponding RACH message occasion and a duration of the time gap 830 between the end of the window 835 and the corresponding shared data channel occasion satisfy respective threshold time gaps. As an example, UE 115 may select SSB-0 810-*b* that corresponds to RACH occasion (e.g., for transmitting RACH preamble 815-*b*) and that corresponds to a shard data channel occasion (e.g., for transmitting RACH PUSCH 820-*b*) based on whether the durations of time gaps 825-*b* and 830 satisfy respective threshold time gaps (e.g., duration of time gap 825-*b* and time gap 830-*b* satisfy threshold time gap values X and Y, respectively). The UE 115 may then, in accordance with the two-step RACH procedure, retransmit the RACH preamble 710-*b* in a RACH occasion that begins at the end of gap 825-*b* (e.g., RACH preamble 710-*b* is a retransmission of RACH preamble 710-*a*) and may retransmit the RACH PUSCH 820-*b* in a shared data channel occasion that begins at the end of gap 830-*b*.

Alternatively, UE 115 may wait for a RACH association period where all RACH occasions in the association period satisfy a threshold time gap. For example, UE 115 may wait for a subsequent RACH association period where the respective time gaps 825, 830 for RACH preamble 815-*b* and RACH PUSCH 820-*b* satisfy the respective threshold time gaps (e.g., time gap 825-*b* and time gap 830-*b* satisfy threshold time gap values X and Y, respectively). In such cases, UE 115 may select RACH resources based on other criteria. For example, UE 115 may determine that all RACH occasions for transmitting message A of a two-step RACH procedure satisfy the time gap thresholds in a subsequent association period, and select an SSB 810 (e.g., SSB 810-*n*) and associated RACH message occasions (e.g., RACH preamble 815-*n* and RACH PUSCH 820-*n*) based on whether selected SSB 810 satisfies a signal strength threshold (e.g., RSRP threshold).

Figure 9:
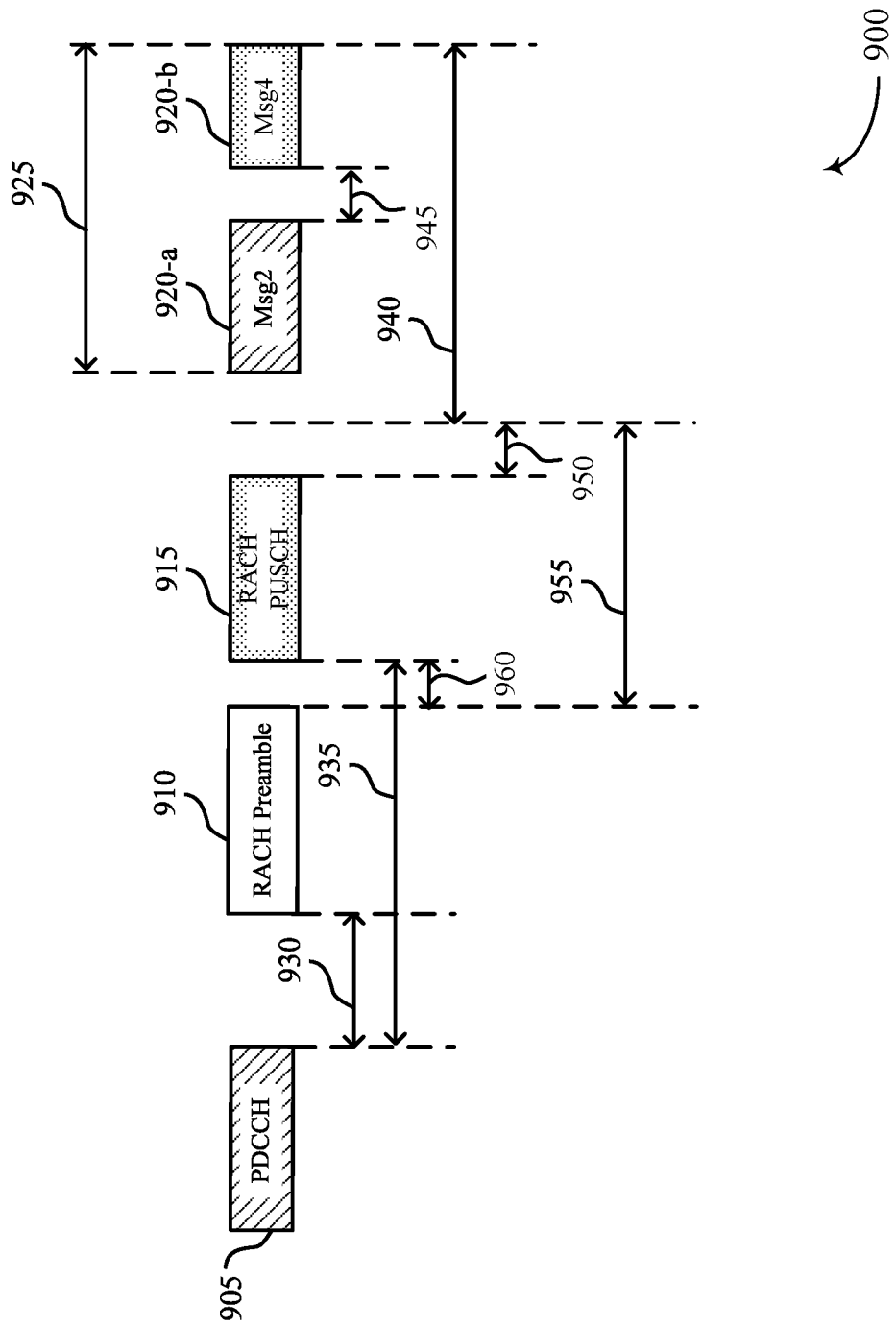
FIG. 9 illustrates an example of a timeline that supports a random access channel procedure selection scheme in accordance with aspects of the present disclosure.

FIG. 9 illustrates an example of a timeline 900 that supports a random access channel procedure selection scheme in accordance with aspects of the present disclosure.

In some examples, timeline 900 may implement aspects of wireless communication system 100. Wireless communications timeline 900 may enable a wireless device to determine one or more time gaps (e.g., between message 2 and message 4 of a RACH procedure) and select to perform a two-step RACH procedure or a four-step RACH procedure based on whether the one or more time gaps satisfy at least on threshold.

As illustrated, timeline 900 may depict a timeline of communications between at least one UE and a base station, which may be examples of a UE 115 and a base station 105, respectively, as described herein with reference to FIG. 1. As shown, wireless communications timeline 900 may include PDCCH message 905. PDCCH message 905 may be an example of PDCCH message 905 and may indicate DCI.

In some cases, timeline 900 may include RACH preamble 910. RACH Preamble 910 may be associated with a random access channel occasion (e.g., for a RACH preamble portion of a RACH message A). Further, timeline 900 may include RACH PUSCH 915. RACH PUSCH 915 may be associated with random access channel occasions (e.g., for a PUSCH payload portion of a RACH message A). RACH preamble 910 and RACH PUSCH 915 may be transmitted on separate waveforms. In some examples, RACH preambles 910 and RACH PUSCH 915 are transmitted on separate RACH occasions. In other examples, RACH preamble 910 and RACH PUSCH 915 are transmitted back to back (e.g., the last symbol of RACH preamble 910 may be adjacent to the first symbol of RACH PUSCH 915).

In some cases, timeline 900 may include RACH message 925. RACH message 925 may be an example of message B in a two-step RACH procedure. For example, RACH message 925 may include RACH portion 920-a (e.g., RACH message 2 of a four-step RACH procedure) and RACH portion 920-b (e.g., RACH message 4 of a four-step RACH procedure).

In some cases, timeline 900 may include window 940. Window 940 may be a window of time where UE 115 expects to receive RACH message 925 from a base station 105. Window 940 may be an example of window 730 of FIG. 7. For example, UE 115 may transmit a message A (e.g., RACH preamble 910 and RACH PUSCH 915) and expect to receive RACH message 925 in a range of time (i.e., within window 940). Additionally, UE 115 may retransmit message A (e.g., as described with reference to retransmitting one or both RACH preamble 710-a and RACH PUSCH 715-b of FIG. 7) if UE 115 does not detect RACH message 925 before the end of the window 940.

In some cases, timeline 900 may also include time gap 930. For example, time gap 930 may be between a received control channel (e.g., PDCCH message 905) and a corresponding RACH transmission (e.g., RACH preamble 910). Timeline 900 may also include time gap 935. For example, time gap 935 may be between a received control channel (e.g., PDCCH message 905) and a corresponding RACH transmission (e.g., RACH PUSCH 915).

In some aspects, UE 115 may send a message A and monitor to detect RACH message 925. UE 115 may monitor for the length of window 940 to detect RACH message 925. In some cases, a gap between message A and a start of message B may depend on a time gap 960 (e.g., a minimum gap) between the RACH preamble 910 and the RACH PUSCH 915 and a time gap 950 between the end of message A (e.g., RACH PUSCH 915) and the beginning of window 940. For example, UE 115 may compare threshold time gaps (e.g., associated with time gap 950 or time gap 955, or both) between the end of message A and the start of window 940.

UE 115 may be capable of receiving RACH message 925 if time gaps 950 and 955 satisfy respective time gap thresholds. For example, UE 115 may be ready to receive RACH message 925 if time gap 955 between the RACH preamble 910 and window 940 satisfies a first threshold time gap X (i.e., UE 115 has enough time in time gap 955 to process preparing and transmitting RACH PUSCH 915, preparing to receive RACH message 925, and the like). Similarly, UE 115 may be ready to receive RACH message 925 if time gap 950 between the RACH PUSCH 915 and window 940 satisfies a second threshold time gap Y (i.e., UE 115 has enough time in time gap 950 to process preparing and transmitting RACH preamble 910, preparing to receive RACH message 925, and the like). If both the threshold time gaps X and Y are satisfied, the UE 115 may perform the two-step RACH procedure. If one or both are not satisfied, the UE 115 may perform the four-step RACH procedure.

In some cases, the UE 115 may frequency division multiplex the RACH preamble 910 and the RACH PUSCH 915 for transmission within the same time resources. UE 115 may determine whether the time gap 950 between the end of message A and the beginning of window 940 for message B may satisfies a third time gap threshold. The third time gap threshold may be equal to the first time gap threshold X, the second time gap threshold Y, a function of the first and second time gap threshold (e.g., max (X, Y), the like. If the threshold time gap Z is satisfied, the UE 115 may perform the two-step RACH procedure. If not, the UE 115 may perform the four-step RACH procedure.

In some cases, UE 115 may determine a time gap 945 between message 2 920-a and message 4 920-b for determining whether to use the two-step or the four-step RACH procedure. UE 115 may determine if time gap 945 satisfies a threshold time gap. For example, UE 115 may determine that time gap 945 fails to satisfy a threshold time gap (e.g., time gap 945 is smaller than a threshold Y=N1+L2, where N1 denotes a decoding processing time for UE 115 and L2 denotes a latency in MAC layer). UE 115 may thus not have enough time to decode each of Msg 2 and Msg 4. For instance, base station 105 may provide a C-RNTI through message 2 920-a. Base station 105 may scramble the DMRS and data portion of message 4 using the provided C-RNTI. If UE 115 is unable to decode the C-RNTI in time, UE 115 may be unable to use the C-RNTI to decode message 4 in time. Thus, because the time gap 945 does not satisfy the threshold time gap, UE 115 may determine to perform a four-step RACH procedure instead of the two-step RACH procedure. If the time gap 945 satisfies the threshold time gap, UE 115 may determine to perform a two-step RACH procedure.

In some examples, the UE 115 may locally store in memory or otherwise be preconfigured with the one or more threshold time gaps described herein. In some examples, indicators of the one or more thresholds may be provided from a network via base station 105. For example, the indicators may be conveyed to UE 115 through at least one of system information (e.g., a SIB), MAC-CE, DCI, RRC signaling, RMSI, other system information, a handover report, or any combination thereof. Additionally or alternatively, the indicators may correspond to a specific capability of UE 115 signaled to the network via the base station 105 (e.g., UE processing capability 1 or UE processing capability 2).

In some examples, UE 115 may receive from base station 105, via a control channel (e.g., PDCCH message 905), an order message instructing UE 115 to perform a random access channel procedure. In some cases, UE 115 may determine a first time gap (e.g., time gap 930) between the control channel and a first random access channel occasion (e.g., RACH preamble 910) and select to perform a first random access channel procedure (e.g., two-step RACH) or a second random access channel procedure (e.g., four-step RACH) based at least in part on the first time gap. In some cases, the UE may transmit a RACH preamble during the first random access channel occasion or a second random access channel occasion based at least in part on the selected random access channel procedure and the first time gap.

In some examples, UE 115 may further determine a second time gap 955 between the first random access channel occasion (e.g., RACH preamble 910) and a response window (e.g., window 940). UE 115 may also determine a third time gap 950 between a RACH shared data channel (e.g., RACH PUSCH 915) and the response window. UE 115 may monitor the response window for a random access channel response in accordance with the selected random access channel procedure based at least in part on the second time gap satisfying a first threshold and the third time gap not satisfying a second threshold.

In some examples, UE 115 may transmit a frequency division multiplexed transmission of the preamble and uplink data during the first random access channel occasion. UE 115 may determine a second time gap between the first random access channel occasion and a response window. UE 115 may also monitor the response window for a random access channel response in accordance with the selected random access channel procedure based at least in part on the second time gap satisfying a first threshold.

In some examples, UE 115 may also determine a second time gap between a random access channel response occasion (e.g., RACH message 925) and a contention resolution occasion (e.g., message 4 920-b) within a response window. UE 115 may monitor the response window for a random access channel response based at least in part on the second time gap satisfying a first threshold.

In some examples, base station 105 may transmit, via a control channel (e.g., PDCCH message 905), an order message instructing UE 115 to perform a random access channel procedure. Base station 105 may determine a first time gap (e.g., time gap 930) between the control channel and a first random access channel occasion (e.g., RACH preamble 910), and may select to perform a first random access channel procedure or a second random access channel procedure based at least in part on the first time gap. Base station 105 may monitor for a RACH preamble (e.g., a first portion of RACH message A) during the first random access channel occasion or a second random access channel occasion based at least in part on the selected random access channel procedure and the first time gap.

In some examples, base station 105 may further determine a second time gap (e.g., time gap 955) between the first random access channel occasion and a response window, and determine a third time gap (e.g., time gap 950) between a RACH shared data channel and the response window for transmitting a random access channel response. Base station 105 may transmit a random access channel response within the response window (e.g., window 940) in accordance with the selected random access channel procedure based at least in part on the second time gap satisfying a first threshold and the third time gap not satisfying a second threshold.

In some examples, base station 105 may further determine a second time gap between a random access channel response occasion (e.g., RACH message 925) and a contention resolution occasion (e.g., message 4 920-b) within a response window. Base station 105 may transmit a random access channel response in the response window based at least in part on the second time gap satisfying a first threshold.

Figure 10:
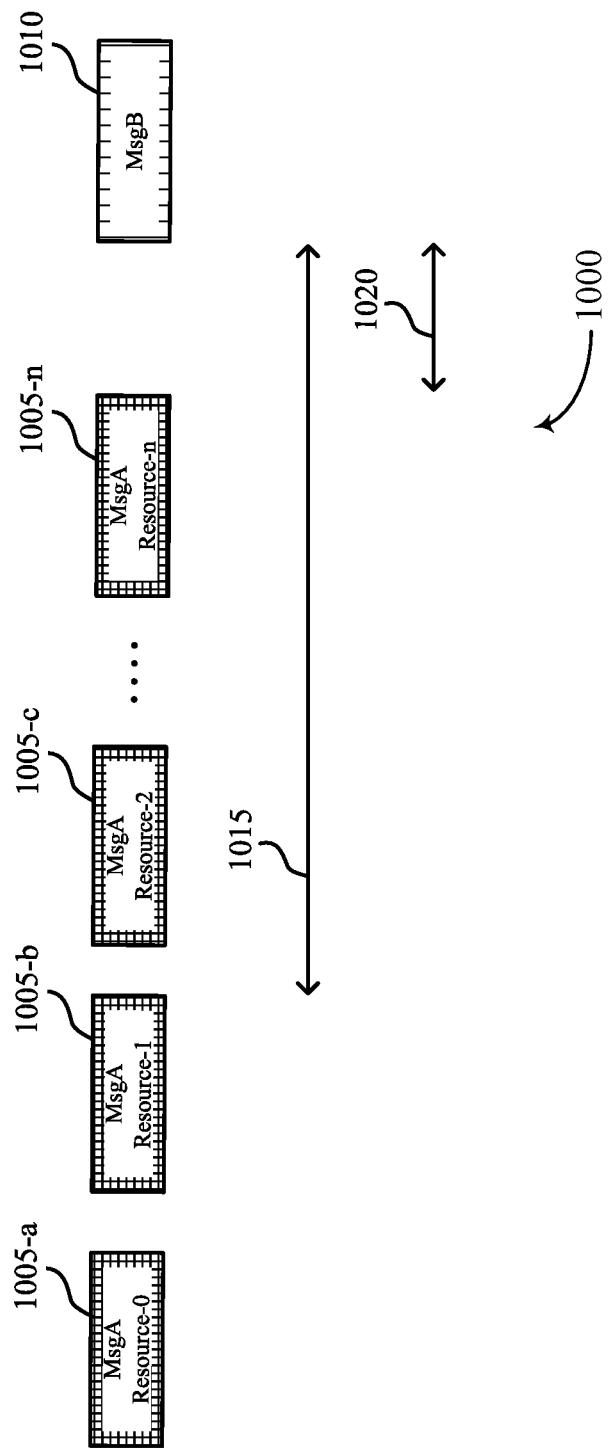
FIG. 10 illustrates an example of a timeline that supports a random access channel procedure selection scheme in accordance with aspects of the present disclosure.

FIG. 10 illustrates an example of a timeline 1000 that supports a random access channel procedure selection scheme in accordance with aspects of the present disclosure. In some examples, timeline 1000 may implement aspects of wireless communication system 100. As illustrated, timeline 1000 may depict a timeline of communications between at least one UE and a base station, which may be examples of a UE 115 and a base station 105, respectively, as described herein with reference to FIG. 1.

In some cases, wireless communications timeline 1000 may include message A resources 1005 (e.g., 1005-a, 1005-b, 1005-c, . . . 1005-n). Message A resources 1005 may be resources for a RACH occasion to transmit message A of a two-step RACH procedure. For example, UE 115 may transmit RACH message A to base station 105 to initiate a RACH procedure. UE 115 may transmit RACH message A using message A resource 1005-a, 1005-b, 1005-c, etc. In some cases, a set of message A resources 1005 (e.g., message A resources 1005-a to message A resources 1005-n) may correspond to one full set of transmitted SSBs. Such message A resources 1005 may occur one after another in the set of message A resources. UE 115 may transmit message A on any of the message A resources 1005 in the set, and the end of message A may be defined as after all possible message A resources 1005 in the set (i.e., at the end of the last message A resource 1005-n in the set).

In some cases, wireless communications timeline 1000 may also include message B 1010. Message B 1010 may be an example of message B of a two-step RACH procedure. For example, base station 105 may transmit message B 1010 to UE 115 in response to receiving a message A from UE 115. In some cases, UE 115 may transmit a RACH preamble during the first random access channel occasion or a second random access channel occasion based at least in part on the selected random access channel procedure and a first time gap (e.g., a first time gap between a control channel and the first random access control channel occasion).

In some examples, UE 115 may further transmit a transmission of uplink data during a RACH shared data channel (e.g., using at least one of the message A resources 1005) in accordance with the selected random access channel procedure. UE 115 may determine a second time gap between an end of the transmission and an end of a response window (e.g., first window 1015, second window 1020, etc.), and monitor the response window for a random access channel response (e.g., message B 1010).

In some examples, the first window 1015 may correspond to a time period between an end of a selected message A resource (e.g., end of message A resource 1005-b) and a determined end of a response window in which base station 105 may send message B 1010. For example, UE 115 may select message A resource 1005-b to transmit RACH message A to base station 105 to initiate a RACH procedure. In one example, UE 115 may initiate monitoring for message B 1010 at the end of message A resource 1005-b. Thus, in some examples UE 115 may determine whether message B 1010 is received before the end of first window 1015.

In some examples, the second window 1020 may correspond to a time period between an end of all message A resources (e.g., end of the nth message A resource 1005-n) and a determined end of a response window in which base station 105 may send message B 1010. For example, UE 115 may select message A resource 1005-b to transmit RACH message A to base station 105 to initiate a RACH procedure.

However, in some examples UE 115 may initiate monitoring for message B 1010 at the end of the nth message A resource 1005-*n* instead of the end of the message A resource used by UE 115 (e.g., message A resource 1005-*b*). Thus, in some examples UE 115 may determine whether message B 1010 is received before the end of second window 1020.

In some examples, base station 105 may monitor for a RACH preamble during the first random access channel occasion or a second random access channel occasion based at least in part on the selected random access channel procedure and the first time gap.

In some examples, base station 105 may further receive a transmission of uplink data (e.g., using message A resources 1005) during a RACH shared data channel in accordance with the selected random access channel procedure. Base station 105 may determine a second time gap between an end of the transmission and a response window for transmitting a random access channel response (e.g., first window 1015, second window 1020, etc.). Base station 105 may transmit the random access channel response (e.g., message B 1010) in the response window based at least in part on the second time gap satisfying a first threshold.

In some examples, base station 105 may further receive, in accordance with the selected random access channel procedure, a transmission of uplink data during a RACH shared data channel within a transmission window. Base station 105 may determine a second time gap between an end of the transmission window and a response window, the end of the transmission window corresponding to a last of a plurality of plurality of RACH shared data channels (e.g., message A resources 1005) within the transmission window. Base station 105 may also transmit a random access channel response (e.g., message B 1010) in the response window based at least in part on the second time gap satisfying a first threshold.

Figure 11:
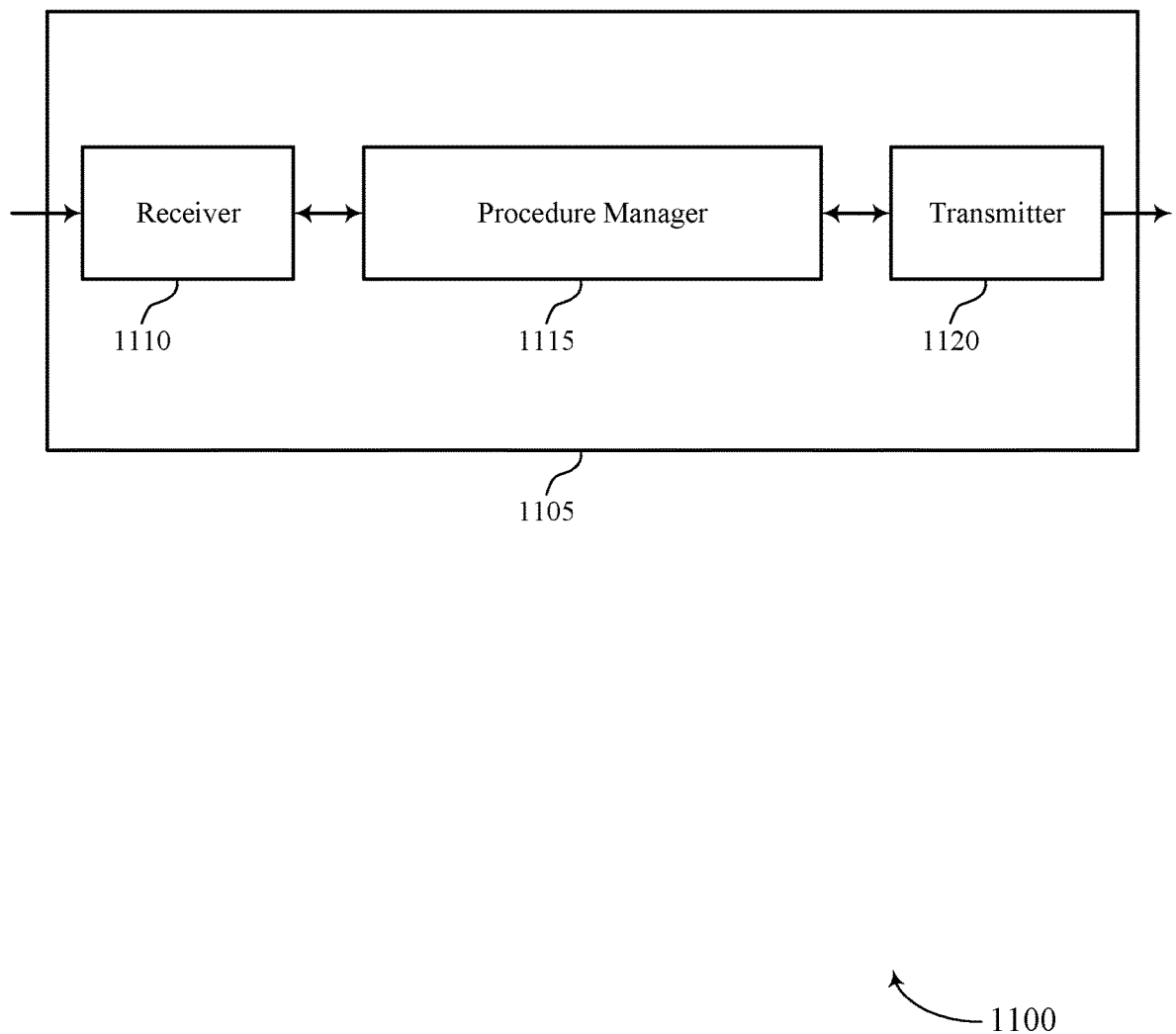
FIGS. 11 and 12 show block diagrams of devices that support a random access channel procedure selection scheme in accordance with aspects of the present disclosure.

FIG. 11 shows a block diagram 1100 of a device 1105 that supports random access channel procedure selection scheme in accordance with aspects of the present disclosure. The device 1105 may be an example of aspects of a UE 115 as described herein. The device 1105 may include a receiver 1110, a procedure manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to random access channel procedure selection scheme, etc.). Information may be passed on to other components of the device 1105. The receiver 1110 may be an example of aspects of the transceiver 1420 described with reference to FIG. 14. The receiver 1110 may utilize a single antenna or a set of antennas.

The procedure manager 1115 may receive, via a control channel, an order message instructing the UE to perform a RACH procedure and select to perform a first RACH procedure or a second RACH procedure based on a preamble preparation time gap between the order message and a first occasion for transmitting a RACH preamble, or a payload preparation time gap between the order message and an occasion for transmitting a RACH payload, or both. The procedure manager 1115 may also receive, via a control channel, an order message instructing the UE to perform a RACH procedure, determine a preamble preparation time gap between the order message and an occasion for transmitting a RACH preamble, determine a payload preparation time gap between the order message and an occasion for transmitting a RACH payload, and select to perform a first RACH procedure instead of a second RACH procedure based on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload. The procedure manager 1115 may be an example of aspects of the procedure manager 1410 described herein.

The procedure manager 1115, or its sub-components, may be implemented in hardware, code (e.g., software or firmware) executed by a processor, or any combination thereof. If implemented in code executed by a processor, the functions of the procedure manager 1115, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The procedure manager 1115, or its sub-components, may be physically located at various positions, including being distributed such that portions of functions are implemented at different physical locations by one or more physical components. In some examples, the procedure manager 1115, or its sub-components, may be a separate and distinct component in accordance with various aspects of the present disclosure. In some examples, the procedure manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
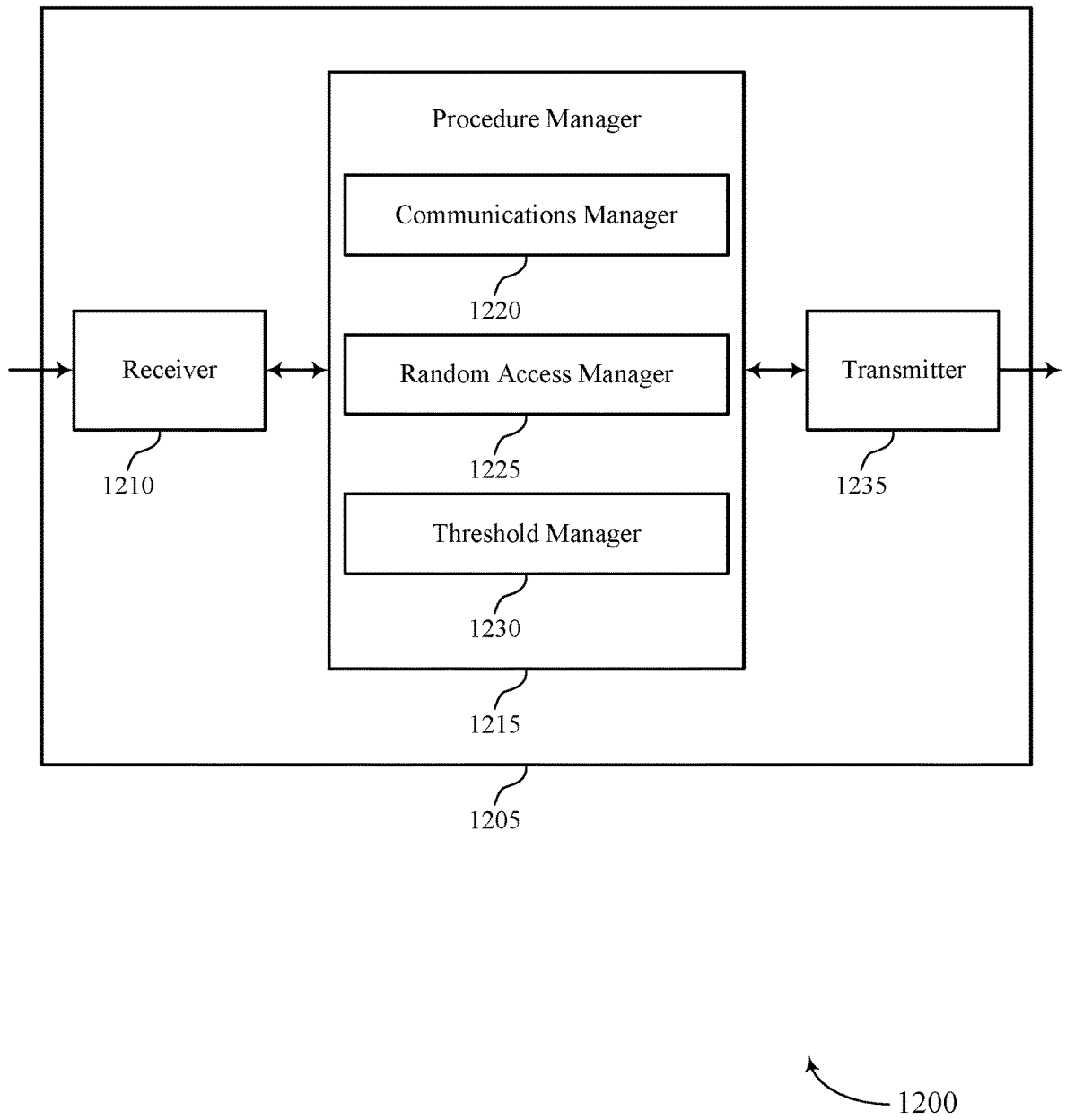

FIG. 12 shows a block diagram 1200 of a device 1205 that supports random access channel procedure selection scheme in accordance with aspects of the present disclosure. The device 1205 may be an example of aspects of a device 1105, or a UE 115 as described herein. The device 1205 may include a receiver 1210, a procedure manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to random access channel procedure selection scheme, etc.). Information may be passed on to other components of the device 1205. The receiver 1210 may be an example of aspects of the transceiver 1420 described with reference to FIG. 14. The receiver 1210 may utilize a single antenna or a set of antennas.

The procedure manager 1215 may be an example of aspects of the procedure manager 1115 as described herein. The procedure manager 1215 may include a communications manager 1220, a random access manager 1225, and a threshold manager 1230. The procedure manager 1215 may be an example of aspects of the procedure manager 1410 described herein.

The communications manager 1220 may receive, via a control channel, an order message instructing the UE to perform a RACH procedure. The random access manager 1225 may select to perform a first RACH procedure or a second RACH procedure based on a preamble preparation time gap between the order message and a first occasion for transmitting a RACH preamble, or a payload preparation time gap between the order message and an occasion for transmitting a RACH payload, or both.

The random access manager 1225 may determine a preamble preparation time gap between the order message and an occasion for transmitting a RACH preamble and determine a payload preparation time gap between the order message and an occasion for transmitting a RACH payload. The threshold manager 1230 may select to perform a first RACH procedure instead of a second RACH procedure based on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
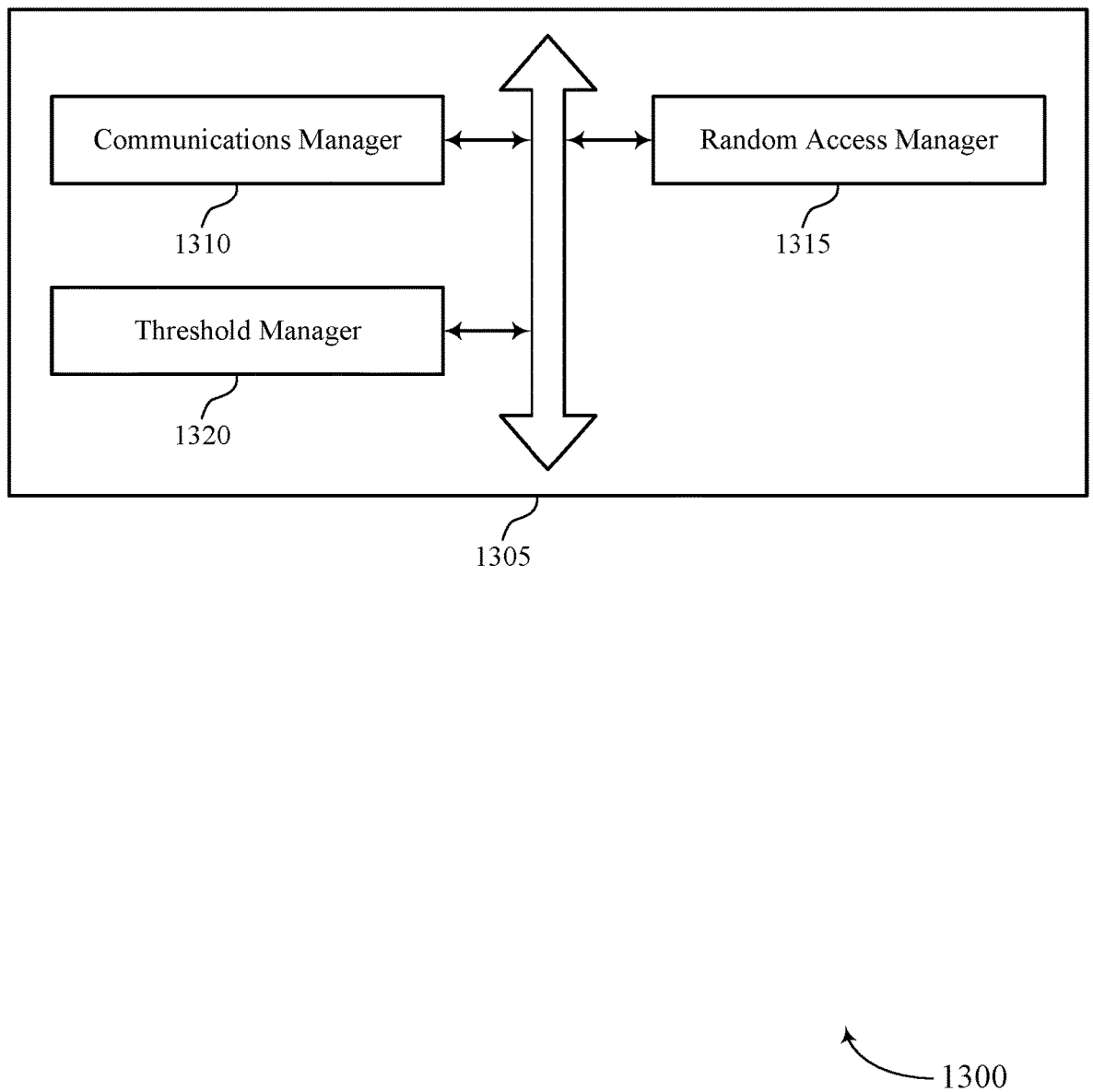
FIG. 13 shows a block diagram of a random access manager that supports a random access channel procedure selection scheme in accordance with aspects of the present disclosure.

FIG. 13 shows a block diagram 1300 of a procedure manager 1305 that supports random access channel procedure selection scheme in accordance with aspects of the present disclosure. The procedure manager 1305 may be an example of aspects of a procedure manager 1115, a procedure manager 1215, or a procedure manager 1410 described herein. The procedure manager 1305 may include a communications manager 1310, a random access manager 1315, and a threshold manager 1320. Each of these modules may communicate, directly or indirectly, with one another (e.g., via one or more buses).

In some examples, the communications manager 1310 may receive, via a control channel, an order message instructing the UE to perform a RACH procedure. In some examples, the communications manager 1310 may transmit the RACH preamble during the first occasion for transmitting the RACH preamble or a second occasion for transmitting the RACH preamble based on whether the first RACH procedure or the second RACH procedure was selected. In some examples, the communications manager 1310 may transmit the RACH preamble during the first occasion for transmitting the RACH preamble or the second occasion for transmitting the RACH preamble is further based on the preamble preparation time gap, the payload preparation time gap, or both.

The random access manager 1315 may select to perform a first RACH procedure or a second RACH procedure based on a preamble preparation time gap between the order message and a first occasion for transmitting a RACH preamble, or a payload preparation time gap between the order message and an occasion for transmitting a RACH payload, or both. In some examples, the random access manager 1315 may determine a preamble preparation time gap between the order message and an occasion for transmitting a RACH preamble. In some examples, the random access manager 1315 may determine a payload preparation time gap between the order message and an occasion for transmitting a RACH payload. In some examples, the random access manager 1315 may determine the preamble preparation time gap, the payload preparation time gap, or both.

The threshold manager 1320 may select to perform a first RACH procedure instead of a second RACH procedure based on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload. In some examples, the threshold manager 1320 may select to perform the first RACH procedure based on the preamble preparation time gap satisfying a preamble preparation threshold and the payload preparation time gap satisfying a payload preparation threshold. In some examples, the threshold manager 1320 may select to perform the second RACH procedure based on the preamble preparation time gap not satisfying a preamble preparation threshold.

Figure 14:
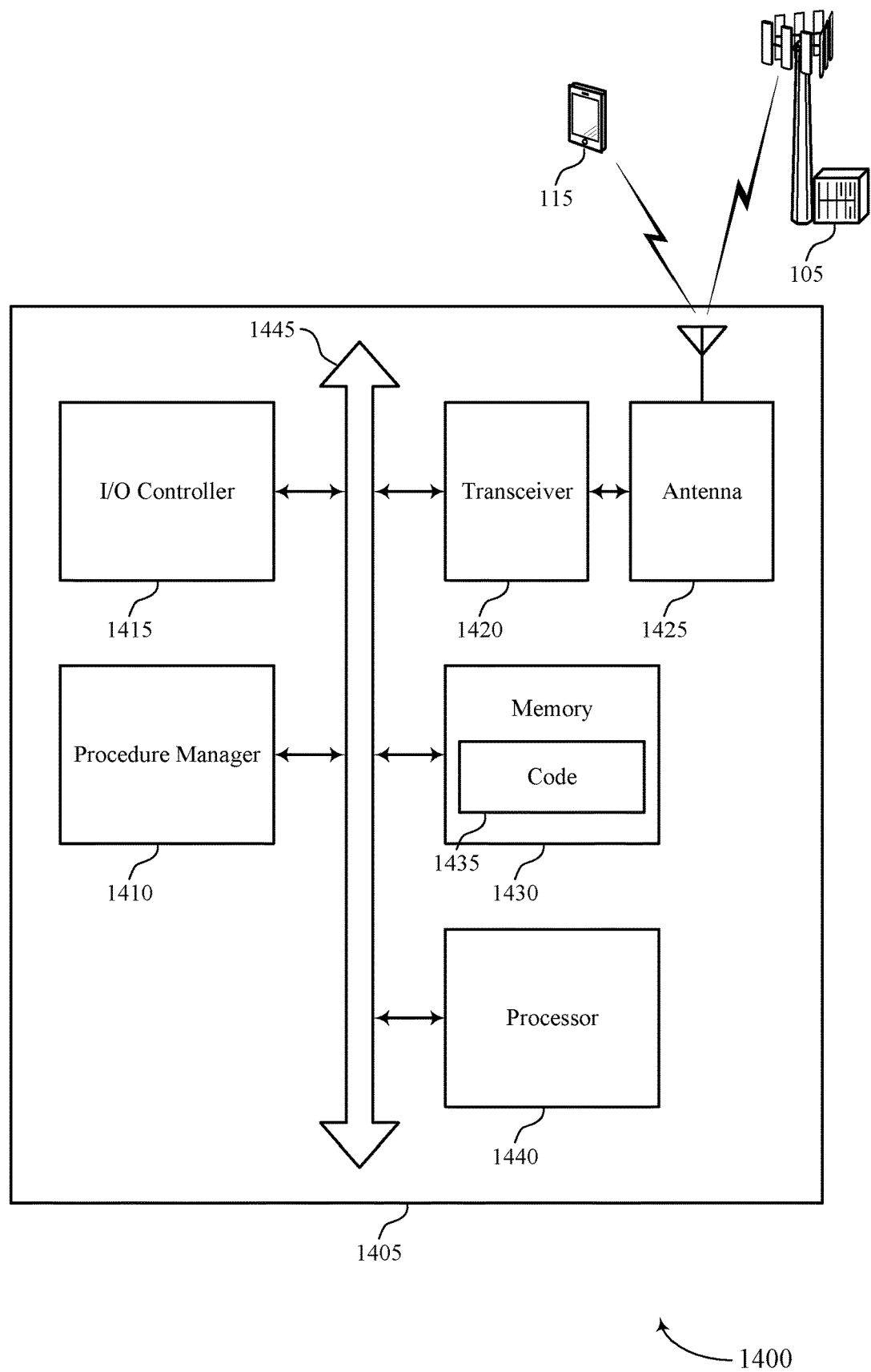
FIG. 14 shows a diagram of a system including a device that supports a random access channel procedure selection scheme in accordance with aspects of the present disclosure.

FIG. 14 shows a diagram of a system 1400 including a device 1405 that supports random access channel procedure selection scheme in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a procedure manager 1410, an I/O controller 1415, a transceiver 1420, an antenna 1425, memory 1430, and a processor 1440. These components may be in electronic communication via one or more buses (e.g., bus 1445).

The procedure manager 1410 may receive, via a control channel, an order message instructing the UE to perform a RACH procedure and select to perform a first RACH procedure or a second RACH procedure based on a preamble preparation time gap between the order message and a first occasion for transmitting a RACH preamble, or a payload preparation time gap between the order message and an occasion for transmitting a RACH payload, or both. The procedure manager 1410 may also receive, via a control channel, an order message instructing the UE to perform a RACH procedure, determine a preamble preparation time gap between the order message and an occasion for transmitting a RACH preamble, determine a payload preparation time gap between the order message and an occasion for transmitting a RACH payload, and select to perform a first RACH procedure instead of a second RACH procedure based on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting random access channel procedure selection scheme).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
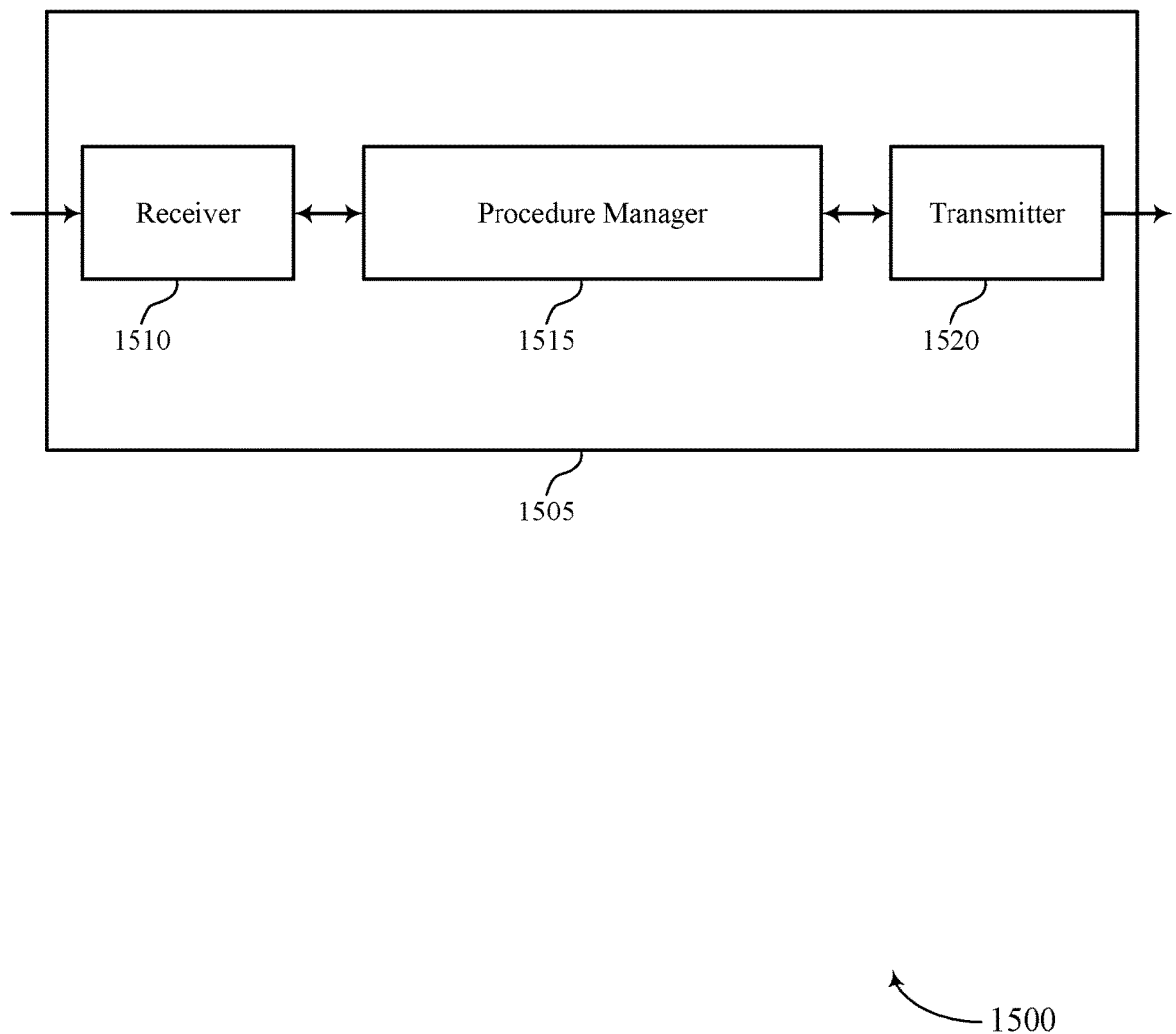
FIGS. 15 and 16 show block diagrams of devices that support a random access channel procedure selection scheme in accordance with aspects of the present disclosure.

FIG. 15 shows a block diagram 1500 of a device 1505 that supports random access channel procedure selection scheme in accordance with aspects of the present disclosure. The device 1505 may be an example of aspects of a base station 105 as described herein. The device 1505 may include a receiver 1510, a procedure manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to random access channel procedure selection scheme, etc.). Information may be passed on to other components of the device 1505. The receiver 1510 may be an example of aspects of the transceiver 1820 described with reference to FIG. 18. The receiver 1510 may utilize a single antenna or a set of antennas.

The procedure manager 1515 may transmit, via a control channel, an order message instructing a UE to perform a RACH procedure, select to perform a first RACH procedure or a second RACH procedure based on a preamble preparation time gap between the order message and a first occasion for receiving a RACH preamble, or a payload preparation time gap between the order message and an occasion for receiving a RACH payload, or both, and monitor for the RACH preamble during the first occasion for receiving the RACH preamble or a second occasion for receiving the RACH preamble based on the selected RACH procedure. The procedure manager 1515 may be an example of aspects of the procedure manager 1810 described herein.

The procedure manager 1515, or its sub-components, may be implemented in hardware, code (e.g., software or firmware) executed by a processor, or any combination thereof. If implemented in code executed by a processor, the functions of the procedure manager 1515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The procedure manager 1515, or its sub-components, may be physically located at various positions, including being distributed such that portions of functions are implemented at different physical locations by one or more physical components. In some examples, the procedure manager 1515, or its sub-components, may be a separate and distinct component in accordance with various aspects of the present disclosure. In some examples, the procedure manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
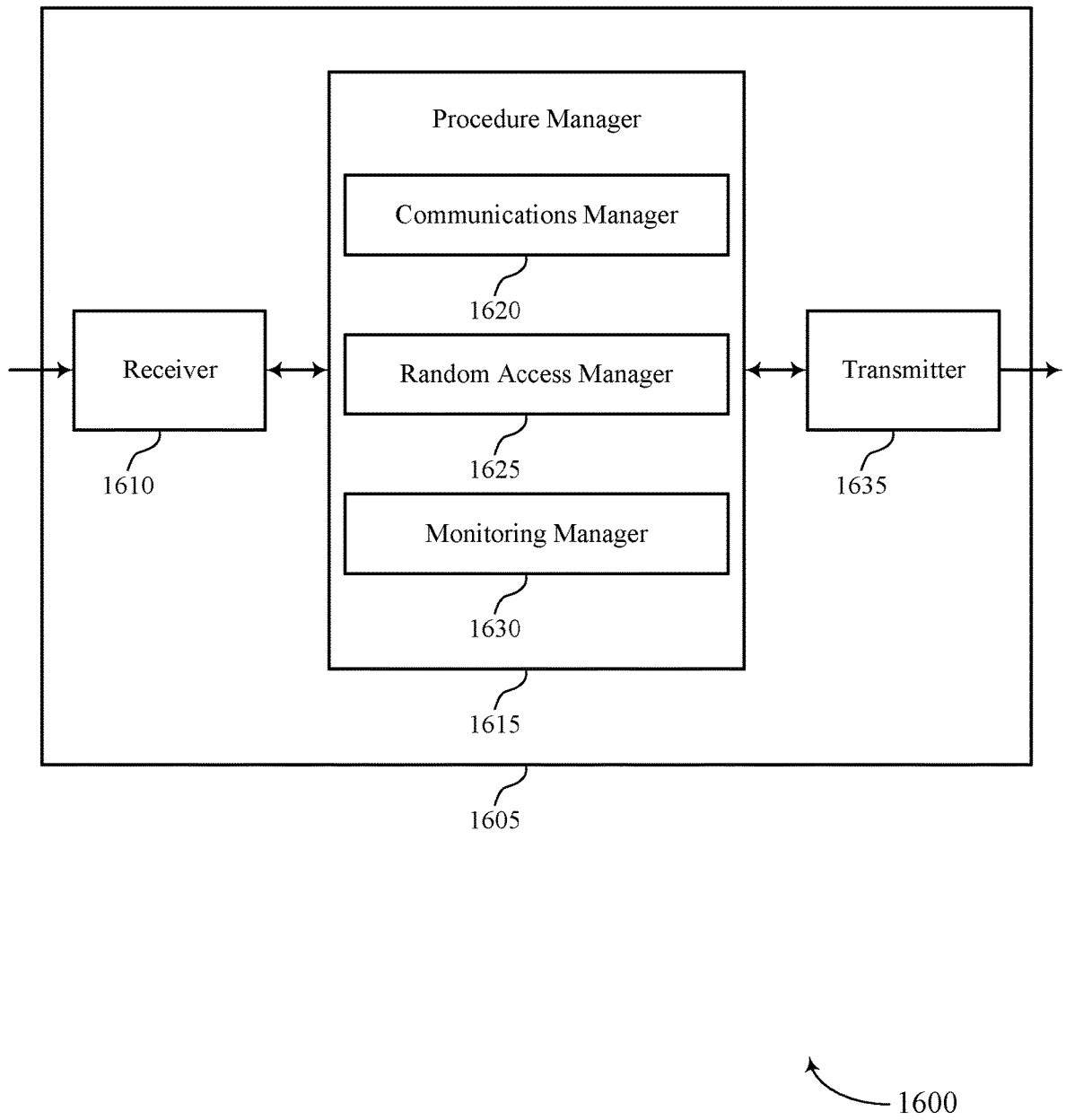

FIG. 16 shows a block diagram 1600 of a device 1605 that supports random access channel procedure selection scheme in accordance with aspects of the present disclosure. The device 1605 may be an example of aspects of a device 1505, or a base station 105 as described herein. The device 1605 may include a receiver 1610, a procedure manager 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to random access channel procedure selection scheme, etc.). Information may be passed on to other components of the device 1605. The receiver 1610 may be an example of aspects of the transceiver 1820 described with reference to FIG. 18. The receiver 1610 may utilize a single antenna or a set of antennas.

The procedure manager 1615 may be an example of aspects of the procedure manager 1515 as described herein. The procedure manager 1615 may include a communications manager 1620, a random access manager 1625, and a monitoring manager 1630. The procedure manager 1615 may be an example of aspects of the procedure manager 1810 described herein. The communications manager 1620 may transmit, via a control channel, an order message instructing a UE to perform a RACH procedure.

The random access manager 1625 may select to perform a first RACH procedure or a second RACH procedure based on a preamble preparation time gap between the order message and a first occasion for receiving a RACH preamble, or a payload preparation time gap between the order message and an occasion for receiving a RACH payload, or both. The monitoring manager 1630 may monitor for the RACH preamble during the first occasion for receiving the RACH preamble or a second occasion for receiving the RACH preamble based on the selected RACH procedure.

The transmitter 1635 may transmit signals generated by other components of the device 1605. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
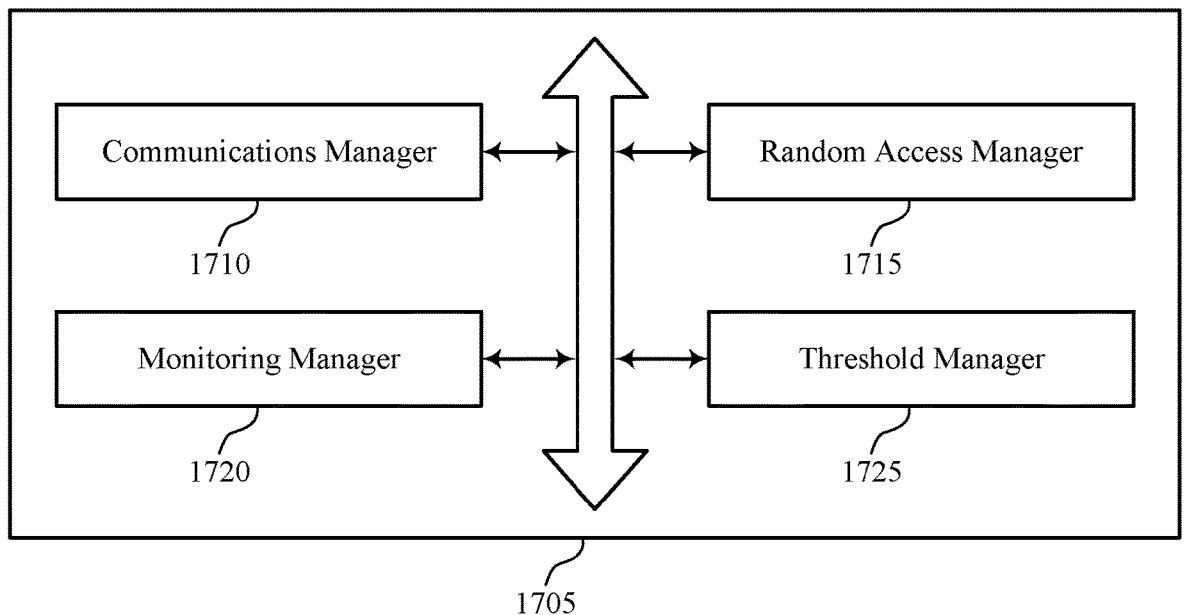
FIG. 17 shows a block diagram of a random access manager that supports a random access channel procedure selection scheme in accordance with aspects of the present disclosure.

FIG. 17 shows a block diagram 1700 of a procedure manager 1705 that supports random access channel procedure selection scheme in accordance with aspects of the present disclosure. The procedure manager 1705 may be an example of aspects of a procedure manager 1515, a procedure manager 1615, or a procedure manager 1810 described herein. The procedure manager 1705 may include a communications manager 1710, a random access manager 1715, a monitoring manager 1720, and a threshold manager 1725. Each of these modules may communicate, directly or indirectly, with one another (e.g., via one or more buses).

The communications manager 1710 may transmit, via a control channel, an order message instructing a UE to perform a RACH procedure. In some examples, the communications manager 1710 may receive the RACH preamble during the first occasion for receiving the RACH preamble or during the second occasion for receiving the RACH preamble based on whether the first RACH procedure or the second RACH procedure was selected. In some examples, the communications manager 1710 may receive the RACH preamble during the first occasion for receiving the RACH preamble or the second occasion for receiving the RACH preamble is further based on the preamble preparation time gap, the payload preparation time gap, or both.

The random access manager 1715 may select to perform a first RACH procedure or a second RACH procedure based on a preamble preparation time gap between the order message and a first occasion for receiving a RACH preamble, or a payload preparation time gap between the order message and an occasion for receiving a RACH payload, or both. The monitoring manager 1720 may monitor for the RACH preamble during the first occasion for receiving the RACH preamble or a second occasion for receiving the RACH preamble based on the selected RACH procedure.

The threshold manager 1725 may determine the preamble preparation time gap, the payload preparation time gap, or both. In some examples, the threshold manager 1725 may select to perform the first RACH procedure based on the preamble preparation time gap satisfying a preamble preparation threshold and the preamble preparation time gap satisfying a payload preparation threshold.

Figure 18:
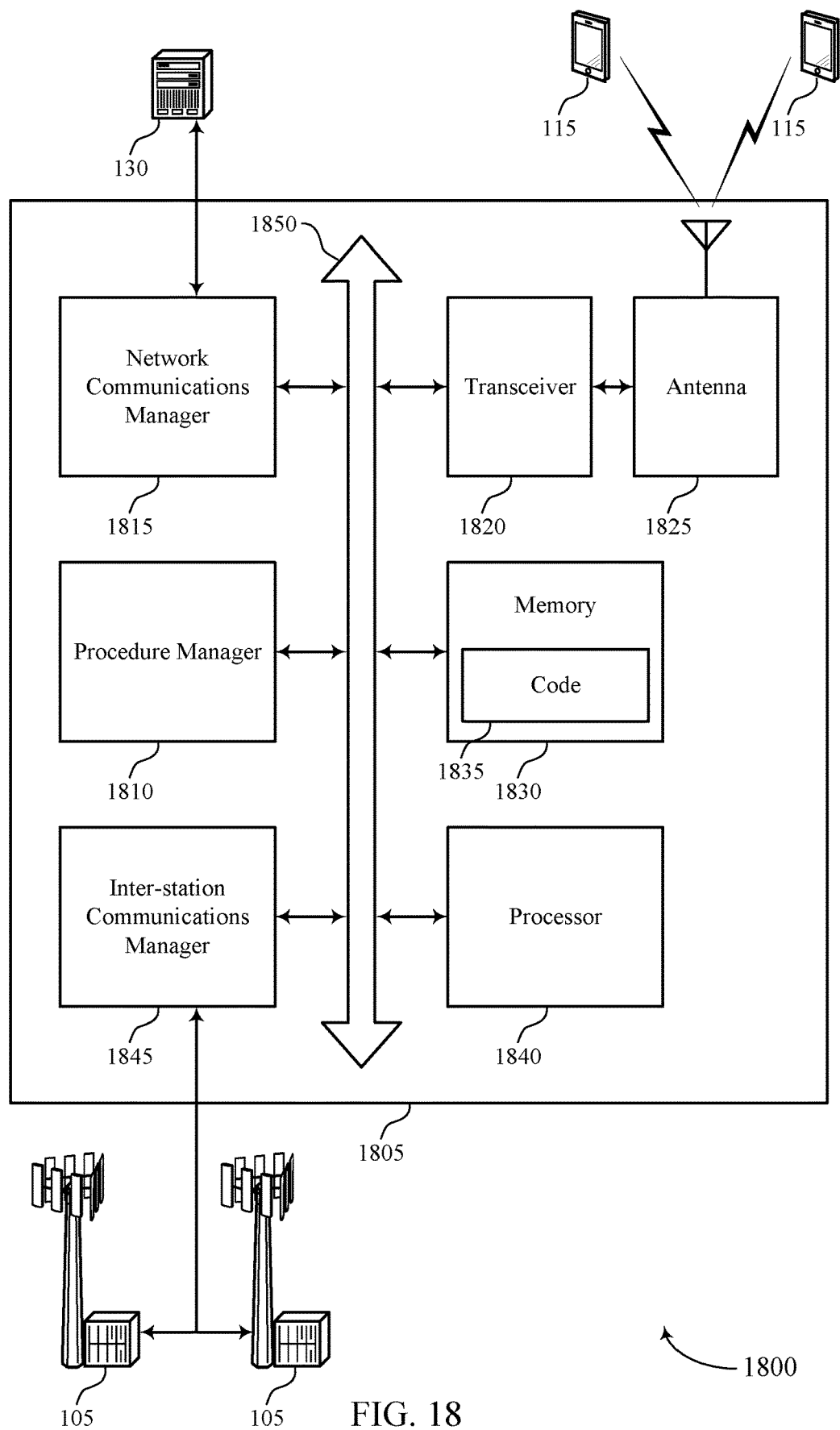
FIG. 18 shows a diagram of a system including a device that supports a random access channel procedure selection scheme in accordance with aspects of the present disclosure.

FIG. 18 shows a diagram of a system 1800 including a device 1805 that supports random access channel procedure selection scheme in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a procedure manager 1810, a network communications manager 1815, a transceiver 1820, an antenna 1825, memory 1830, a processor 1840, and an inter-station communications manager 1845. These components may be in electronic communication via one or more buses (e.g., bus 1850).

The procedure manager 1810 may transmit, via a control channel, an order message instructing a UE to perform a RACH procedure, select to perform a first RACH procedure or a second RACH procedure based on a preamble preparation time gap between the order message and a first occasion for receiving a RACH preamble, or a payload preparation time gap between the order message and an occasion for receiving a RACH payload, or both, and monitor for the RACH preamble during the first occasion for receiving the RACH preamble or a second occasion for receiving the RACH preamble based on the selected RACH procedure.

The network communications manager 1815 may manage communications with the core network (e.g., via one or more wired backhaul links). For example, the network communications manager 1815 may manage the transfer of data communications for client devices, such as one or more UEs 115. The transceiver 1820 may communicate bi-directionally, via one or more antennas, wired, or wireless links as described herein. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions. The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting random access channel procedure selection scheme).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
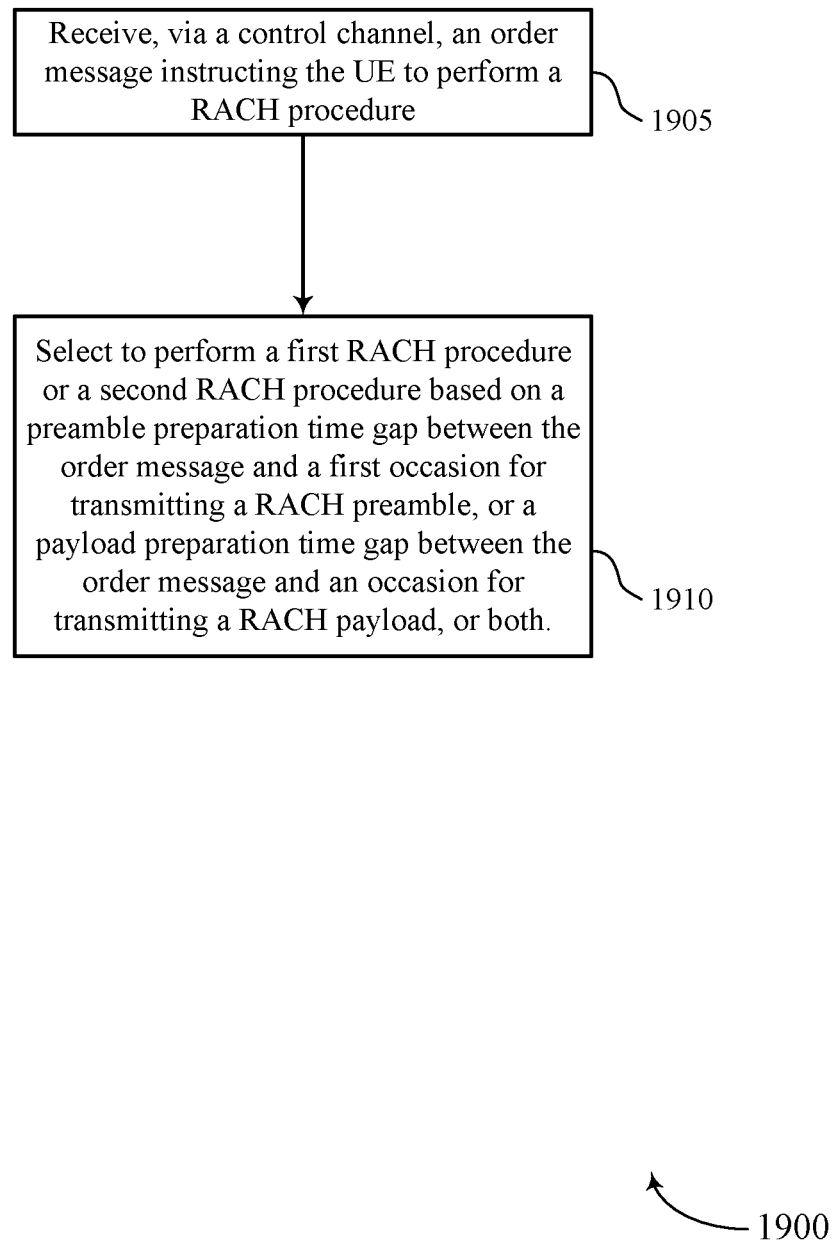
FIGS. 19 through 23 show flowcharts illustrating methods that support a random access channel procedure selection scheme in accordance with aspects of the present disclosure.

FIG. 19 shows a flowchart illustrating a method 1900 that supports random access channel procedure selection scheme in accordance with aspects of the present disclosure. The operations of method 1900 may be implemented by a UE 115 or its components as described herein. For example, the operations of method 1900 may be performed by a procedure manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1905, the UE may receive, via a control channel, an order message instructing the UE to perform a RACH procedure. The operations of 1905 may be performed according to the methods described herein. In some examples, aspects of the operations of 1905 may be performed by a communications manager as described with reference to FIGS. 11 through 14. Additionally or alternatively, means for performing 1905 may, but not necessarily, include, for example, antenna 1425, transceiver 1420, procedure manager 1410, memory 1430 (including code 1435), processor 1440 and/or bus 1445.

At 1910, the UE may select to perform a first RACH procedure or a second RACH procedure based on a preamble preparation time gap between the order message and a first occasion for transmitting a RACH preamble, or a payload preparation time gap between the order message and an occasion for transmitting a RACH payload, or both. The operations of 1910 may be performed according to the methods described herein. In some examples, aspects of the operations of 1910 may be performed by a random access manager as described with reference to FIGS. 11 through 14. Additionally or alternatively, means for performing 1910 may, but not necessarily, include, for example, antenna 1425, transceiver 1420, procedure manager 1410, memory 1430 (including code 1435), processor 1440 and/or bus 1445.

Figure 20:
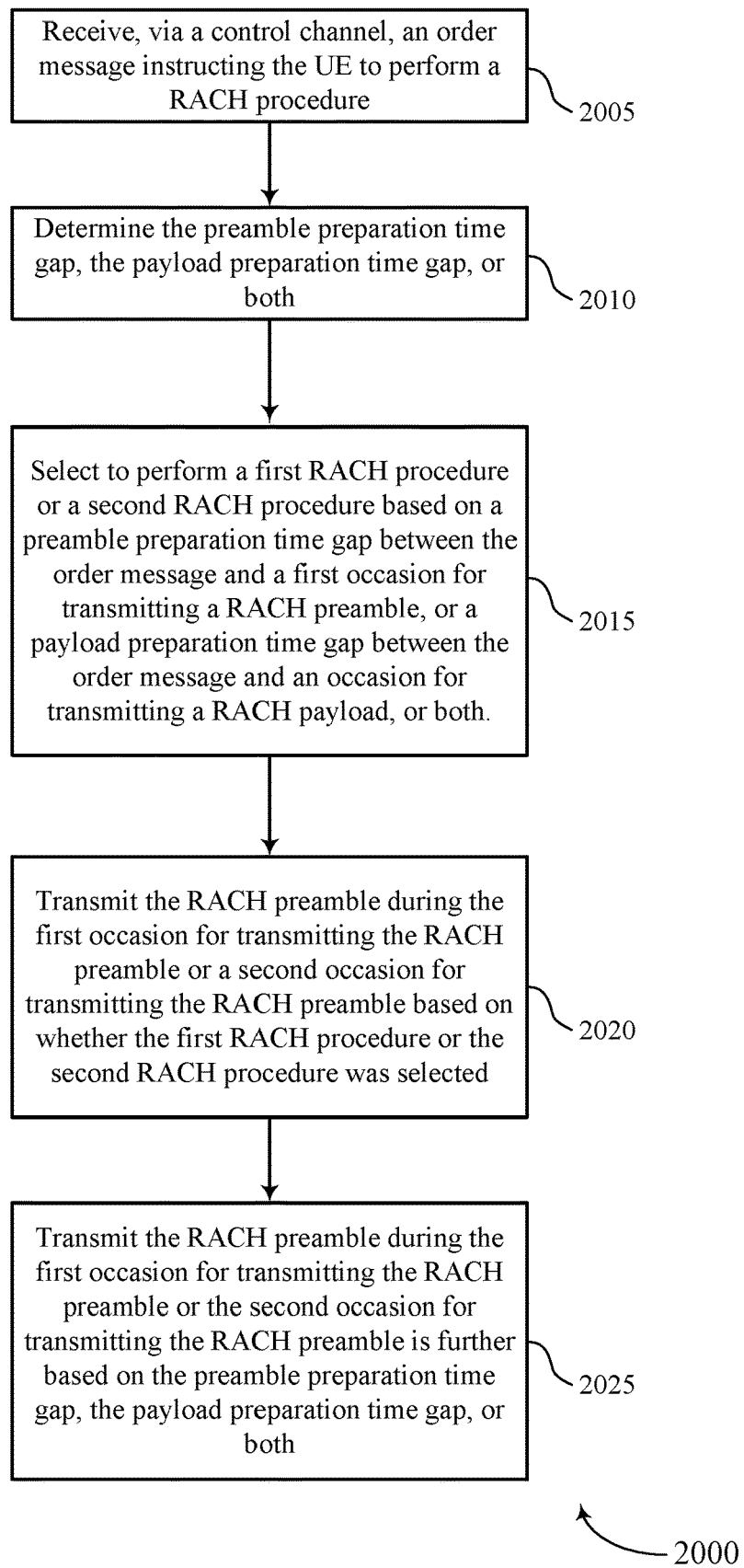

FIG. 20 shows a flowchart illustrating a method 2000 that supports random access channel procedure selection scheme in accordance with aspects of the present disclosure. The operations of method 2000 may be implemented by a UE 115 or its components as described herein. For example, the operations of method 2000 may be performed by a procedure manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2005, the UE may receive, via a control channel, an order message instructing the UE to perform a RACH procedure. The operations of 2005 may be performed according to the methods described herein. In some examples, aspects of the operations of 2005 may be performed by a communications manager as described with reference to FIGS. 11 through 14. Additionally or alternatively, means for performing 2005 may, but not necessarily, include, for example, antenna 1425, transceiver 1420, procedure manager 1410, memory 1430 (including code 1435), processor 1440 and/or bus 1445.

At 2010, the UE may determine the preamble preparation time gap, the payload preparation time gap, or both. The operations of 2010 may be performed according to the methods described herein. In some examples, aspects of the operations of 2010 may be performed by a random access manager as described with reference to FIGS. 11 through 14. Additionally or alternatively, means for performing 2010 may, but not necessarily, include, for example, antenna 1425, transceiver 1420, procedure manager 1410, memory 1430 (including code 1435), processor 1440 and/or bus 1445.

At 2015, the UE may select to perform a first RACH procedure or a second RACH procedure based on a preamble preparation time gap between the order message and a first occasion for transmitting a RACH preamble, or a payload preparation time gap between the order message and an occasion for transmitting a RACH payload, or both. The operations of 2015 may be performed according to the methods described herein. In some examples, aspects of the operations of 2015 may be performed by a random access manager as described with reference to FIGS. 11 through 14. Additionally or alternatively, means for performing 2015 may, but not necessarily, include, for example, antenna 1425, transceiver 1420, procedure manager 1410, memory 1430 (including code 1435), processor 1440 and/or bus 1445.

At 2020, the UE may transmit the RACH preamble during the first occasion for transmitting the RACH preamble or a second occasion for transmitting the RACH preamble based on whether the first RACH procedure or the second RACH procedure was selected. The operations of 2020 may be performed according to the methods described herein. In some examples, aspects of the operations of 2020 may be performed by a communications manager as described with reference to FIGS. 11 through 14. Additionally or alternatively, means for performing 2020 may, but not necessarily, include, for example, antenna 1425, transceiver 1420, procedure manager 1410, memory 1430 (including code 1435), processor 1440 and/or bus 1445.

At 2025, the UE may transmit the RACH preamble during the first occasion for transmitting the RACH preamble or the second occasion for transmitting the RACH preamble is further based on the preamble preparation time gap, the payload preparation time gap, or both. The operations of 2025 may be performed according to the methods described herein. In some examples, aspects of the operations of 2025 may be performed by a communications manager as described with reference to FIGS. 11 through 14. Additionally or alternatively, means for performing 2025 may, but not necessarily, include, for example, antenna 1425, transceiver 1420, procedure manager 1410, memory 1430 (including code 1435), processor 1440 and/or bus 1445.

Figure 21:
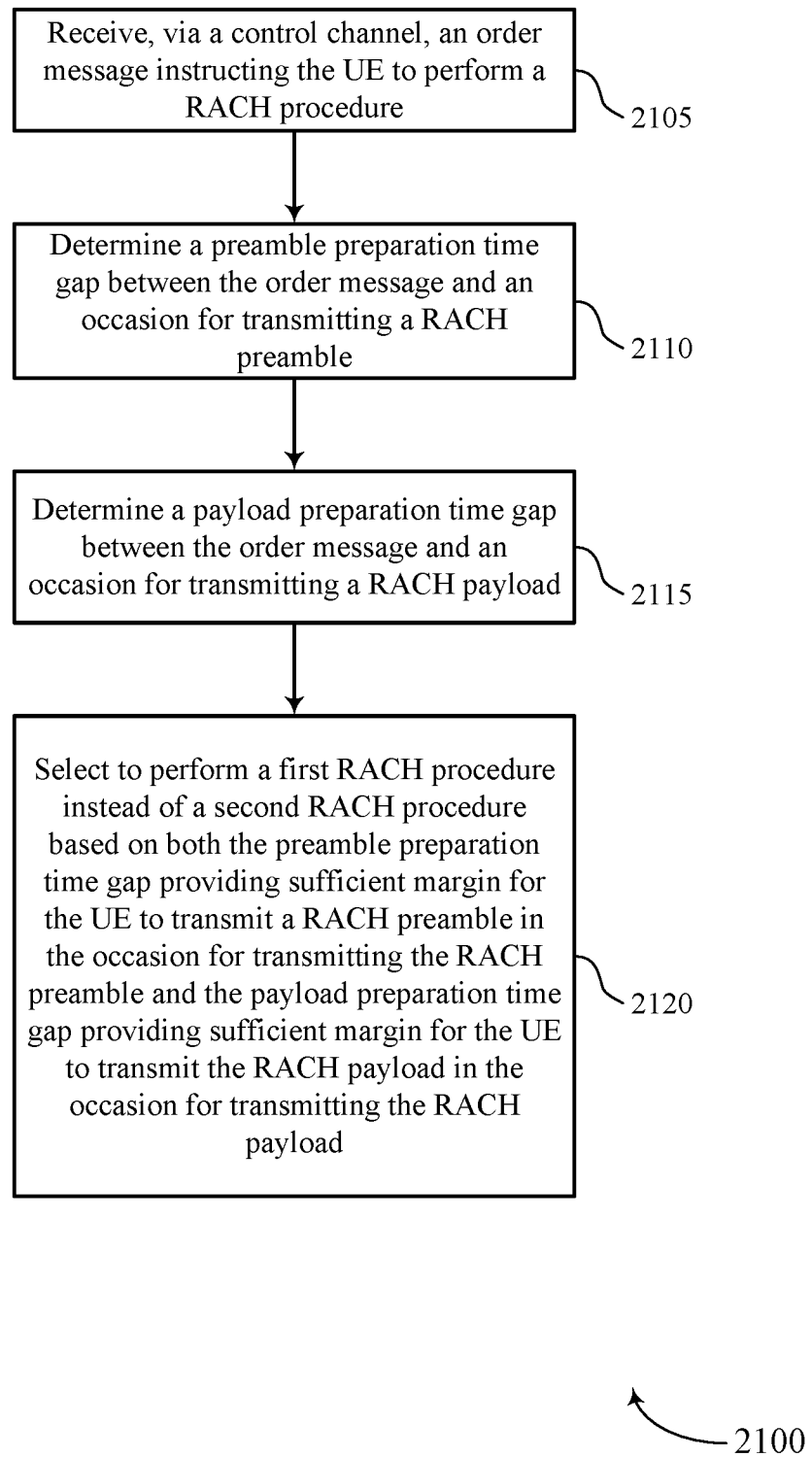

FIG. 21 shows a flowchart illustrating a method 2100 that supports random access channel procedure selection scheme in accordance with aspects of the present disclosure. The operations of method 2100 may be implemented by a UE 115 or its components as described herein. For example, the operations of method 2100 may be performed by a procedure manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2105, the UE may receive, via a control channel, an order message instructing the UE to perform a RACH procedure. The operations of 2105 may be performed according to the methods described herein. In some examples, aspects of the operations of 2105 may be performed by a communications manager as described with reference to FIGS. 11 through 14. Additionally or alternatively, means for performing 2105 may, but not necessarily, include, for example, antenna 1425, transceiver 1420, procedure manager 1410, memory 1430 (including code 1435), processor 1440 and/or bus 1445.

At 2110, the UE may determine a preamble preparation time gap between the order message and an occasion for transmitting a RACH preamble. The operations of 2110 may be performed according to the methods described herein. In some examples, aspects of the operations of 2110 may be performed by a random access manager as described with reference to FIGS. 11 through 14. Additionally or alternatively, means for performing 2110 may, but not necessarily, include, for example, antenna 1425, transceiver 1420, procedure manager 1410, memory 1430 (including code 1435), processor 1440 and/or bus 1445.

At 2115, the UE may determine a payload preparation time gap between the order message and an occasion for transmitting a RACH payload. The operations of 2115 may be performed according to the methods described herein. In some examples, aspects of the operations of 2115 may be performed by a random access manager as described with reference to FIGS. 11 through 14. Additionally or alternatively, means for performing 2115 may, but not necessarily, include, for example, antenna 1425, transceiver 1420, procedure manager 1410, memory 1430 (including code 1435), processor 1440 and/or bus 1445.

At 2120, the UE may select to perform a first RACH procedure instead of a second RACH procedure based on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload. The operations of 2120 may be performed according to the methods described herein. In some examples, aspects of the operations of 2120 may be performed by a threshold manager as described with reference to FIGS. 11 through 14. Additionally or alternatively, means for performing 2120 may, but not necessarily, include, for example, antenna 1425, transceiver 1420, procedure manager 1410, memory 1430 (including code 1435), processor 1440 and/or bus 1445.

Figure 22:
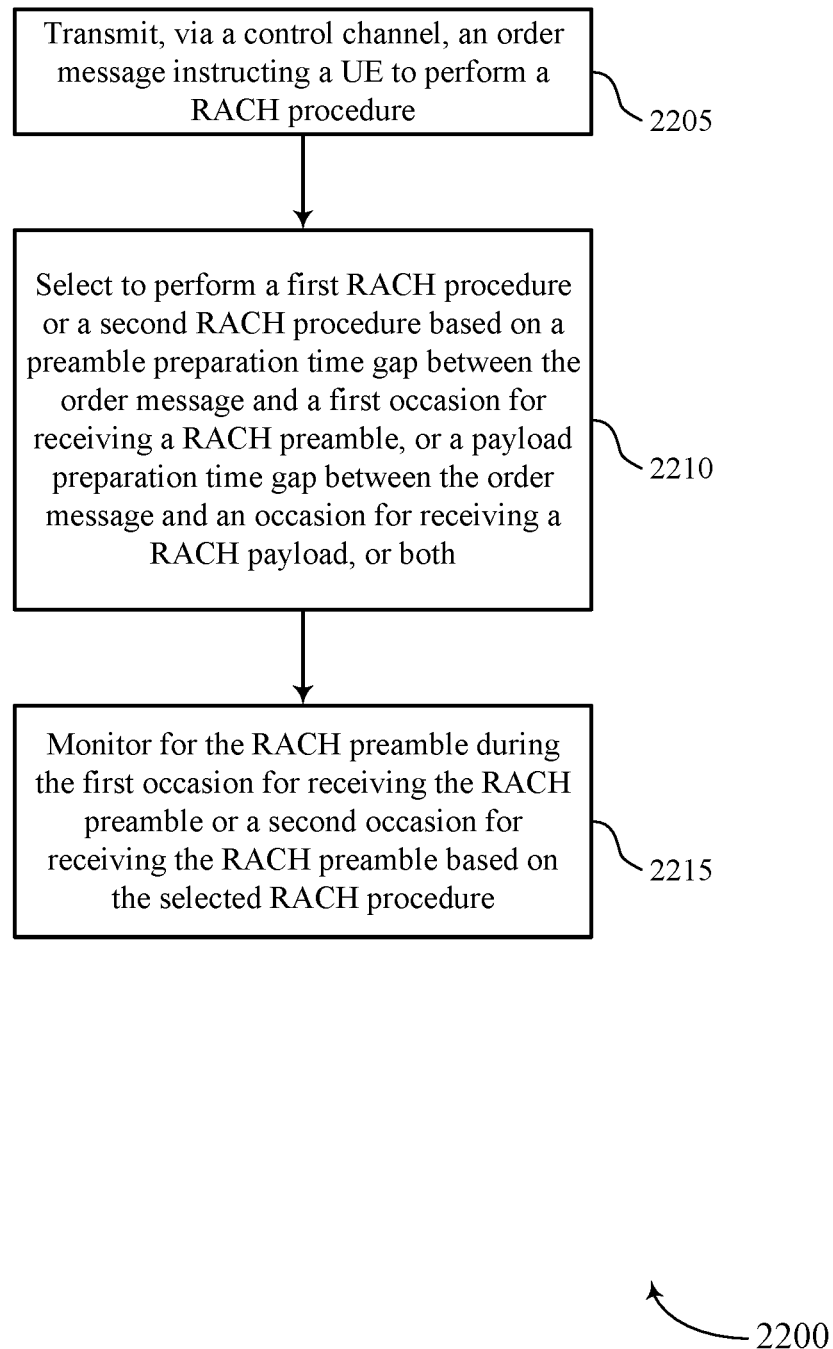

FIG. 22 shows a flowchart illustrating a method 2200 that supports random access channel procedure selection scheme in accordance with aspects of the present disclosure. The operations of method 2200 may be implemented by a base station 105 or its components as described herein. For example, the operations of method 2200 may be performed by a procedure manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2205, the base station may transmit, via a control channel, an order message instructing a UE to perform a RACH procedure. The operations of 2205 may be performed according to the methods described herein. In some examples, aspects of the operations of 2205 may be performed by a communications manager as described with reference to FIGS. 15 through 18. Additionally or alternatively, means for performing 2205 may, but not necessarily, include, for example, antenna 1825, transceiver 1820, procedure manager 1810, memory 1830 (including code 1835), processor 1840 and/or bus 1850.

At 2210, the base station may select to perform a first RACH procedure or a second RACH procedure based on a preamble preparation time gap between the order message and a first occasion for receiving a RACH preamble, or a payload preparation time gap between the order message and an occasion for receiving a RACH payload, or both. The operations of 2210 may be performed according to the methods described herein. In some examples, aspects of the operations of 2210 may be performed by a random access manager as described with reference to FIGS. 15 through 18. Additionally or alternatively, means for performing 2210 may, but not necessarily, include, for example, antenna 1825, transceiver 1820, procedure manager 1810, memory 1830 (including code 1835), processor 1840 and/or bus 1850.

At 2215, the base station may monitor for the RACH preamble during the first occasion for receiving the RACH preamble or a second occasion for receiving the RACH preamble based on the selected RACH procedure. The operations of 2215 may be performed according to the methods described herein. In some examples, aspects of the operations of 2215 may be performed by a monitoring manager as described with reference to FIGS. 15 through 18. Additionally or alternatively, means for performing 2215 may, but not necessarily, include, for example, antenna 1825, transceiver 1820, procedure manager 1810, memory 1830 (including code 1835), processor 1840 and/or bus 1850.

Figure 23:
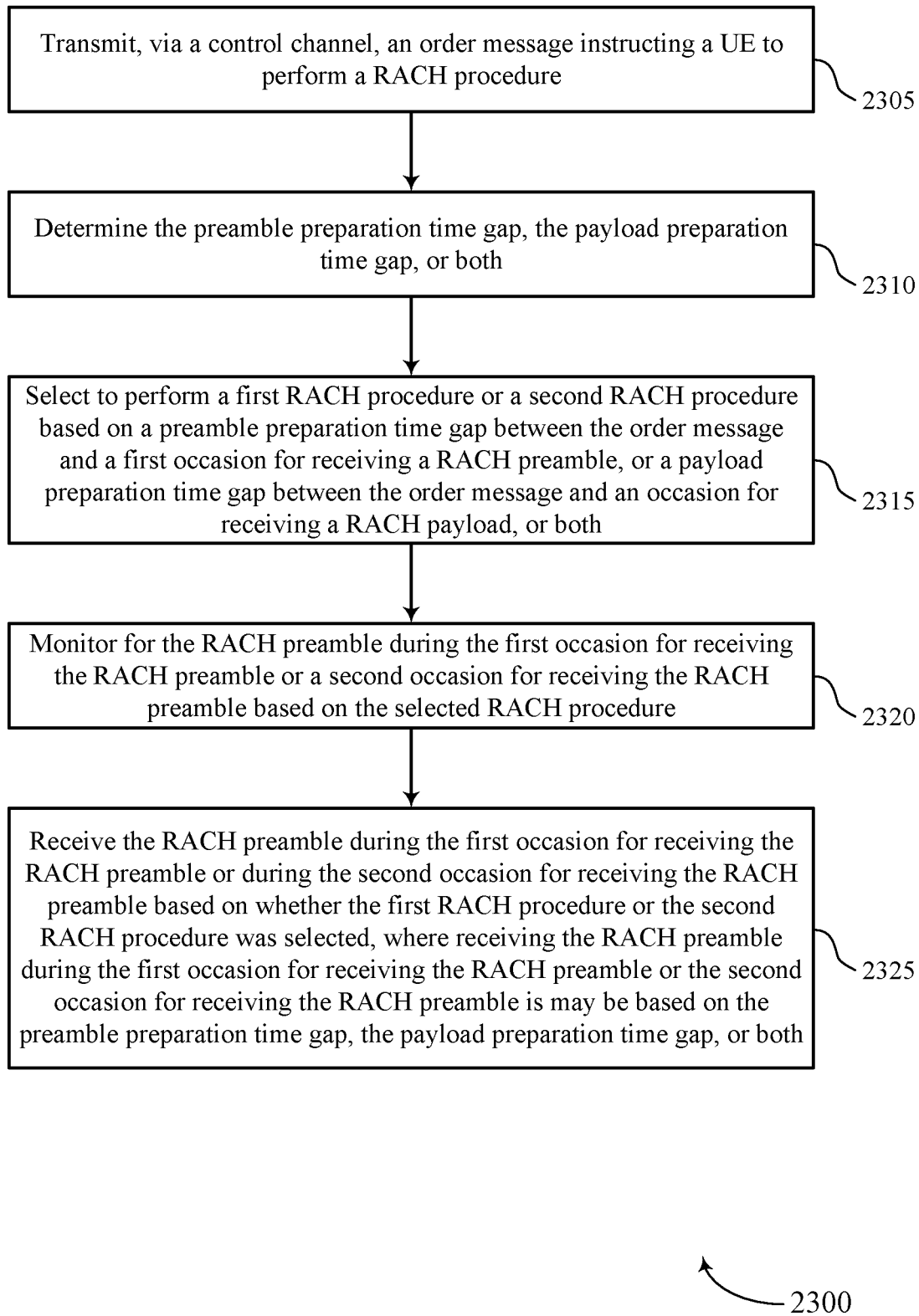

FIG. 23 shows a flowchart illustrating a method 2300 that supports random access channel procedure selection scheme in accordance with aspects of the present disclosure. The operations of method 2300 may be implemented by a base station 105 or its components as described herein. For example, the operations of method 2300 may be performed by a procedure manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2305, the base station may transmit, via a control channel, an order message instructing a UE to perform a RACH procedure. The operations of 2305 may be performed according to the methods described herein. In some examples, aspects of the operations of 2305 may be performed by a communications manager as described with reference to FIGS. 15 through 18. Additionally or alternatively, means for performing 2305 may, but not necessarily, include, for example, antenna 1825, transceiver 1820, procedure manager 1810, memory 1830 (including code 1835), processor 1840 and/or bus 1850.

At 2310, the base station may determine the preamble preparation time gap, the payload preparation time gap, or both. The operations of 2310 may be performed according to the methods described herein. In some examples, aspects of the operations of 2310 may be performed by a threshold manager as described with reference to FIGS. 15 through 18. Additionally or alternatively, means for performing 2310 may, but not necessarily, include, for example, antenna 1825, transceiver 1820, procedure manager 1810, memory 1830 (including code 1835), processor 1840 and/or bus 1850.

At 2315, the base station may select to perform a first RACH procedure or a second RACH procedure based on a preamble preparation time gap between the order message and a first occasion for receiving a RACH preamble, or a payload preparation time gap between the order message and an occasion for receiving a RACH payload, or both. The operations of 2315 may be performed according to the methods described herein. In some examples, aspects of the operations of 2315 may be performed by a random access manager as described with reference to FIGS. 15 through 18. Additionally or alternatively, means for performing 2315 may, but not necessarily, include, for example, antenna 1825, transceiver 1820, procedure manager 1810, memory 1830 (including code 1835), processor 1840 and/or bus 1850.

At 2320, the base station may monitor for the RACH preamble during the first occasion for receiving the RACH preamble or a second occasion for receiving the RACH preamble based on the selected RACH procedure. The operations of 2320 may be performed according to the methods described herein. In some examples, aspects of the operations of 2320 may be performed by a monitoring manager as described with reference to FIGS. 15 through 18. Additionally or alternatively, means for performing 2320 may, but not necessarily, include, for example, antenna 1825, transceiver 1820, procedure manager 1810, memory 1830 (including code 1835), processor 1840 and/or bus 1850.

At 2325, the base station may receive the RACH preamble during the first occasion for receiving the RACH preamble or during the second occasion for receiving the RACH preamble based on whether the first RACH procedure or the second RACH procedure was selected, where receiving the RACH preamble during the first occasion for receiving the RACH preamble or the second occasion for receiving the RACH preamble may be based on the preamble preparation time gap, the payload preparation time gap, or both. The operations of 2325 may be performed according to the methods described herein. In some examples, aspects of the operations of 2325 may be performed by a communications manager as described with reference to FIGS. 15 through 18. Additionally or alternatively, means for performing 2325 may, but not necessarily, include, for example, antenna 1825, transceiver 1820, procedure manager 1810, memory 1830 (including code 1835), processor 1840 and/or bus 1850.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any (e.g., any conventional) processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving, via a control channel, an order message instructing the UE to perform a random access channel (RACH) procedure; and
   selecting to perform a first RACH procedure or a second RACH procedure based at least in part on:
      a preamble preparation time gap between the order message and a first occasion for transmitting a RACH preamble, or
      a payload preparation time gap between the order message and an occasion for transmitting a RACH payload, or
      both.

2. The method of claim 1, further comprising:
   transmitting the RACH preamble during the first occasion for transmitting the RACH preamble or a second occasion for transmitting the RACH preamble based at least in part on whether the first RACH procedure or the second RACH procedure was selected.

3. The method of claim 2, wherein:
   transmitting the RACH preamble during the first occasion for transmitting the RACH preamble or the second occasion for transmitting the RACH preamble is further based at least in part on the preamble preparation time gap, the payload preparation time gap, or both.

4. The method of claim 2, further comprising:
determining the preamble preparation time gap, the payload preparation time gap, or both.

5. The method of claim 2, wherein selecting to perform the first RACH procedure or the second RACH procedure further comprises:
selecting to perform the first RACH procedure based at least in part on the preamble preparation time gap satisfying a preamble preparation threshold and the payload preparation time gap satisfying a payload preparation threshold.

6. The method of claim 5, wherein selecting to perform the first RACH procedure or the second RACH procedure further comprises:
selecting to perform the second RACH procedure based at least in part on the preamble preparation time gap not satisfying a preamble preparation threshold.

7. The method of claim 6, further comprising:
retrieving, from a memory of the UE, the preamble preparation threshold, the payload preparation threshold, or both.

8. The method of claim 6, further comprising:
receiving a threshold indicator that indicates the preamble preparation threshold, the payload preparation threshold, or both.

9. The method of claim 8, wherein receiving the threshold indicator further comprises:
receiving the threshold indicator in a medium access control (MAC) control element (CE), in downlink control information (DCI), or radio resource control (RRC) signaling, remaining minimum system information, other system information, handover report or any combination thereof.

10. The method of claim 2, wherein:
first respective time gaps differ from second respective time gaps, the first respective time gaps being between the control channel conveying the order message and each of the first occasion for transmitting the RACH preamble and the occasion for transmitting the RACH payload and the second respective time gaps being between the control channel conveying the order message and each of the second occasion for transmitting the RACH preamble and a second occasion for transmitting the RACH payload.

11. The method of claim 10, further comprising:
selecting a RACH resource or a synchronization signal block (SSB) that satisfies a received power threshold and corresponds to the first respective time gaps; and
transmitting the RACH preamble in the first occasion for transmitting the RACH preamble based on the preamble preparation time gap satisfying a preamble preparation threshold and the payload preparation time gap satisfying a payload preparation threshold, wherein the selected RACH resource or SSB corresponds to the first occasion for transmitting the RACH preamble but not the second occasion for transmitting the RACH preamble.

12. The method of claim 10, wherein an association period comprises a plurality of occasions for transmitting the RACH preamble that each satisfy a preamble preparation threshold and a plurality of occasions for transmitting the RACH payload that each satisfy a payload preparation threshold, the method further comprising:
selecting a RACH resource or a synchronization signal block (SSB) that satisfies a received power threshold and corresponds to the second respective time gaps; and
selecting to transmit the RACH preamble within the second occasion for transmitting the RACH preamble that occurs within the association period, wherein the selected RACH resource or SSB corresponds to the second occasion for transmitting the RACH preamble but not the first occasion for transmitting the RACH preamble.

13. The method of claim 12, wherein the association period occurs after a first association period that includes the first occasion for transmitting the RACH preamble.

14. A method for wireless communication by a user equipment (UE), comprising:
receiving, via a control channel, an order message instructing the UE to perform a random access channel (RACH) procedure;
determining a preamble preparation time gap between the order message and an occasion for transmitting a RACH preamble;
determining a payload preparation time gap between the order message and an occasion for transmitting a RACH payload; and
selecting to perform a first RACH procedure instead of a second RACH procedure based at least in part on both the preamble preparation time gap providing sufficient margin for the UE to transmit a RACH preamble in the occasion for transmitting the RACH preamble and the payload preparation time gap providing sufficient margin for the UE to transmit the RACH payload in the occasion for transmitting the RACH payload.

15. The method of claim 14, wherein monitoring for the RACH preamble further comprises:
selecting to perform the second RACH procedure instead of the first RACH procedure based at least in part on either the preamble preparation time gap not providing sufficient margin for the UE to transmit a RACH preamble in the occasion for transmitting the RACH preamble or the payload preparation time gap not providing sufficient margin for the UE to transmit the RACH payload in the occasion for transmitting the RACH payload.

16. A method for wireless communication by a base station, comprising:
transmitting, via a control channel, an order message instructing a user equipment (UE) to perform a random access channel (RACH) procedure;
selecting to perform a first RACH procedure or a second RACH procedure based at least in part on a preamble preparation time gap between the order message and a first occasion for receiving a RACH preamble, or a payload preparation time gap between the order message and an occasion for receiving a RACH payload, or both; and
monitoring for the RACH preamble during the first occasion for receiving the RACH preamble or a second occasion for receiving the RACH preamble based at least in part on the selected RACH procedure.

17. The method of claim 16, wherein monitoring for the RACH preamble further comprises:
receiving the RACH preamble during the first occasion for receiving the RACH preamble or during the second occasion for receiving the RACH preamble based at least in part on whether the first RACH procedure or the second RACH procedure was selected.

18. The method of claim 17, wherein:
receiving the RACH preamble during the first occasion for receiving the RACH preamble or the second occasion for receiving the RACH preamble is further based at least in part on the preamble preparation time gap, the payload preparation time gap, or both.

19. The method of claim 16, further comprising:
determining the preamble preparation time gap, the payload preparation time gap, or both.

20. The method of claim 16, wherein selecting to perform the first RACH procedure or the second RACH procedure further comprises:
selecting to perform the first RACH procedure based at least in part on the preamble preparation time gap satisfying a preamble preparation threshold and the payload preparation time gap satisfying a payload preparation threshold.

21. The method of claim 20, further comprising:
transmitting a threshold indicator that indicates the preamble preparation threshold, the payload preparation threshold, or both.

22. The method of claim 21, wherein transmitting the threshold indicator further comprises:
transmitting the threshold indicator in a medium access control (MAC) control element (CE), in downlink control information (DCI), or radio resource control (RRC) signaling, remaining minimum system information, other system information, handover report or any combination thereof.

23. The method of claim 16, wherein selecting to perform the first RACH procedure or the second RACH procedure further comprises:
selecting to perform the second RACH procedure based at least in part on the preamble preparation time gap not satisfying a preamble preparation threshold.

24. The method of claim 16, wherein:
first respective time gaps differ from second respective time gaps, the first respective time gaps being between the control channel conveying the order message and each of the first occasion for receiving the RACH preamble and the occasion for receiving the RACH payload and the second respective time gaps being between the control channel conveying the order message and each of the second occasion for receiving the RACH preamble and a second occasion for receiving the RACH payload.

25. The method of claim 16, wherein the first occasion for receiving the RACH preamble and the occasion for receiving the RACH payload occur consecutively in time, and wherein selecting to perform the first RACH procedure or the second RACH procedure further comprises:
selecting to perform the first RACH procedure based at least in part on the preamble preparation time gap satisfying a preamble preparation threshold.

26. An apparatus for wireless communication by a user equipment (UE), comprising:
a processor of the UE,
memory in electronic communication with the processor, the memory and the processor configured to:
receive, via a control channel, an order message instructing the UE to perform a random access channel (RACH) procedure; and
select to perform a first RACH procedure or a second RACH procedure based at least in part on:
a preamble preparation time gap between the order message and a first occasion for transmitting a RACH preamble, or
a payload preparation time gap between the order message and an occasion for transmitting a RACH payload, or
both.

27. The apparatus of claim 26, wherein the memory and the processor are further configured to:
transmit the RACH preamble during the first occasion for transmitting the RACH preamble or a second occasion for transmitting the RACH preamble based at least in part on whether the first RACH procedure or the second RACH procedure was selected.

28. The apparatus of claim 27, wherein transmitting the RACH preamble during the first occasion for transmitting the RACH preamble or the second occasion for transmitting the RACH preamble is further based at least in part on the preamble preparation time gap, the payload preparation time gap, or both.

29. The apparatus of claim 27, wherein the memory and the processor are further configured to:
determine the preamble preparation time gap, the payload preparation time gap, or both.

30. The apparatus of claim 27, wherein the memory and the processor are further configured to:
select to perform the first RACH procedure based at least in part on the preamble preparation time gap satisfying a preamble preparation threshold and the payload preparation time gap satisfying a payload preparation threshold.

* * * * *